(12) United States Patent
Sakuyama

(10) Patent No.: US 7,013,049 B2
(45) Date of Patent: Mar. 14, 2006

(54) IMAGE PROCESSING SCHEME

(75) Inventor: Hiroyuki Sakuyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 582 days.

(21) Appl. No.: 10/082,308

(22) Filed: Feb. 26, 2002

(65) Prior Publication Data

US 2002/0159644 A1    Oct. 31, 2002

(30) Foreign Application Priority Data

Feb. 28, 2001  (JP)  ............................. 2001-053721
Jun. 11, 2001  (JP)  ............................. 2001-175009
Sep. 21, 2001  (JP)  ............................. 2001-289625

(51) Int. Cl.
*G06K 9/36* (2006.01)

(52) U.S. Cl. .................................................. 382/240

(58) Field of Classification Search ........ 382/232–234, 382/236, 240, 244, 246, 248; 375/240.11, 375/240.19; 348/384.1, 399.1, 405.1, 407.1, 348/409.1, 411.1, 412.1, 415.1, 420.1; 708/203, 708/300, 307–308, 313, 316–317, 401–405
See application file for complete search history.

(56) References Cited

U.S. PATENT DOCUMENTS

| | | | | |
|---|---|---|---|---|
| 5,109,451 A | * | 4/1992 | Aono et al. | .................. 382/166 |
| 5,315,670 A | * | 5/1994 | Shapiro | ...................... 382/240 |
| 5,365,604 A | * | 11/1994 | Kwok et al. | ................. 382/275 |
| 5,546,477 A | * | 8/1996 | Knowles et al. | ............. 382/242 |
| 5,757,975 A | | 5/1998 | Eschbach et al. | |
| 5,818,877 A | * | 10/1998 | Tsai et al. | .................... 375/241 |
| 5,881,176 A | * | 3/1999 | Keith et al. | ................. 382/248 |
| 5,999,656 A | * | 12/1999 | Zandi et al. | ................ 382/248 |
| 6,101,276 A | * | 8/2000 | Adiletta et al. | ............. 382/236 |
| 6,115,420 A | * | 9/2000 | Wang | .................... 375/240.03 |

FOREIGN PATENT DOCUMENTS

JP      7-63177      7/1995

\* cited by examiner

*Primary Examiner*—Jose L. Couso
(74) *Attorney, Agent, or Firm*—Dickstein Shapiro Morin & Oshinsky LLP

(57) ABSTRACT

At least the deviation on a pixel having a value deviating from a predetermined range through inverse transform of image data from a frequency domain is reduced, wherein a pixel which should have a value changed in a direction reverse to the deviation is determined based on a character of the inverse transform.

27 Claims, 56 Drawing Sheets

FIG. 11

| Yll 8bit | Ylh 7bit | Yhl 7bit | Yhh 8bit | Ull 9bit | Vll 9bit |
|---|---|---|---|---|---|

| 0.03125 | −0.125 | −0.18750 | −0.125 | 0.03125 |
|---|---|---|---|---|
| −0.125 | 0.5 | 0.75 | 0.5 | −0.125 |
| 0.03125 | −0.125 | −0.18750 | −0.125 | 0.03125 |

| HH | LH | HH | LH | HH |
|---|---|---|---|---|
| HL | LL | HL | LL | HL |
| HH | LH | HH | LH | HH |

| 0.03125 | −0.125 | 0.03125 |
|---|---|---|
| −0.125 | 0.5 | −0.125 |
| −0.1875 | 0.75 | −0.1875 |
| −0.125 | 0.5 | −0.125 |
| 0.03125 | −0.125 | 0.03125 |

| HH | LH | HH |
|---|---|---|
| HL | LL | HL |
| HH | LH | HH |
| HL | LL | HL |
| HH | LH | HH |

| 0.015625 | −0.0625 | −0.09375 | −0.0625 | 0.015625 |
| −0.06250 | 0.25 | 0.375 | 0.25 | −0.06250 |
| −0.09375 | 0.375 | 0.5625 | 0.375 | −0.09375 |
| −0.06250 | 0.25 | 0.375 | 0.25 | −0.06250 |
| 0.015625 | −0.0625 | −0.09375 | −0.0625 | 0.015625 |

| HH | LH | HH | LH | HH |
| HL | LL | HL | LL | HL |
| HH | LH | HH | LH | HH |
| HL | LL | HL | LL | HL |
| HH | LH | HH | LH | HH |

| 0.5 | −1 | −3 | −1 | 0.5 |
|---|---|---|---|---|
| −1 | 0.5 | −6 | 0.5 | −1 |
| 0.5 | −1 | −3 | −1 | 0.5 |

FIG. 29B

| HH | LH | HH | LH | HH |
|---|---|---|---|---|
| HL | LL | HL | LL | HL |
| HH | LH | HH | LH | HH |

| 0.5 | −1 | 0.5 |
|-----|-----|-----|
| −1 | 0.5 | −1 |
| −3 | 6 | −3 |
| −1 | 0.5 | −1 |
| 0.5 | −1 | 0.5 |

FIG. 30B

| HH | LH | HH |
|----|----|----|
| HL | LL | HL |
| HH | LH | HH |
| HL | LL | HL |
| HH | LH | HH |

| 0.3 | −0.5 | −1.5 | −0.5 | 0.3 |
| −0.5 | 0.3 | 3.0 | 0.3 | −0.5 |
| −1.5 | 3.0 | 9.0 | 3.0 | −1.5 |
| −0.5 | 0.3 | 3.0 | 0.3 | −0.5 |
| 0.3 | −0.5 | −1.5 | −0.5 | 0.3 |

FIG. 31B

| HH | LH | HH | LH | HH |
|----|----|----|----|----|
| HL | LL | HL | LL | HL |
| HH | LH | HH | LH | HH |
| HL | LL | HL | LL | HL |
| HH | LH | HH | LH | HH |

| RANGE-OVER PIXEL | PIXEL TO BEAR RANGE-OVER |
|---|---|
| LL POSITION | HL OR LH POSITION |
| HL POSITION | LL ,AND THEN,LH POSITION |
| LH POSITION | LL ,AND THEN,HL POSITION |
| HH POSITION | HL OR LH POSITION |

FIG.33

| | LL POSITION | HL POSITION | LH POSITION | HH POSITION |
|---|---|---|---|---|
| CONTRIBUTION TO LL POSITION | 1.00 | −0.25 | −0.25 | 0.06 |
| CONTRIBUTION TO HL POSITION | 0.50 | 0.75 | −0.13 | −0.19 |
| CONTRIBUTION TO LH POSITION | 0.50 | −0.13 | 0.75 | −0.19 |
| CONTRIBUTION TO HH POSITION | 0.25 | 0.38 | 0.38 | 0.56 |

FIG. 34

| 0.0003 | −0.0010 | −0.0045 | 0.0188 | −0.0045 | −0.0010 | 0.0003 |
|---|---|---|---|---|---|---|
| −0.0010 | 0.0033 | 0.0154 | −0.0642 | 0.0154 | 0.0033 | −0.0010 |
| −0.0045 | 0.0154 | 0.0712 | −0.2976 | 0.0712 | 0.0154 | −0.0045 |
| 0.0188 | −0.0642 | −0.2976 | 1.2404 | −0.2976 | −0.0642 | 0.0188 |
| −0.0045 | 0.0154 | 0.0712 | −0.2976 | 0.0712 | 0.0154 | −0.0045 |
| −0.0010 | 0.0033 | 0.0154 | −0.0642 | 0.0154 | 0.0033 | −0.0010 |
| 0.0003 | −0.0010 | −0.0045 | 0.0188 | −0.0045 | −0.0010 | 0.0003 |

| 0.000451 | -0.00154 | -0.00132 | 0.009971 | 0.010168 | 0.009971 | -0.00132 | -0.00154 | 0.000451 |
|---|---|---|---|---|---|---|---|---|
| -0.00154 | 0.005252 | 0.004501 | -0.03402 | -0.0347 | -0.03402 | 0.004501 | 0.005252 | -0.00154 |
| -0.00714 | 0.024357 | 0.020875 | -0.15779 | -0.16091 | -0.15779 | 0.020875 | 0.024357 | -0.00714 |
| 0.029827 | -0.10178 | -0.08723 | 0.659319 | 0.672341 | 0.659319 | -0.08723 | -0.10178 | 0.029827 |
| -0.00714 | 0.024357 | 0.020875 | -0.15779 | -0.16091 | -0.15779 | 0.020875 | 0.024357 | -0.00714 |
| -0.00154 | 0.005252 | 0.004501 | -0.03402 | -0.0347 | -0.03402 | 0.004501 | 0.005252 | -0.00154 |
| 0.000451 | -0.00154 | -0.00132 | 0.009971 | 0.010168 | 0.009971 | -0.00132 | -0.00154 | 0.000451 |

| | | | | | | |
|---|---|---|---|---|---|---|
| 0.000451 | -0.00154 | -0.00714 | 0.029827 | -0.00714 | -0.00154 | 0.000451 |
| -0.00154 | 0.005252 | 0.024357 | -0.10178 | 0.024357 | 0.005252 | -0.00154 |
| -0.00132 | 0.004501 | 0.020875 | -0.08723 | 0.020875 | 0.004501 | -0.00132 |
| 0.009971 | -0.03402 | -0.15779 | 0.659319 | -0.15779 | -0.03402 | 0.009971 |
| 0.010168 | -0.0347 | -0.16091 | 0.672341 | -0.16091 | -0.0347 | 0.010168 |
| 0.009971 | -0.03402 | -0.15779 | 0.659319 | -0.15779 | -0.03402 | 0.009971 |
| -0.00132 | 0.004501 | 0.020875 | -0.08723 | 0.020875 | 0.004501 | -0.00132 |
| -0.00154 | 0.005252 | 0.024357 | -0.10178 | 0.024357 | 0.005252 | -0.00154 |
| 0.000451 | -0.00154 | -0.00714 | 0.029827 | -0.00714 | -0.00154 | 0.000451 |

| 0.000715 | -0.00244 | -0.00209 | 0.015818 | 0.016128 | 0.015818 | -0.00209 | -0.00244 | 0.000715 |
|---|---|---|---|---|---|---|---|---|
| -0.00244 | 0.008331 | 0.00714 | -0.05397 | -0.05503 | -0.05397 | 0.00714 | 0.008331 | -0.00244 |
| -0.00209 | 0.00714 | 0.006119 | -0.04625 | -0.0472 | -0.04625 | 0.006119 | 0.00714 | -0.00209 |
| 0.015818 | -0.05397 | -0.04625 | 0.349602 | 0.356507 | 0.349602 | -0.04625 | -0.05397 | 0.015816 |
| 0.016128 | -0.05503 | -0.0472 | 0.356507 | 0.366548 | 0.356507 | -0.0472 | -0.05503 | 0.016128 |
| 0.015818 | -0.05397 | -0.04625 | 0.349602 | 0.356507 | 0.349602 | -0.04625 | -0.05397 | 0.015816 |
| -0.00209 | 0.00714 | 0.006119 | -0.04625 | -0.0472 | -0.04625 | 0.006119 | 0.00714 | -0.00209 |
| -0.00244 | 0.008331 | 0.00714 | -0.05397 | -0.05503 | -0.05397 | 0.00714 | 0.008331 | -0.00244 |
| 0.000715 | -0.00244 | -0.00209 | 0.015816 | 0.016128 | 0.015816 | -0.00209 | -0.00244 | 0.000715 |

|  | LL POSITION | HL POSITION | LH POSITION | HH POSITION |
|---|---|---|---|---|
| CONTRIBUTION TO LL POSITION | 1.24 | -2.38 | -2.38 | 1.14 |
| CONTRIBUTION TO HL POSITION | 0.66 | 5.38 | -1.26 | -2.57 |
| CONTRIBUTION TO LH POSITION | 0.66 | -1.26 | 5.38 | -2.57 |
| CONTRIBUTION TO HH POSITION | 0.35 | 2.85 | 2.85 | 5.82 |

FIG.39

|  | LL POSITION | HL POSITION | LH POSITION | HH POSITION |
|---|---|---|---|---|
| CONTRIBUTION TO LL POSITION | 1.24 | -0.30 | -0.30 | 0.07 |
| CONTRIBUTION TO HL POSITION | 0.66 | 0.67 | -0.15 | -0.16 |
| CONTRIBUTION TO LH POSITION | 0.66 | -0.16 | 0.67 | -2.57 |
| CONTRIBUTION TO HH POSITION | 0.35 | 0.36 | 0.36 | 0.36 |

FIG.40

| RANGE-OVER PIXEL | PIXEL TO FIRST BEAR RANGE-OVER | PIXEL TO SECOND BEAR RANGE-OVER |
|---|---|---|
| LL POSITION | TO HL POSITION(HORIZONTAL) | TO LH POSITION(VERTICAL) |
| HL POSITION | TO LL POSITION(HORIZONTAL) | TO LH POSITION(DIAGONAL FROM HL) |
| LH POSITION | TO LL POSITION(VERTICAL) | TO LH POSITION(FOR SIMPLIFICATION) |
| HH POSITION | TO LH POSITION(HORIZONTAL) | TO LH POSITION(VERTICAL) |

| HH | LH | HH | LH | HH |
|----|----|----|----|----|
| HL | LL | HL | LL | HL |
| HH |    | HH | LH | HH |
| HL | LL | HL | LL | HL |
| HH | LH | HH | LH | HH |

FIG.45

|  | LL POSITION | HL POSITION | LH POSITION | HH POSITION |
|---|---|---|---|---|
| CONTRIBUTION TO LL POSITION | + | − | − | + |
| CONTRIBUTION TO HL POSITION | + | + | − | − |
| CONTRIBUTION TO LH POSITION | + | − | + | − |
| CONTRIBUTION TO HH POSITION | + | + | + | + |

FIG.46

| RANGE-OVER PIXEL | FIRST DISTRIBUTION PLACE | SECOND DISTRIBUTION PLACE |
|---|---|---|
| LL POSITION | HH(DIAGONAL) | LH(VERTICAL) |
| HL POSITION | LH(DIAGONAL) | HH(VERTICAL) |
| LH POSITION | HL(DIAGONAL) | LL(VERTICAL) |
| HH POSITION | LL(DIAGONAL) | HL(VERTICAL) |

FIG.47

| RANGE-OVER PIXEL | FIRST DISTRIBUTION PLACE | SECOND DISTRIBUTION PLACE |
|---|---|---|
| LL POSITION | HH(DIAGONAL) | HL(HORIZONTAL) |
| HL POSITION | LH(DIAGONAL) | LL(HORIZONTAL) |
| LH POSITION | HL(DIAGONAL) | HH(HORIZONTAL) |
| HH POSITION | LL(DIAGONAL) | LH(HORIZONTAL) |

FIG.48

| RANGE-OVER PIXEL | FIRST DISTRIBUTION PLACE | SECOND DISTRIBUTION PLACE |
|---|---|---|
| LL POSITION | LH(VERTICAL) | HL(HORIZONTAL)OR HH(DIAGONAL) |
| HL POSITION | HH(VERTICAL) | LL(HORIZONTAL)OR LH(DIAGONAL) |
| LH POSITION | LL(VERTICAL) | HH(HORIZONTAL)OR HL(DIAGONAL) |
| HH POSITION | HL(VERTICAL) | LH(HORIZONTAL)OR LL(DIAGONAL) |

FIG.49

| RANGE-OVER PIXEL | FIRST DISTRIBUTION PLACE | SECOND DISTRIBUTION PLACE |
|---|---|---|
| LL POSITION | HL(HORIZONTAL) | LH(VERTICAL)OR HH(DIAGONAL) |
| HL POSITION | LL(HORIZONTAL) | HH(VERTICAL)OR LH(DIAGONAL) |
| LH POSITION | HH(HORIZONTAL) | LL(VERTICAL)OR HL(DIAGONAL) |
| HH POSITION | LH(HORIZONTAL) | HL(VERTICAL)OR LL(DIAGONAL) |

IMAGE PROCESSING SCHEME

BACKGROUND OF THE INVENTION

1. Field of the Invention

The present invention relates to an image processing scheme used in an image data processing apparatus, an image data processing method, a software program for performing the method, and a recording medium storing the software program therein, and, in particular, to device drivers such as an application program and a printer driver, and so forth for decoding image information, in particular, color image information.

2. Description of the Related Art

Recently, in a case of transmission or storage of a color image, in order to reduce an amount of data, it is common to compress an original image data. In case the compression is performed, orthogonal transform is performed on components of the image, and, thus, the amount of information is biased in a predetermined manner, and, then, quantization is performed on thus-obtained coefficients, so that the information amount is reduced. Further, in order to perform extreme quantization, all specific coefficients may be eliminated (regarded as zero), in some case.

Japanese patent publication No. 7-63177 discloses such an art. In which color image data is transformed into a brightness signal and a color-difference signal for every block unit, orthogonal transform is performed thereon so that coefficients expressing low-frequency direct-current components and high-frequency alternate-current components are obtained. Then, after that, quantization is performed thereon. On the other hand, as for the color-difference signal, orthogonal transform is not performed, and, only a representative color on each block is quantized and coded.

When the thus-compressed image is decompressed, inverse-quantization is performed, and, therethrough, quantization error may occur between the original image and the decompressed image. When such quantization error is large, the value on each pixel after decompression may exceed a predetermined range.

For example, as to a general full-color image, for each color component of RGB, each pixel is expressed by 8 bits, i.e., may have a value in a range between 0 and 255. However, due to the above-mentioned quantization error, the value of pixel may become negative, or exceeds 255. Such a situation will be referred to as range-over, hereinafter.

When such range-over occurs, a clipping processing is performed, in which a negative value is replaced by 0 and the value exceeding 255 is replaced by 255, conventionally. However, in case extreme quantization has been made, an amount of range-over (amount by which the value deviates from the predetermined range) may become large. Accordingly, the color tone/hue may change locally, only through simple clipping processing, and thereby, the image quality may be remarkably degraded.

The above-mentioned problem is also pointed out by U.S. Pat. No. 5,757,975, 'Artifact reduction for large dynamic range input data in JPEG compression'. According to this patent, local average values are maintained, and local change in color tone is reduced as a result of peripheral pixels of the range-over pixel each having a value within a predetermined range being searched for, and the range-over amount being distributed to/borne by these peripheral pixels.

Such a scheme of 'maintaining local average' is effective in term of reducing image degradation. However, in order to search for peripheral pixels each having a value within a predetermined range may require a considerable amount of calculation. In fact, for this purpose, it is necessary to read the pixel values on many peripheral pixels, one by one, only for dealing with a single range-over pixel.

SUMMARY OF THE INVENTION

An object of the present invention is to provide an image data processing scheme in which, by considering a quantization rate for each frequency coefficient obtained through frequency transform (such as S-transform, 5×3 wavelet transform, 9×7 wavelet transform), and/or a property of a target image itself (for example, a natural image, or the like), it is possible to quickly correct a deviation in image data occurring in a pixel without performing complex processing, and, thereby, to quickly provide a high-quality decompressed image having an effectively reduced hue change occurring through data compression/decompression.

An information recording scheme according to the present invention, comprises the following processes:

a) at least reducing the deviation on a pixel having a value deviating from a predetermined range through inverse transform of image data from a frequency domain; and b) determining a pixel which should have a value changed in a direction reverse to the deviation, based on a character of the inverse transform.

Thereby, it is possible to make the average pixel values uniform through reducing the deviation and also changing a value of another pixel in a direction reverse to the deviation. Also, it is possible to quickly select a pixel which should bear the deviation according to the property/character of the frequency transform scheme applied, and, thus, it is possible to perform image data compression/decompression such as to provide a high-quality decompressed image having an effectively reduced hue change, through a relatively simple apparatus configuration, within a short processing time.

BRIEF DESCRIPTION OF THE DRAWINGS

Other objects and further features of the present invention will become more apparent from the following detailed description when read in conjunction with the following accompanying drawings:

FIG. 11 shows one example of configuration of a fixed-length code generated by the encoding part shown in FIG. 10;

FIGS. 24A, 24B, 25A, 25B, 26A, 26B and 27A, 27B illustrate examples of constants used for 5×3 wavelet inverse transform;

FIGS. 29A and 29B shows contribution degrees on an error occurring in a pixel at HL position, obtained from the constants shown in FIG. 25A;

FIGS. 30A and 30B shows contribution degrees on an error occurring in a pixel at LH position, obtained from the constants shown in FIG. 26A;

FIGS. 31A and 31B shows contribution degrees on an error occurring in a pixel at HH position, obtained from the constants shown in FIG. 27A;

FIG. 32 illustrates an example of distribution places predetermined in probabilistic viewpoint according to the above-mentioned third embodiment of the present invention;

FIG. 33 shows contribution degrees assuming that the numbers of quantization steps are 1:1:1:1;

Figure 36:
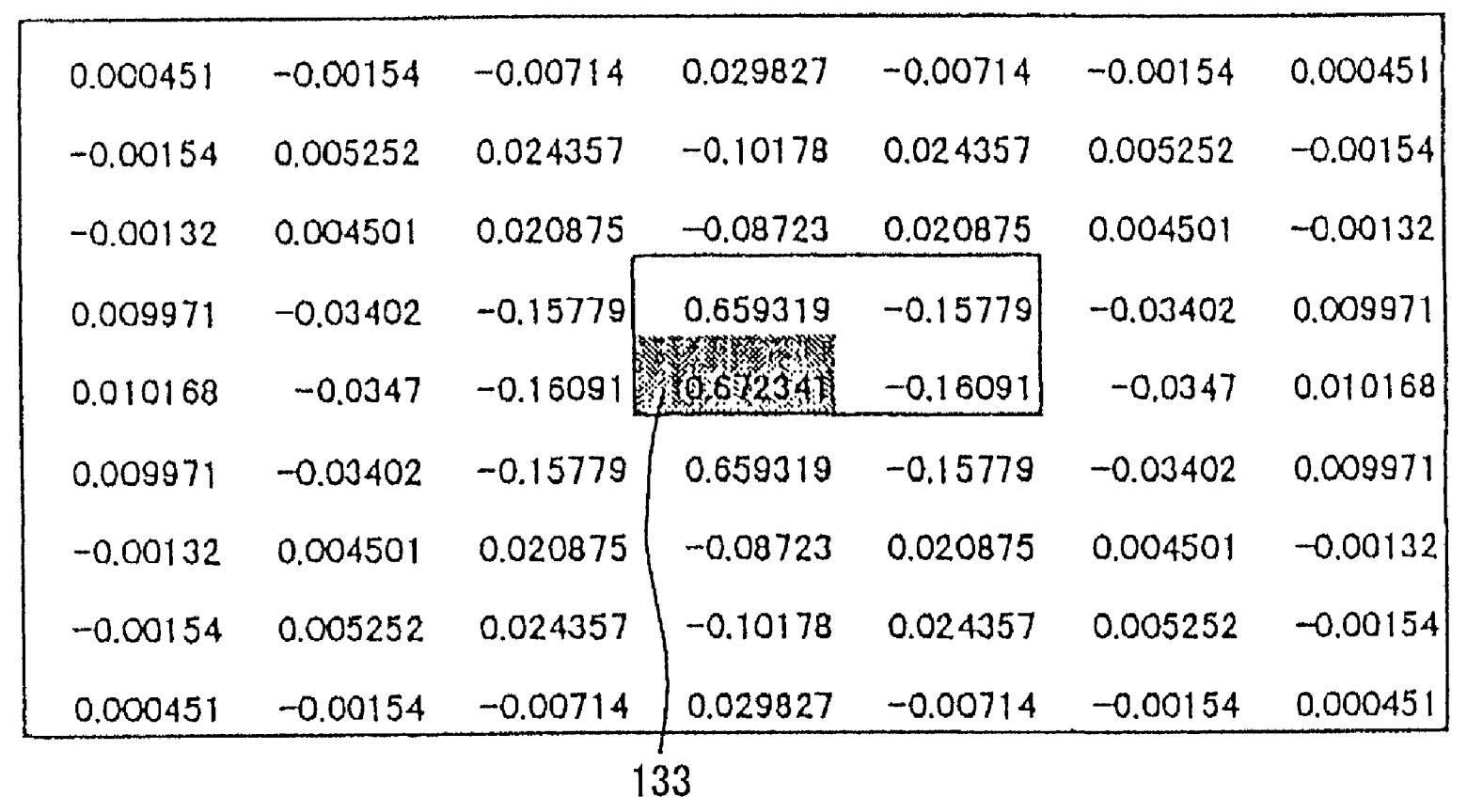

FIGS. 34, 35, 36 and 37 illustrate examples of constants used for 9×7 wavelet inverse transform;

FIG. 38 shows contribution degrees on an error occurring in a pixel at each position, obtained from the constants shown in FIGS. 34 through 37 assuming that the numbers of quantization steps are 1:8:8:16;

FIG. 39 shows contribution degrees on an error occurring in a pixel at each position assuming that the numbers of quantization steps are 1:1:1:1 in case of 9×7 wavelet inverse transform;

FIG. 40 illustrates another example of distribution places predetermined in probabilistic viewpoint according to the third embodiment of the present invention;

FIG. 45 shows the polarities shown in FIGS. 41A through 44B, and, thus directions of contribution in case of 5×3 wavelet inverse transform;

FIG. 46 shows an example of distribution places determined according to the polarities of contribution according to the third embodiment of the present invention;

FIG. 47 shows another example of distribution places determined according to the polarities of contribution according to the third embodiment of the present invention;

FIG. 48 shows another example of distribution places determined according to the polarities of contribution according to the third embodiment of the present invention;

FIG. 49 shows another example of distribution places determined according to the polarities of contribution according to the third embodiment of the present invention;

DETAILED DESCRIPTION OF THE PREFERRED EMBODIMENTS

Figure 1A:
FIGS. 1A through 1E illustrate S-transform.

FIGS. 1A through 1E illustrate S-transform (Smoothing transform), which is one type of orthogonal transform. FIG. 1A shows a set of pixels which is a unit on which S-transform is performed. FIGS. 1B, 1C, 1D and 1E show edges along respective directions for which S-transform detects by components (coefficients) thereof.

S-transform is performed according to the following formulas:

$$LL = (a+b+c+d)/4 \quad (1)$$

$$HL = (a+c)/2 - (b+d)/2 \quad (2)$$

$$LH = (a+b)/2 - (c+d)/2 \quad (3)$$

$$HH = (a-b) - (c-d) \quad (4)$$

Figure 1B:
Figure 1C:
Figure 1D:
Figure 1E:

The formula (1) calculates a low-frequency (direct-current) component (coefficient) LL; the formula (2) provides a high-frequency (alternate-current) component (coefficient) HL detecting a vertical edge, shown in FIG. 1B; the formula (3) provides a high-frequency (alternate-current) component (coefficient) LH detecting a horizontal edge, shown in FIG. 1C; and the formula (4) provides a high-frequency (alternate-current) component (coefficient) HH detecting an oblique edge or line, shown in FIGS. 1D and 1E.

As described above, S-transform is operation in that 2×2 pixels are extracted as a unit for transform from a given image, and thus, the pixel values a, b, c and d thereof are transformed into coefficients LL, HL, LH and HH accordingly. There, the pixel values a, b, c and d may be values on R of RGB, values on G thereof, values on brightness, or values on color difference, and so forth.

Inverse S-transform which calculates the values a through d from the four coefficients LL, LH, HL and HH is performed by the following formulas:

$$a = LL + (HL + LH)/2 + HH/4 \quad (5)$$

$$b = LL - (HL - LH)/2 - HH/4 \quad (6)$$

$$c = LL + (HL - LH)/2 - HH/4 \quad (7)$$

$$d\ 32\ LL - (HL + LH)/2 + HH/4 \quad (8)$$

As mentioned above, the coefficient LL is a low-frequency component, the coefficients HL, LH and HH are high-frequency components, having a large value on vertical edge, horizontal edge and oblique edge, respectively.

In case quantization is performed, the quantization rate on the low-frequency component LL, which has a larger influence on quality of image, is made minimum, while the quantization rates on the high-frequency components, i.e., LH, HL and HH components, are made larger, which has relatively small influence on the quality of image. There, the quantization rate means the degree of reduction on image information through the quantization. For example, when one bit of 8-bit data is cut, and obtains 7 bits as a result, the quantization rate is $2^1=2$. Similarly, when three bits of 8-bit data are cut, and obtains 5 bits as a result, the quantization rate is $2^3=8$.

As a result, the quantization error also becomes the minimum on LL component, while becomes larger on LH, HL and HH components. That is, according to a common compression scheme, error occurring on the right side of each of the formulas (5) through (8) during process of decompression may be regarded as the quantization error on LH, HL and HH components.

Assuming that $\Delta E$ denotes the quantization error on HL, then, as can be seen from the formulas (5) through (8), the polarity (positive/negative) of the error occurring by $\Delta E$ appears in the same direction on 'a' and 'c', while in the reverse direction on 'b' and 'd'. For example, in case $\Delta E$ on HL occurs, each of 'a' and 'c' increases by $\Delta E/2$, while each of 'b' and 'd' increases by $-\Delta E/2$. Then, when some of the original values of a, b, c and d is close to the lower or upper limit of the range before compression, and, also, $\Delta E$ is much larger, the above-mentioned range-over may occur accordingly.

It will now be discussed on the above-mentioned 'to maintain local average' as in the prior art. For example, it is assumed that, as a result of compression and decompression, the pixel value of 'a' becomes 260 exceeding 255 which is the upper limit of the range, and this value is corrected to 255 on the range upper limit. In this case, in order to keep the total of a, b, c and d unchanged before and after the correction, it is necessary to add the value 5 (reduced from the pixel as mentioned above) to one or some of the pixels. This processing will be referred to as 'range-over correction'.

As can be seen from the above-mentioned 'direction' of error appearance, if 'c' is one to be added to, the error on 'c' increases, accordingly. On the other hand, if 'b' or 'd' is one to be added to, the error thereon decreases, accordingly. Thus, according to this logic, the error amount exceeding from 'a' should be added to 'b' or 'd', or both 'b' and 'd', for the purpose of preventing a pixel having borne the error from having then range-over occurring therein. Thus, it is possible to previously determine the pixel(s) which should absorb the range-over amount for each pixel. Similarly, in case 'a' becomes lower than the lower limit of the range, or, in case the quantization error occurs on LH or HH, the same discussion can be applied.

Figure 2A:
FIGS. 2A through 2C illustrate directions among pixels.
Figure 2B:
Figure 2C:
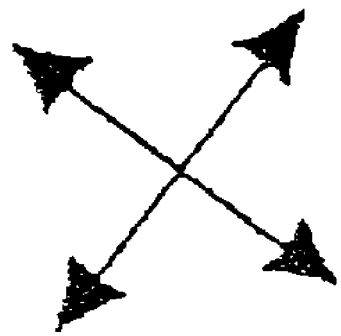

FIGS. 2A, 2B and 2C show explanatory notes on direction between these pixels. As shown in the figures, with respect to the pixel 'a', the directions on the pixels 'b', 'c' and 'd' can be referred to as 'horizontal direction' (see FIG. 2A), 'vertical direction' (see FIG. 2B) and 'diagonal direction' (see FIG. 2C), respectively. From the above-shown discussion, positional relationship between the coefficient on which the quantization error occurs and the pixel which should have the range-over amount added thereto can be as shown below in Table 1:

TABLE 1

| coefficient having quantization error occurring | direction of pixel to have range-over amount added thereto |
| --- | --- |
| HL | horizontal or diagonal |
| LH | vertical or diagonal |
| HH | horizontal or vertical |

However, in each actual case, it is not possible to determine as to which coefficient has quantization error such as to cause range-over. Usually, even it is not possible to determine which coefficient has quantization error occurring therein. Therefore, it is necessary to make processing such as to cope with cases where any coefficient has quantization error occurring therein, or to estimate, by probabilistic manner, as to which coefficient is likely to have quantization error.

For example, in case where the range-over amount is absorbed by a single pixel, the diagonal pixel should be selected according to the above-mentioned table 1 assuming that HL or LH coefficient has quantization error causing the range-over, since the diagonal direction is common between HL and LH in table 1.

However, also according to table 1, selection of diagonal pixel should not be made assuming that HH coefficient has quantization error causing the range-over. However, assuming, in a probabilistic manner, that range-over caused by HH is not likely to occur in comparison to range-over caused by HL or LH, selection of diagonal pixel to bear the range-over amount by considering HL and LH rather than considering HH, is a simple and effective way, for example.

In a common compression manner, in many cases, it can be said that range-over caused by HH is not likely to occur rather than that caused by LH or HL, as will be described now by specific examples.

Case 1: Linear Quantization with the Same Number of Quantization Steps for HL, LH and HH In case the number of quantization steps is same, the amounts of quantization error occurring on HL, LH and HH are made same in probabilistic viewpoint. However, as can be seen from the above-mentioned formulas (5) through (8), error causing range-over is ½ of HL or LH while ¼ of HH. Accordingly, simply, range-over caused by HH should not likely to occur rather than that caused by HL or LH.

Case 2: Compression Made on Natural Image and Non-linear Quantization on HL, LH and HH It is well-known that, in natural images, oblique edges are not likely to occur rather than vertical or horizontal edges.

It is said that this phenomena results from the direction of gravity. This results in a fact that the value on HH is smaller than the value on HL or LH according to the above-mentioned formulas (1) through (4). Although HH is obtained not through division by ½ but directly from pixel values, different from LH or HL which is obtained through division by ½ therefrom, as shown in the formulas (2), (3) and (4), the value on HH is still smaller than the value on HL or LH by the above-mentioned reason actually in general.

Figure 3:
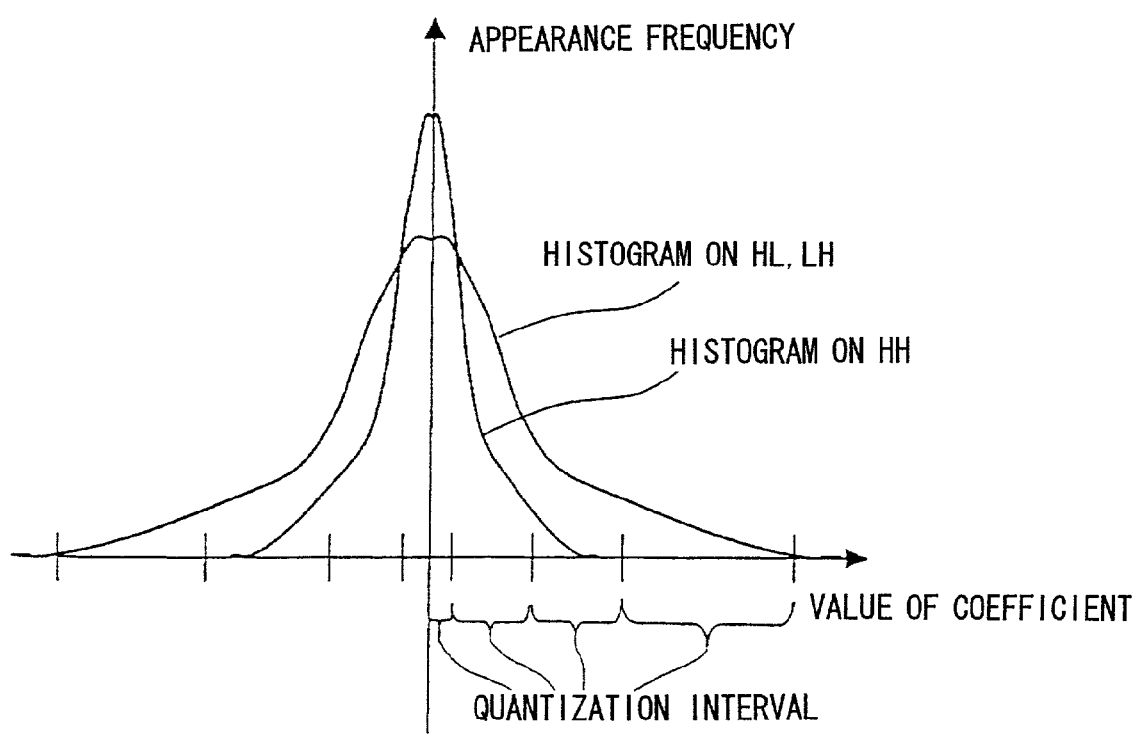
FIG. 3 illustrates histograms on HL, LH and HH values in a natural image.

FIG. 3 shows histograms of the values on HL, LH and HH in a natural image. Since it is common for the value of HH to be small compared with the value of HL or LH, the histograms of the values on HL, LH and HH in a natural image is such that coefficients HH having smaller values occur frequently. In nonlinear quantizing the coefficients appearing such histográms, usually in consideration of frequency of appearances, a rang of smaller values is quantized finely (at narrower quantization intervals) while a range of larger values is quantized coarsely (at wider quantization intervals), as shown in FIG. 3. The quantization error becomes larger as the quantization interval is wider. Therefore, through the above-mentioned nonlinear quantization, the quantization error becomes larger for LH or HL which has a value larger than HH. Accordingly, range-over caused by HH becomes much fewer than range-over caused by HL or LH.

A matter as to which pixel is selected to have the range-over amount added thereto is determined, first, by a probabilistic magnitude relationship on quantization error among LH, HL and HH/2, and, then, second, by the fact that no problem should occur in cases range-over occurs due to any coefficients. The above-mentioned probabilistic quantization error on HH/2 means ½ the quantization error on HH. As the number of quantization steps and quantization intervals are determined by design of a quantizer employed, the probabilistic magnitude relationship on quantization error among LH, HL and HH/2 is also determined by the design of the quantizer accordingly. Thereby, it is also possible to determine a direction in which a pixel to bear the range-over amount is located with respect to a pixel having the range-over occurring therein, at the time of design of the quantizer. Thus, by employing such a probabilistic manner, it becomes not necessary to search for a pixel which should bear the range-over amount.

Accordingly, in consideration of the probabilistic magnitude relationship on quantization error, in particular, mainly of the coefficient probabilistically having the maximum quantization error, the predetermined pixel (direction in which the pixel is located) to bear the range-over amount is obtained as shown in table 2 below:

TABLE 2

| Probabilistic relationship on quantization error | Direction of pixel to first bear range-over amount | Direction of pixel to subsequently bear range-over amount |
|---|---|---|
| HL ≥ LH ≥ HH/2 | Horizontal | Diagonal |
| HL ≥ HH/2 ≥ LH | Horizontal | Diagonal |
| LH ≥ HL ≥ HH/2 | Vertical | Diagonal |
| LH ≥ HH/2 ≥ HL | Vertical | Diagonal |
| HH/2 ≥ HL ≥ LH | Horizontal | Vertical |
| HH/2 ≥ LH ≥ HL | Horizontal | Vertical |

In consideration of both the probabilistic magnitude relationship (two coefficients other than the coefficient probabilistically having the minimum quantization error) and the fact that no problem should occur in cases range-over occurs by any coefficients, the predetermined pixel to bear the range-over amount is obtained as shown in table 3 below:

TABLE 3

| Probabilistic relationship on quantization error | Direction of pixel to first bear range-over amount | Direction of pixel to subsequently bear range-over amount |
|---|---|---|
| HL ≥ LH ≥ HH/2 | Diagonal | Horizontal |
| HL ≥ HH/2 ≥ LH | Horizontal | Diagonal |
| LH ≥ HL ≥ HH/2 | Diagonal | Vertical |
| LH ≥ HH/2 ≥ HL | Vertical | Diagonal |
| HH/2 ≥ HL ≥ LH | Horizontal | Vertical |
| HH/2 ≥ LH ≥ HL | Vertical | Horizontal |

Although the above-mentioned cases are those in which the unit of the amount (for example, R value) undergoing inverse S-transform is the same as the unit of the amount undergoing the range-over correction (i.e., in case only S-transform is performed, and no color-transform into brightness and/or color difference is performed), it is also possible that the same manner is applied to a case, for example, where the unit of amount undergoing inverse S-transform is brightness and/or color difference, while the unit of amount undergoing range-over correction is RGB value.

For example, in case of the art disclosed by Japanese patent publication No. 7-63177, color image data in RGB value is transformed into brightness signal and color-difference signal for every block unit, further, orthogonal transform is performed on a brightness signal, and, thus, coefficients are obtained. After that, the coefficients are quantized. On the other hand, the color-difference signal does not undergo orthogonal transform but merely the representative value on each block is quantized and encoded (compressed). Then, when decompressed, inverse orthogonal transform is performed, then, inverse color transform is performed, and, thus, RGB values are obtained.

It is assumed that this orthogonal transform is S-transform, and, also, average values on color difference are used as the representative values. Then, as for the average values, since they are equivalent to LL component in S-transform, this means that all the brightness and color difference undergo S-transform, and, as for the color difference, all the HL, LH and HH components are discarded (quantization is performed by the infinite number of quantization steps). Further, in case the image to be compressed is a natural image, the HH components has the minimum value on both the brightness and color difference.

The quantization error occurring in the color difference is propagated as being error in RGB as a result during color transform. Accordingly, it is possible to previously determine the pixel to bear the range-over amount occurring in R value or B value, based on the probabilistic magnitude relationship on quantization error among the S-transform coefficients of color difference components.

For example, it is assumed that the color transform is expressed by the following formulas (9) through (11) (called RCT):

$$\text{Brightness } Y=(R+2G+B)/4 \tag{9}$$

$$\text{Color difference } U=R-G \tag{10}$$

$$\text{Color difference } V=B-G \tag{11}$$

The inverse transform thereof is expressed by the following formulas (12) through (14):

$$R = G + U \quad (12)$$

$$G = Y - (U+V)/4 \quad (13)$$

$$B = V + G \quad (14)$$

The above-described color transform is reversible in case solution of the division by 4 is rounded down by using a floor function, or is rounded up by using a ceiling function, and, thus, is called RCT (Reversible Component Transform). In the specification of the present application, the above-mentioned color transform is simply referred to as RCT whether or not it is actually reversible.

In decompression, inverse S-transform is performed on both the brightness and color difference. Therefore, in case the U component is discussed for example, and the U component on each pixel shown in FIG. 1A is referred to as Ua, Ub, Uc and Ud on the pixels a, b, c and d, respectively, the U component on each pixel is expressed by the respective components of S-transform, as follows:

$$Ua = ULL + (UHL + ULH)/2 + UHH/4 \quad (15)$$

$$Ub = ULL - (UHL - ULH)/2 - UHH/4 \quad (16)$$

$$Uc = ULL + (UHL - ULH)/2 - UHH/4 \quad (17)$$

$$Ud = ULL - (UHL + ULH)/2 + UHH/4 \quad (18)$$

Where ULL, UHL, ULH and UHH correspond to LL, HL, LH and LL mentioned above.

As high-frequency components of U component are discarded uniformly as mentioned above, the quantization error on HH component becomes minimum in each of Ua through Ud, same as in the above-made discussion.

Then, inverse RCT is performed on the respective Ua through Ud by the above-mentioned formula (12), into carried Ra through Rd, as follows:

$$Ra = Ga + Ua \quad (19)$$
$$= Ya - (Ua + Va)/4 + Ua$$
$$= Ya + 3/4 Ua - 1/4 Va$$

In a common compression scheme, error occurring in Ya is small compared with error occurring in Ua or Va. It is because the quantization rate on brightness is made lower and the quantization rate on color difference is made higher in order to improve the quality of image obtained through decompression, according to a well-known manner.

Consequently, in error occurring in Ra through the formula (19), the quantization errors on Ua and Va are the majority. When a design is made such that the probable quantization errors on Ua and Va be equal to one another, the error resulting from Ua multiplied by ¾ becomes maximum. However, by considering every coefficient, the quantization error on UHH becomes minimum. The same discussion can be applied also for relationship between V component and B value.

Accordingly, it is possible to determine the pixel to bear the range-over amount occurring in R value or B value based on the probabilistic magnitude relationship on quantization error among the S-transform coefficients obtained from the color difference components.

Further, any case may occur depending on respective particular quantization rates on the brightness data Y, and color difference data U and V (i.e., a basic design concept).

Same as in the above-made discussion, the quantization error from HH component on brightness or HH component on color difference becomes minimum. Accordingly, it is possible to previously determine the pixel to bear the range-over amount occurring in G value based on the probabilistic magnitude relationship on quantization error among S-transform coefficients obtained from brightness component or color difference component.

The above-made discussion can be applied not only to RCT but also well-known YCbCr transform employed by JPEG and so forth by the same manner. Furthermore, as long as inverse S-transform is performed after quantization of S-transform coefficients, the above-made discussion can be applied not only to a case of decompression but also to a case of decoding.

Figure 4:
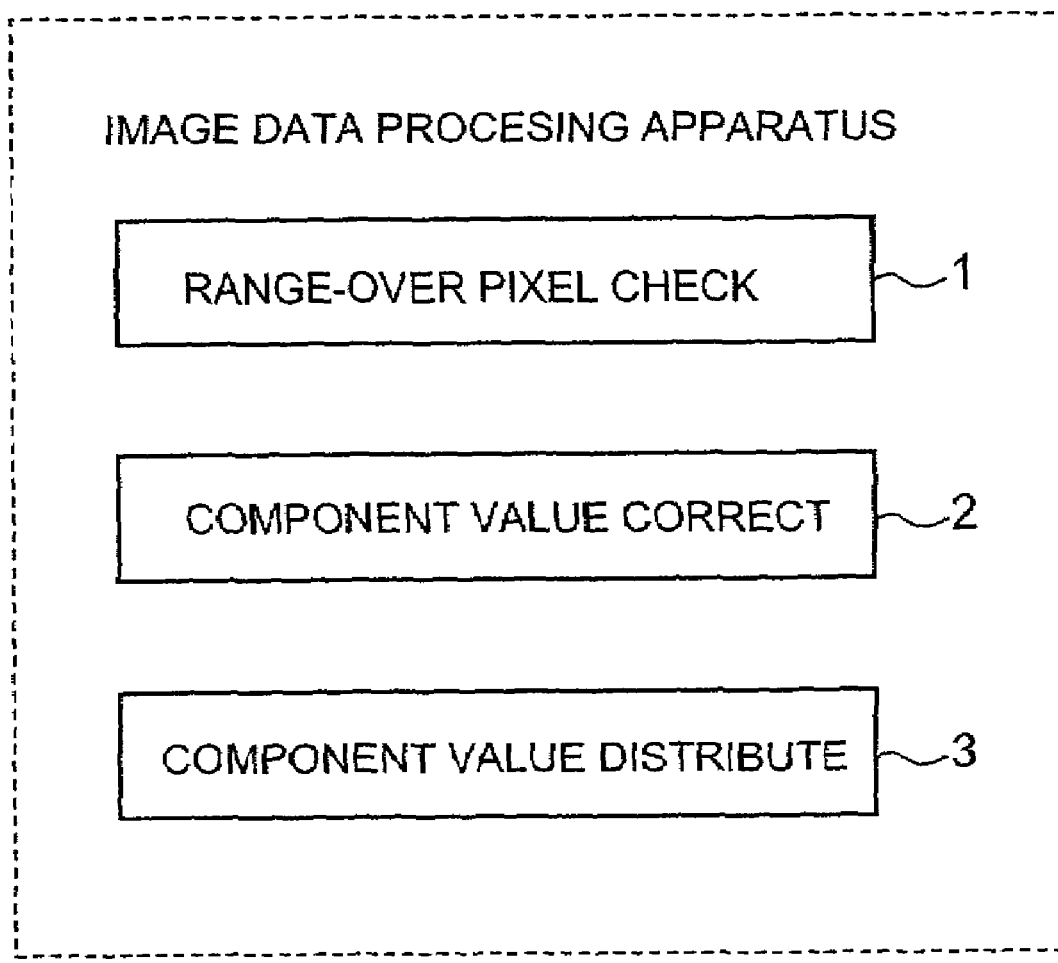
FIG. 4 shows a block diagram of an image data processing apparatus in a first embodiment of the present invention.

FIG. 4 shows a block diagram illustrating an image data processing apparatus according to the present invention.

The image data processing apparatus in a first embodiment of the present invention shown in FIG. 4 processes image data components (for example, the above-mentioned R value, B value, or brightness or color difference value as will be described later) having undergone inverse S-transform, and, includes a range-over pixel check part 1 searching for a pixel having a component value exceeding the upper limit of a predetermined range, a component value correcting part 2 reducing the component value of the pixel so as to make it fall within the predetermined range, and a component value distributing part 3 increasing the component value of a pixel predetermined based on probabilistic magnitude relationship on quantization error among S-transform coefficients LH, HL and HH/2. According to the embodiment of the present invention, it is possible to control change in color tone/hue during inverse S-transform (decompression/decoding) by a simple scheme, in case of range-over from the upper limit, and, thereby, it is possible to perform decompression/decoding with effectively reduced loss in image quality.

In the above-mentioned image data processing apparatus in the first embodiment of the present invention shown in FIG. 4, each part may instead or further perform the following functions. That is, the range-over pixel check part 1 searches for a pixel having a component value below the lower limit of the predetermined range, the component value correcting part 2 increases the component value of the pixel so as to make it fall within the predetermined range, and the component value distributing part 3 reduces the component value of a pixel predetermined based on probabilistic magnitude relationship on quantization error among S-transform coefficients LH, HL and HH/2. According to the embodiment of the present invention having the above-described configuration, it is possible to control change in color tone/hue during inverse S-transform (decompression/decoding) by a simple scheme, in case of range-over from the lower limit, and, thereby, it is possible to perform decompression/decoding with effectively reduced loss in image quality.

Furthermore, the above-mentioned component value distributing part 3 previously determines the pixel to bear the range-over amount in component value based on estimation as to which one of the S-transform coefficients LH, HL and HH/2 has the minimum quantization error.

Thus, when distributing the range-over amount to the predetermined pixel, it is assumed that this pixel has the value within the predetermined range after having the range-over amount distributed thereto. However, due to some reason such as accumulation of error among the coefficients and so forth, the value of the pixel having the range-over amount distributed thereto then has the value which exceeds the upper limit or lower limit of the predetermined range. In such a case, re-distribution or rounding processing, as will be described later, is needed. In each of the above-mentioned tables 2 and 3, 'subsequently bear' means the re-distribution.

For this purpose, in case the pixel having the range-over amount distributed thereto then has the value exceeding the upper limit of the predetermined range, the component value correcting part 2 reduces the component value of the pixel having the range-over amount distributed thereto so as to make it fall within the predetermined range, and, also, the component value distributing part 3 increases a value on a second pixel predetermined based on probabilistic estimation as to which one of the S-transform coefficients LH, HL and HH/2 has the maximum value in quantization error. Thereby, even in case where rang-over occurs repeatedly, it is also possible to control change in color tone/hue during inverse S-transform (decompression/decoding) by a simple scheme, and, thereby, it is possible to perform decompression/decoding with effectively reduced loss in image quality.

Similarly, for the same purpose, in case the pixel having the range-over amount distributed thereto then has the value below the lower limit of the predetermined range, the component value correcting part 2 increases the component value of the pixel having the range-over amount distributed thereto so as to make it fall within the predetermined range, and, also, the component value distributing part 3 reduces a value on a second pixel predetermined based on probabilistic estimation as to which one of the S-transform coefficients LH, HL and HH/2 has the maximum value in quantization error. Thereby, even in case where rang-over occurs repeatedly, it is also possible to control change in color tone during inverse S-transform (decompression/decoding) by a simple scheme, and, thereby, it is possible to perform decompression/decoding with effectively reduced loss in image quality.

Further, the image data processing apparatus in the first embodiment of the present invention performs the above-mentioned rounding processing in case the component value on the above-mentioned second pixel having the value thus increased through the re-distribution, thereby, has the value exceeding the upper limit of the predetermined range, such as to reduce the value thus exceeding the upper limit so as to make the value on the pixel same as the upper limit of the predetermined range (ceiling function) Similarly, the image data processing apparatus in the first embodiment of the present invention performs the rounding processing in case the component value on the above-mentioned second pixel having the value thus reduced through the re-distribution, thereby, has the value below the lower limit of the predetermined range, such as to increase the value below the lower limit so as to make the value on the pixel same as the lower limit of the predetermined range (flooring function).

Figure 5A:
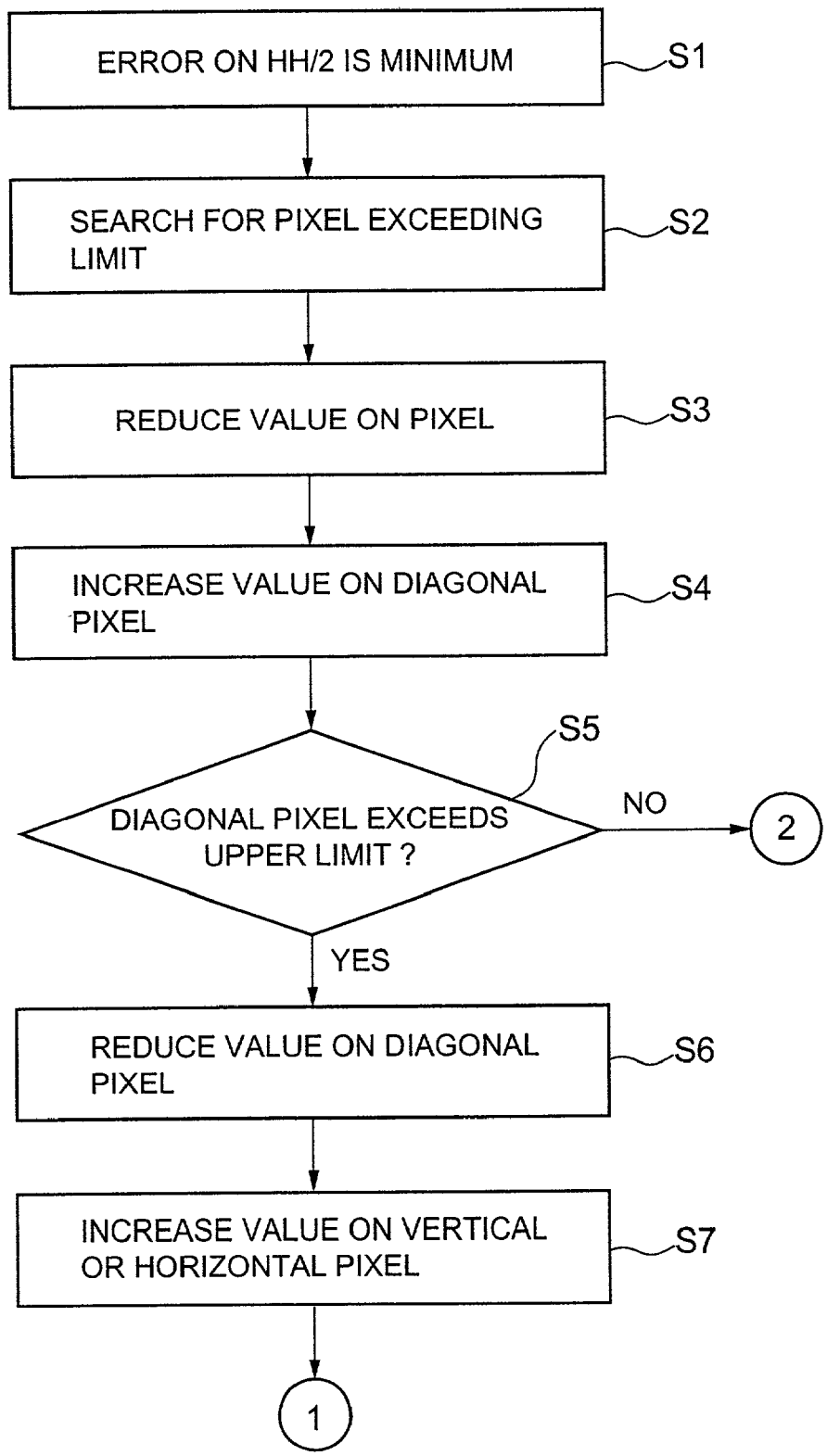
FIGS. 5A, 5B, 6A and 6B show flow charts illustrating operations of the image data processing apparatus shown in FIG. 4.
Figure 5B:
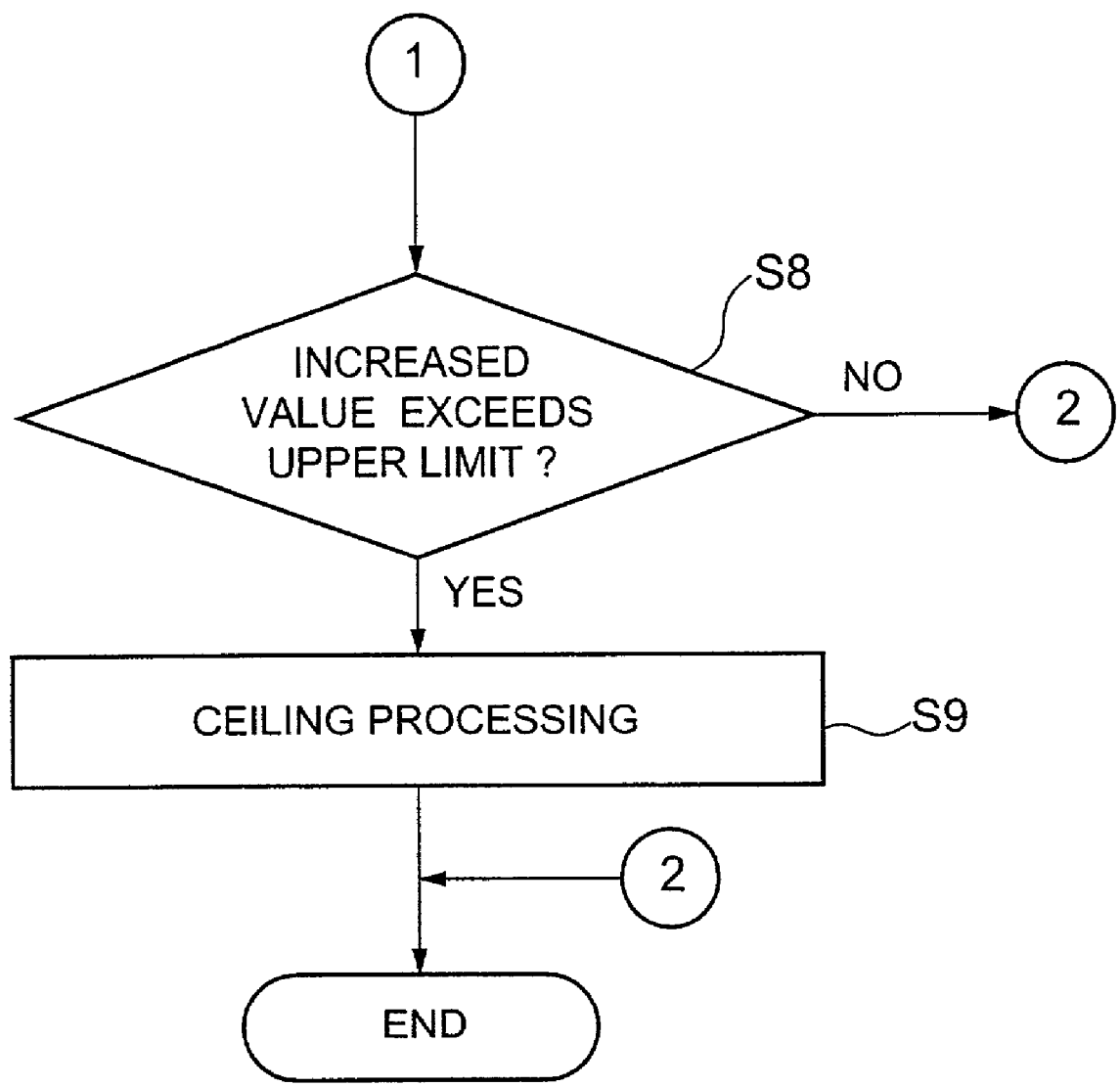

Furthermore, in the image data processing apparatus, the component value distributing part 3 increases the value on the pixel diagonal from the pixel having the value exceeding the upper limit of the predetermined range (in a step S4 of FIG. 5) while the exceeding amount of the pixel having the value exceeding is reduced so as to be made it fall within the predetermined range by the component value correcting part 2 (in a step S3) after searching for the pixel having the value exceeding the upper limit of the predetermined range (in a step S1), in case it can be estimated probabilistically that the quantization error on HH/2 is minimum (in a step S1).

Figure 6A:
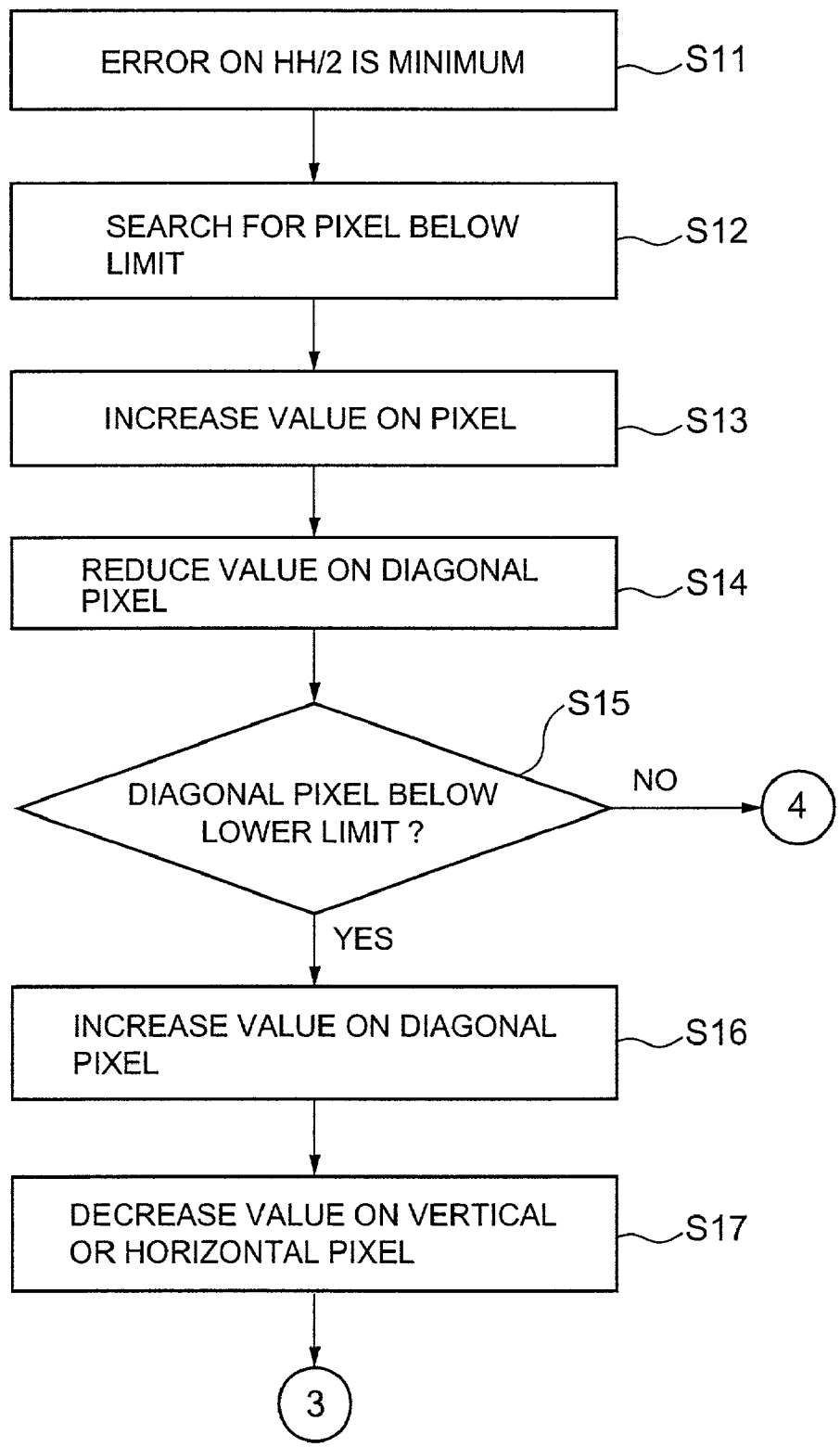
Figure 6B:
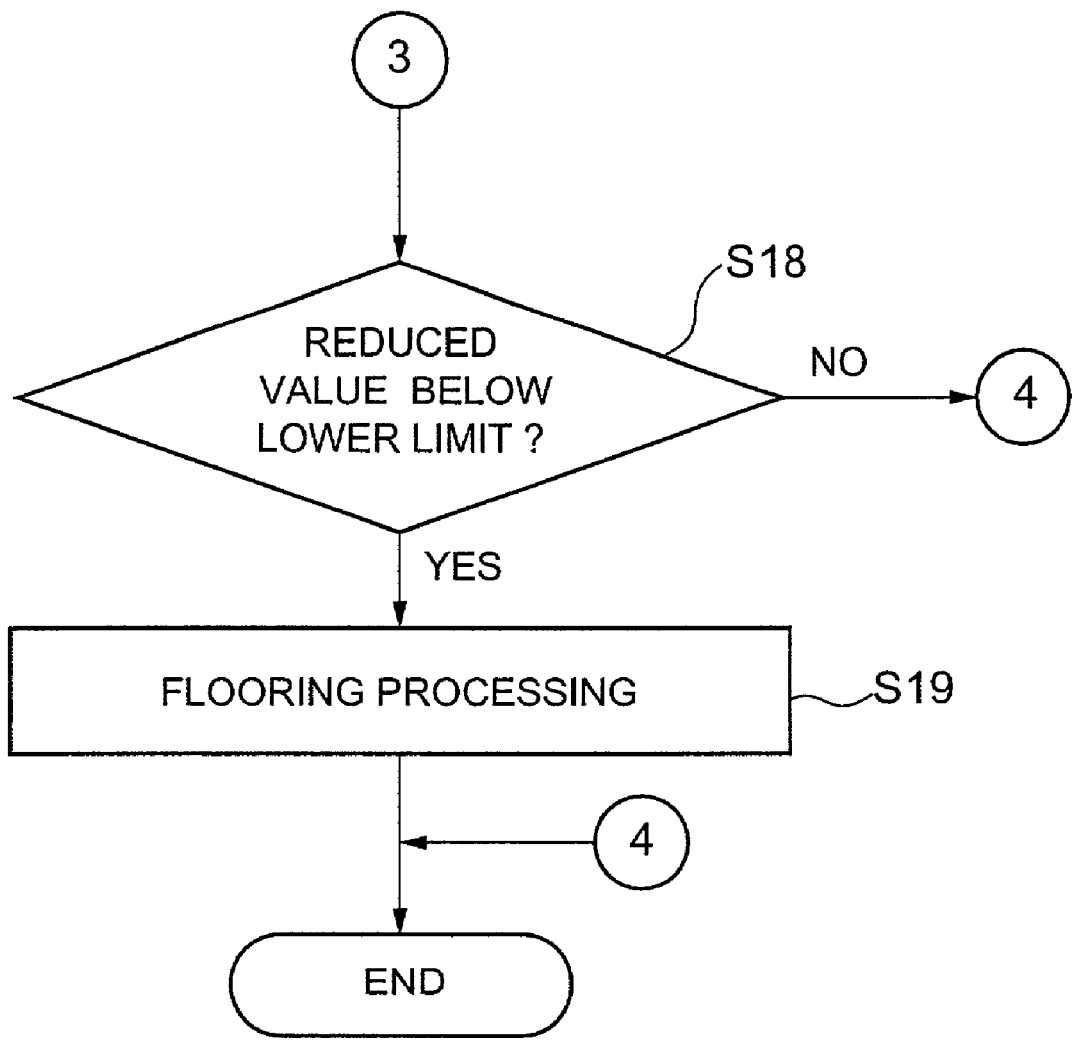

Similarly, in the image data processing apparatus, the component value distributing part 3 reduces the value on the pixel diagonal from the pixel having the value below the lower limit of the predetermined range (in a step S14 in FIG. 6) while the short amount of the pixel having the value below the predetermined range is increased so as to be made it fall within the predetermined range by the component value correcting part 2 (in a step S13), after searching for the pixel having the value below the lower limit of the predetermined range (in a step S12), in case it can be estimated probabilistically that the quantization error on HH/2 is minimum (in a step S11).

Further, in case the value on the pixel thus having the exceeding amount distributed thereto through distribution (in the steps S2–S4) exceeds the upper limit of the predetermined range (in a step S5), the component value correcting part 2 reduces the value of this pixel so as to make it fall within the predetermined range (in a step S6), and, then, the component value distributing part 3 increases the value of the pixel located horizontal or vertical from the pixel from which the component value was reduced (in a step S7).

Similarly, in case the value on the pixel thus having the short amount subtracted therefrom through distribution (in the steps S12–S14) becomes below the lower limit of the predetermined range (in a step S15), the component value correcting part 2 increases the value of this pixel so as to make it fall within the predetermined range (in a step S16), and, then, the component value distributing part 3 reduces the value on the pixel located horizontal or vertical from the pixel from which the component value was increased (in a step S17).

Figure 7:
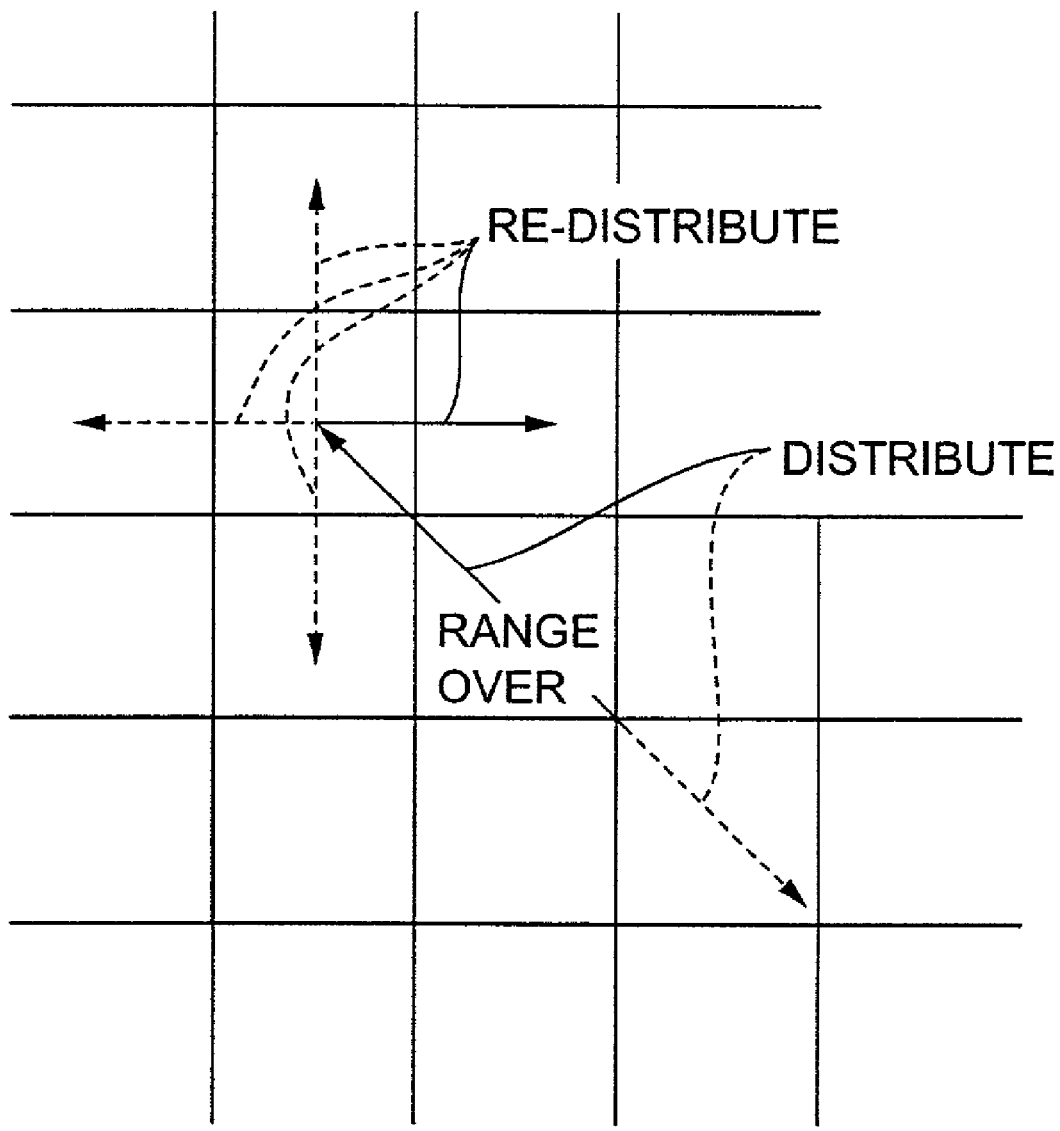
FIG. 7 illustrates pixel positions as range-over distribution places according to the operations shown in FIGS. 5A, 5B, 6A and 6C.

FIG. 7 shows positional relationship among pixel having the value exceeding or below the predetermined range (range-over), pixels to have the range-over amount distributed thereto (added thereto/subtracted therefrom and thereby newly having a range-over amount, and pixels to have the newly range-over amount re-distributed thereto (added thereto/subtracted therefrom).

Further, in the image data processing apparatus in the first embodiment, the value to be subtracted from the range-over pixel (for example, in the step S3) is preferably the same as the value added to the pixel which thus bears the range-over amount (in the step S4). Similarly, the value to be added to the range-over pixel (for example, in the step S13) is preferably the same as the value subtracted from the pixel which thus bears the range-over amount (in the step S14). Thereby, the total amount of the pixel values is maintained.

Further, in the first embodiment, in case the value on the pixel having the range-over amount re-distributed thereto (added thereto) exceeds the upper limit of the predetermined range (for example, Yes in a step S8 of FIG. 5B), the component value on the pixel is made to be the same as the upper limit, thus, so-called ceiling processing is performed in a step S9.

Similarly, in case the value on the pixel having the range-over amount re-distributed again thereto (subtracted therefrom) becomes below the lower limit of the predetermined range (for example, Yes in a step S18 of FIG. 6B), the component value on the pixel is preferably made to be the same as the lower limit, thus, so-called flooring processing is performed in a step S19.

In the above-described first embodiment, as described above, inverse S-transform is performed on the color difference components of image data, and, the above-mentioned component values are of R values, G values or B values. Thus, after the inverse S-transform is performed, inverse color transform is performed so that the RGB values are obtained. In this decoding processing, range-over occurring in RGB values can be simply dealt with by using estimated errors on S-transform coefficients of the color difference components.

However, the present invention in the above-mentioned first embodiment may also be applied to a case where inverse S-transform is performed on the brightness components of image data, and, the above-mentioned components values are of G values. Thus, after the inverse S-transform, inverse color transform is performed so that the G values are obtained. In this decoding processing, range-over occurring in G values can be simply dealt with by using estimated errors on S-transform coefficients of the brightness components.

In general, in order to maintain the image quality through the compression/decompression, the quantization rate on the brightness data is made lower than that on the color difference data. Thereby, as can be seen from the above-mentioned formulas (12) through (14), it can be estimated that quantization error occurring on G value is smaller than that on R or B value. As a result, even when quantization error occurs, the range-over amount is relatively small on G value.

Therefore, in the image data processing apparatus in this embodiment, in case G value exceeds the upper limit of the predetermined or becomes below the lower limit thereof, rounding processing is performed, i.e., the above-mentioned ceiling processing or flooring processing is performed without distribution of the correction value.

Further, in order to make the compression rate on image data variable, it is common that the quantization rate at a time of encoding is made variable, and when the quantization rate is low, it can be estimated that range-over itself is not likely to occur.

Therefore, in the image data processing apparatus in the embodiment, a part of switching as to whether the range-over amount is distributed or merely rounding processing as mentioned above is performed without distribution of the correction value, depending on the quantization rate on the S-transform coefficients, may preferably be provided. Thereby, it is possible to simplify processing performed in case it is estimated that range-over amounts, even if any, have smaller values.

Further, in the image data processing apparatus in the embodiment, a part of switching as to whether the range-over amount is distributed or rounding processing as mentioned above is performed without range-over amount distribution, depending on the quantization rate on the S-transform coefficients, in case where range-over occurs in G value, may preferably be provided. Thereby, it is possible to simplify processing performed in case it is estimated that range-over amounts, even if any, should have smaller values.

The above-described first embodiment of the present invention will now be described in more detail.

Figure 8:
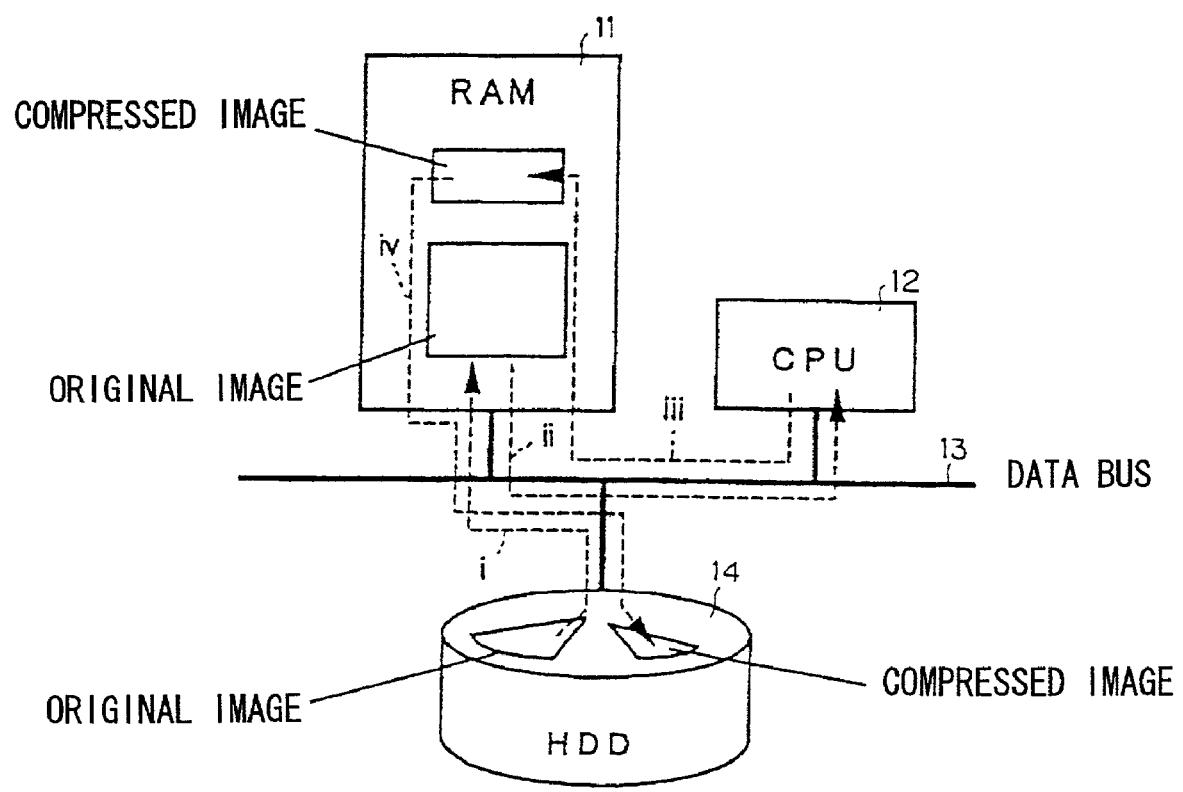
FIG. 8 shows an example of specific configuration of the image data processing apparatus in the first embodiment shown in FIG. 4.

FIG. 8 shows a specific configuration of the image data processing apparatus 1 in the first embodiment of the present invention shown in FIG. 4. The image data processing apparatus 1 includes a RAM 11, a CPU 12, and a HDD 14, which are connected through a data bus 13. This apparatus 1 performs image data compression processing (encoding processing) on an original image.

The original image recorded on the HDD 14 is read onto the RAM 11 by a command from the CPU 12 (i). Then, as a compression step, the CPU 12 reads the image from the RAM 11 partially every time (ii), and compresses it through a common encoding scheme described later. The CPU 12 writes the data after compression onto another area in the RAM 11 (iii). After the entire original image is compressed, the data after the compression is recorded onto the HDD 14 by a command from the CPU 12 (iv).

Further, in the same apparatus, decompression processing (decoding processing) of compressed image is performed by the following operation flow. The compressed image recorded onto the HDD 14 is read by a command from the CPU 12 onto the RAM 11 (inverse of iv). Then, as an decompression step, the CPU 12 reads partially every time the compressed image from the RAM 11 (inverse of iii), and decompresses it by a decoding (decompression) processing according to the present invention. The CPU 12 writes the data after the decompression onto another area in the RAM 11 (inverse of ii). After the entire compressed image is decompressed, the data after the decompression is recorded onto the HDD 14 by a command from the CPU 12 (inverse of i).

Figure 9:
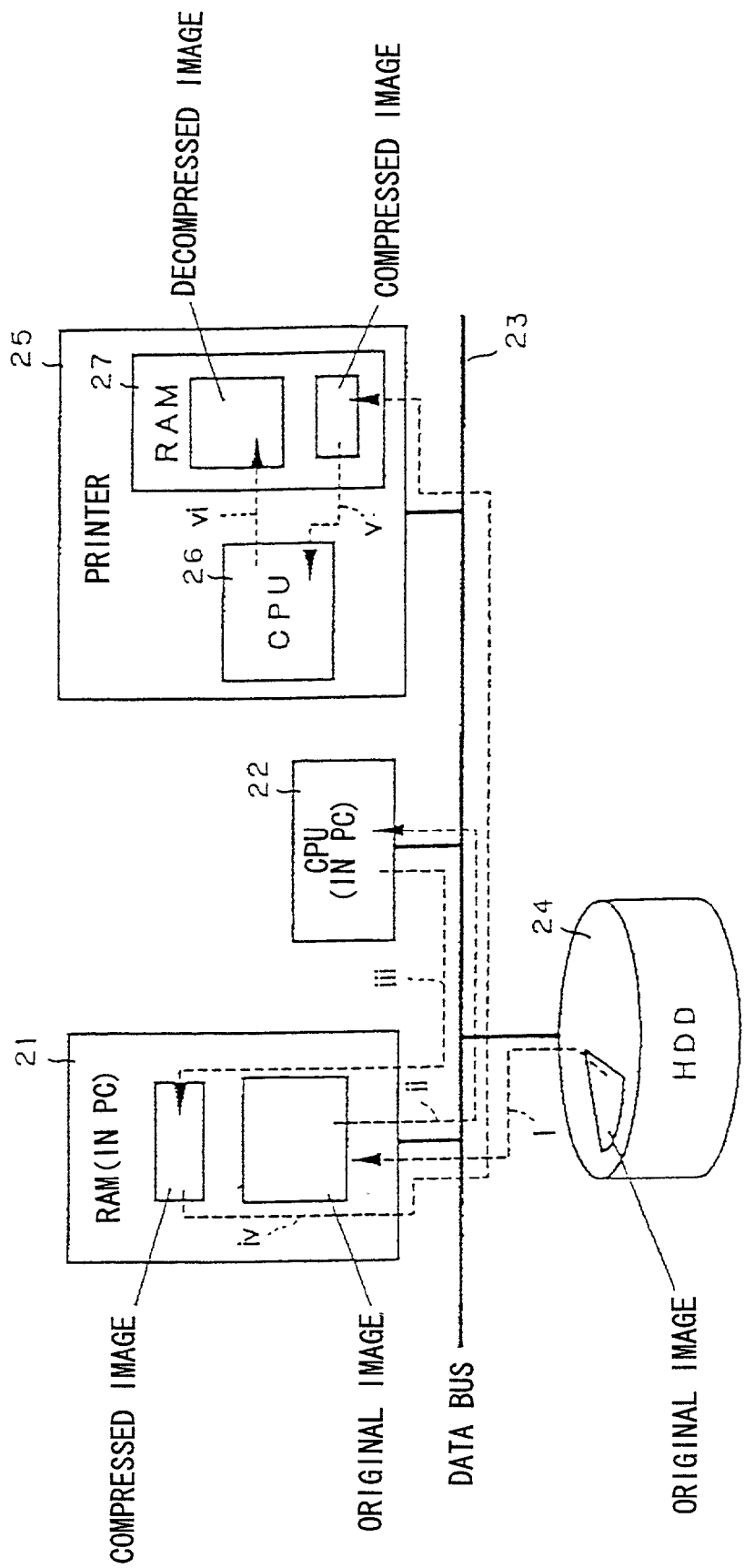
FIG. 9 shows another example of specific configuration of the image data processing apparatus in the first embodiment shown in FIG. 4.

FIG. 9 shows another specific configuration of the image data processing apparatus in the first embodiment of the present invention.

The image data processing apparatus shown in FIG. 9 includes a RAM 21 in PC (Personal Computer), a CPU 22 and a HDD 24 in the PC, and a printer 25, which are connected through a data bus 23. On an occasion of printing-out of an original image, compression of the image is made and the data after the compression is transmitted to the printer 25. Since the amount of transmission data to the printer 25 is thus reduced, the required transmission time is effectively shortened, and even considering the time required for the compression and decompression, a high-speed printing can be achieved.

The original image recorded onto the HDD 24 is read onto the RAM 21 by a command from the CPU 22 (i). Then, as a compression step, the CPU 22 reads the image from the RAM 21 partially every time, and compresses it by a common encoding scheme described later. The CPU 22 writes the data after the compression onto another area in the RAM 21 (iii). The data after the compression is recorded onto a RAM 27 in the printer 25 by a command from the CPU 22 (iv). As an decompression step, a CPU 26 in the printer 25 decompresses the image by a decompression (decoding) processing according to the present invention which reads the data after the decompression (v). The CPU 26 writes the data after decompression onto the RAM 27 (vi). The printer 25 prints out the data after the decompression in a predetermined procedure, after the entire data is decompressed.

Figure 10:
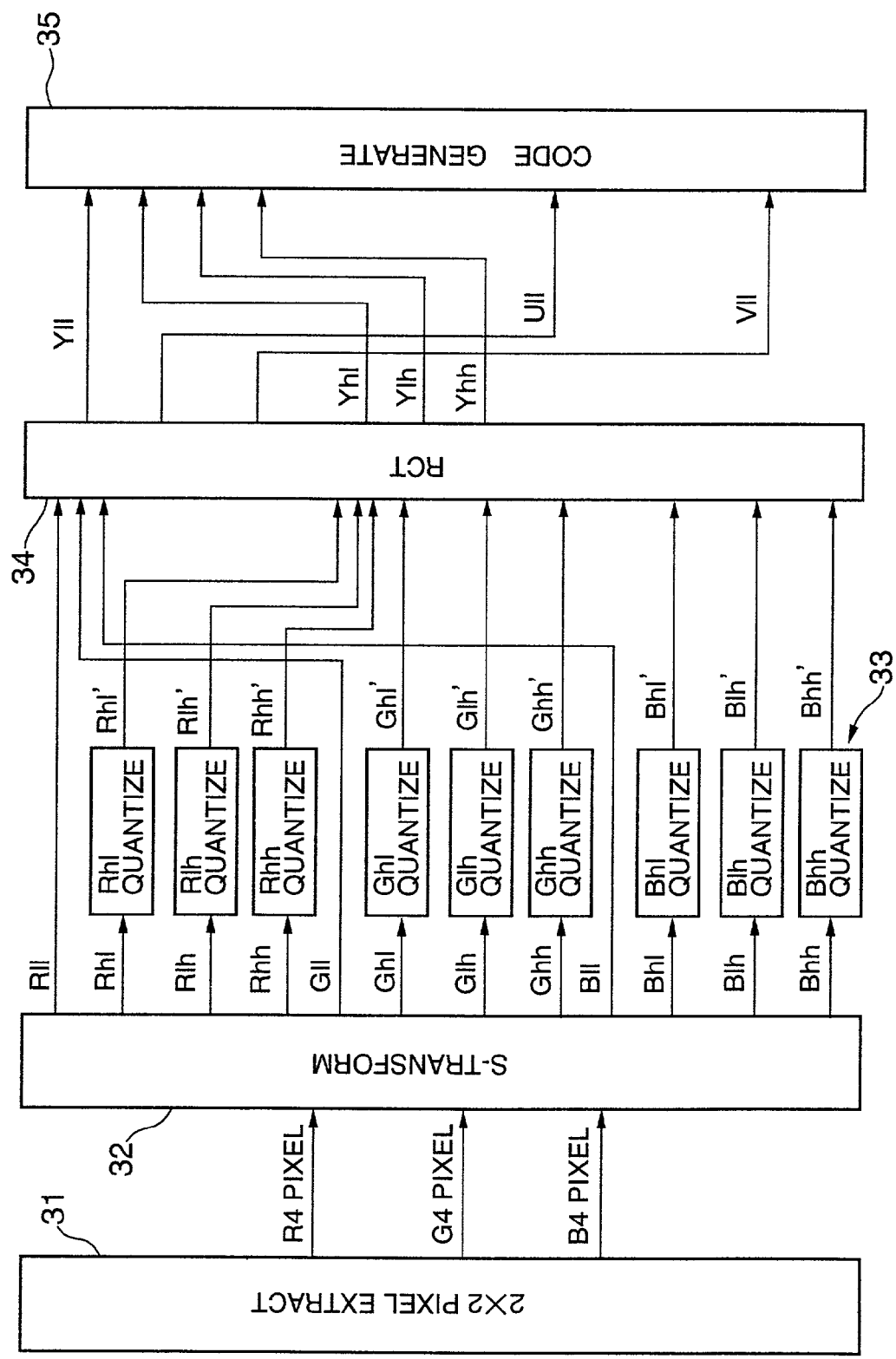
FIG. 10 shows an encoding (compression) part of the image data processing apparatus in the above-mentioned first embodiment.
Figure 12:
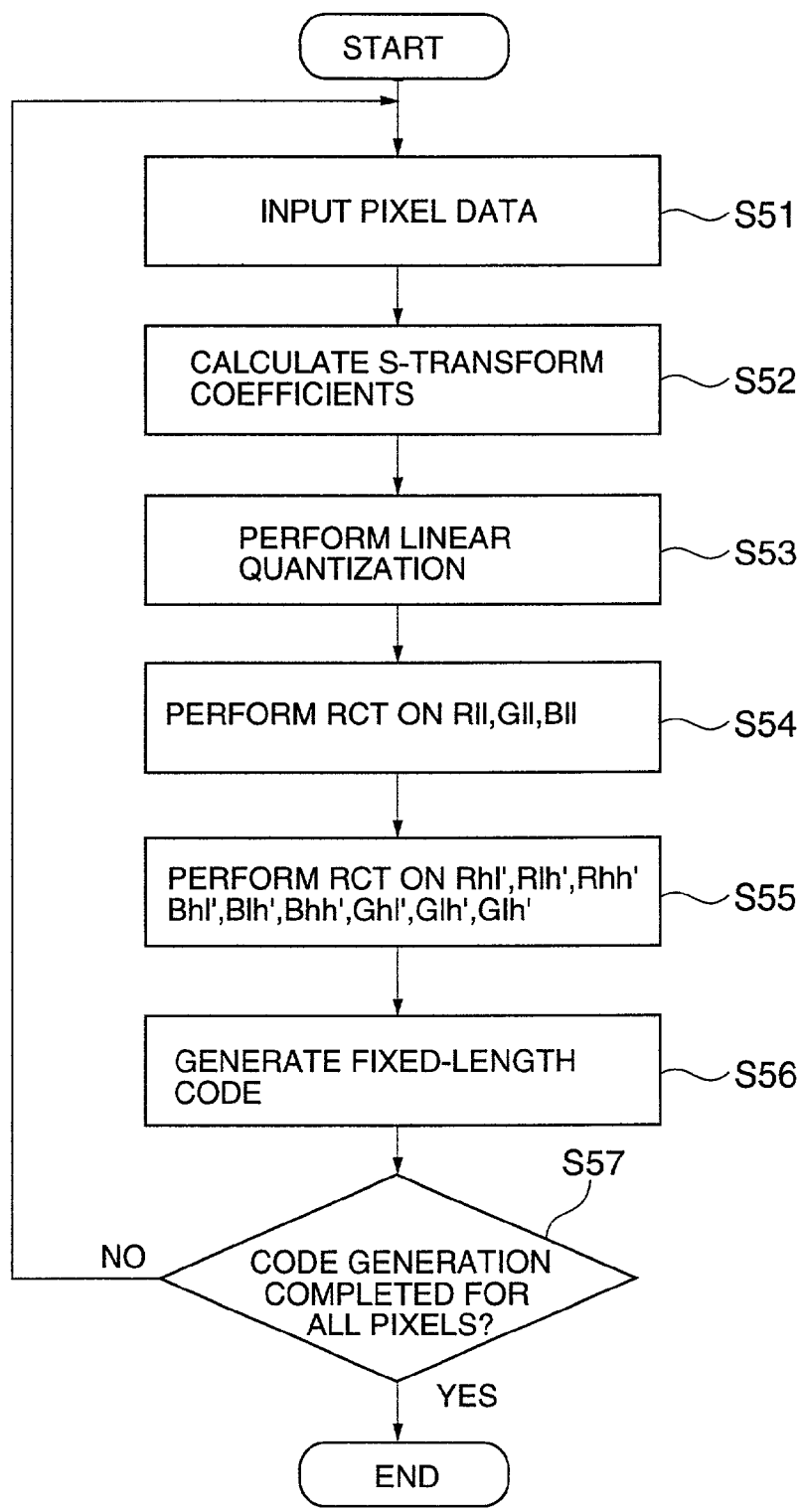
FIG. 12 shows an operation flow chart on the encoding part shown in FIG. 10.

FIG. 10 shows a encoding part (compressing part) in the image data processing apparatus in the first embodiment of the present invention, and FIG. 11 shows an example of a code in a fixed length generated by the encoding part shown in FIG. 10. FIG. 12 shows a flow of operation performed by the encoding part shown in FIG. 10. The operation flow on the encoding part shown in FIG. 10 is performed in the apparatus configuration shown in FIG. 8 or 9.

The flow of processing on the encoding part (compression part) employs the above-described S-transform (Harr Wavelet transform) for classifying given image data into low-frequency components and high-frequency components. According to S-transform, transform operation is performed every 2×2 pixels, shown in FIG. 1A. Then, assuming that the pixel values on 2×2 pixels are a, b, c and d, respectively, this block is transformed into four coefficients, i.e., LL, HL, LH and HH, as described above. In case the pixel values a through d are R values on the respective pixels, the S-transform coefficients are Rll, Rhl, Rlh and Rhh. Similarly, in case of G values, Gll, Ghl, Glh and Ghh are obtained. This same manner is applied in case of B values.

The image data given as RGB data which takes the value in the range between 0 and 255 (8 bits) is input into an S-transform part 32 by a 2×2-pixel extracting part 31 per 4 pixels (in a step S51). In the S-transform part 32, transform by the above-mentioned formulas (1) through (4) is performed, and the 12 coefficients of Rll, Rhl, Rlh, Rhh, Gll, Ghl, Glh, Ghh, Bll, Bhl, Blh, and Bhh are calculated and held (in a step S52). Three direct-current components, Rll, Gll, and Bll, are input into an RCT (Reversible Component Transform) part 34 without being quantized, and while the other alternate-current components are made to pass through a quantization part 33, and, then, they are input into the RCT part 34.

The quantization part 33 performs linear quantization for 2 bits on all of Rhl, Rlh, Rhh, Bhl, Blh, Bhh, Ghl, Glh, and Ghh into Rhl', Rlh', Rhh', Bhl', Blh', Bhh', Ghl', Glh', and Ghh', which are then held (in a step S53). This manner of quantization corresponds to the above-mentioned case 1 with regard to the probabilistic relationship on quantization error.

The RCT part 34 performs calculation of Yll, Ull and Vll from Rll, Gll, and Bll through RCT, and are held (in a step S54). Furthermore, Yhl, Ylh, and Yhh are calculated from Rhl', Rlh', Rhh', Bhl', Blh', Bhh', Ghl', Glh' and Ghh' generated by quantization in the step S53, and are held (in a step S55). Here, although even LL through HH are generated on the brightness data Y, in order to improve the compression rate, only LL is generated on the color difference data U and V. This manner also corresponds to the above-mentioned case 1 with regard to probabilistic relationship on the quantization error occurring in the S transform coefficients on color difference (same as the above-mentioned scheme disclosed by Japanese patent publication No. 7-63177). Further, also the probabilistic magnitude relationship on quantization error in S-transform coefficients on brightness data corresponds to the above-mentioned case 1.

The respective YUV coefficients are input to the code generating part 35, are connected so that the fixed-length code 40 of 4 pixels shown in FIG. 11 is generated (in a step S56). This fixed-length code 40 has a configuration such that Yll, Yhl, Ylh, Yhh, Ull, and Vll have fixed lengths of 8, 7, 7, 8, 9 and 9 (bits), respectively. Processing is continued until code generation is completed for all the pixels (in a step S57).

Although the order between S transform and color transform (RCT) is reverse from that on the scheme disclosed by Japanese patent publication No. 7-63177, and, also, the position of the quantization part is different therefrom, it is obvious that the present invention may be applied regardless of the order/position mentioned above. .

Figure 13:
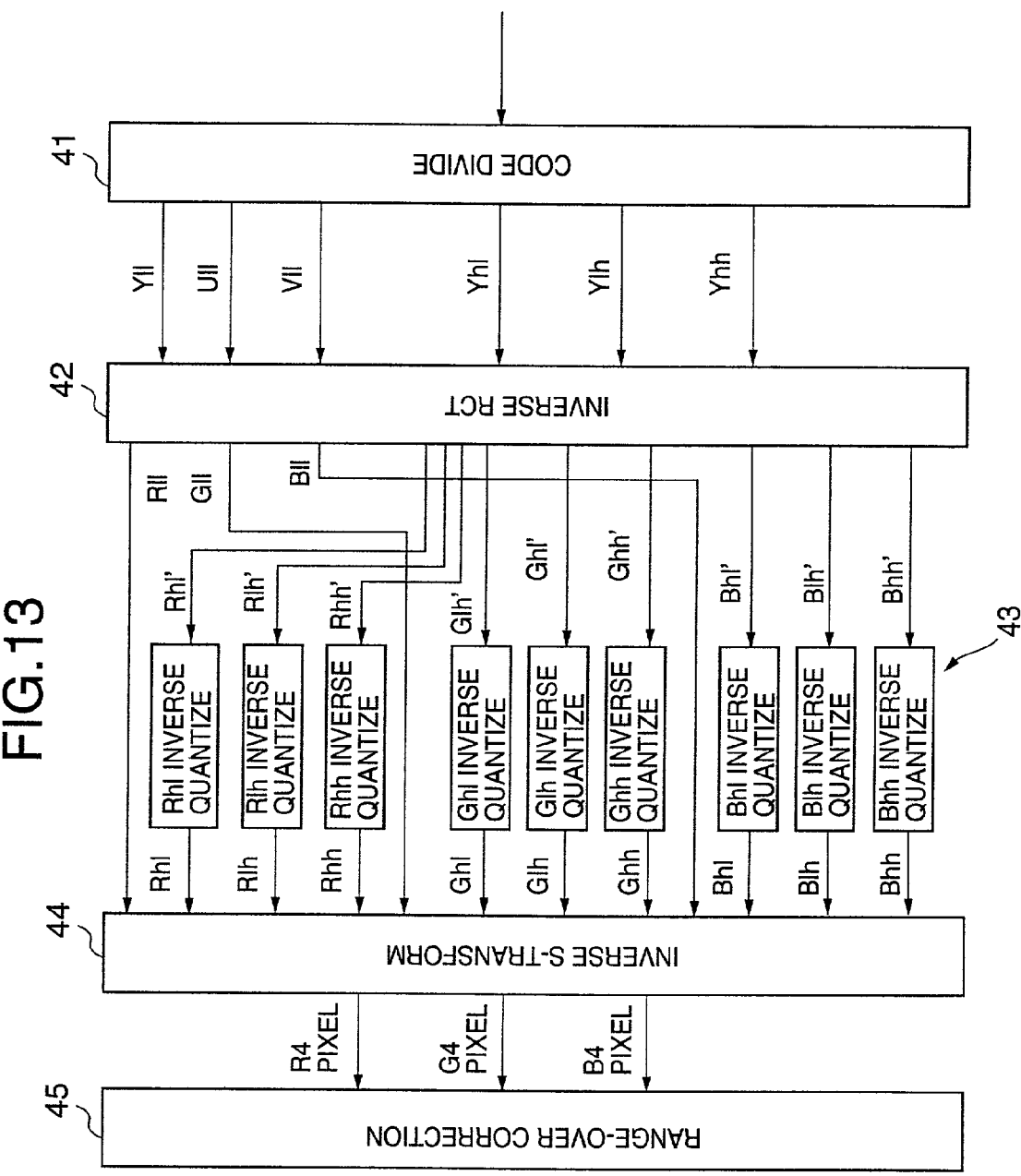
FIG. 13 shows a decoding (decompression) part of the image data processing apparatus in the first embodiment.
Figure 14:
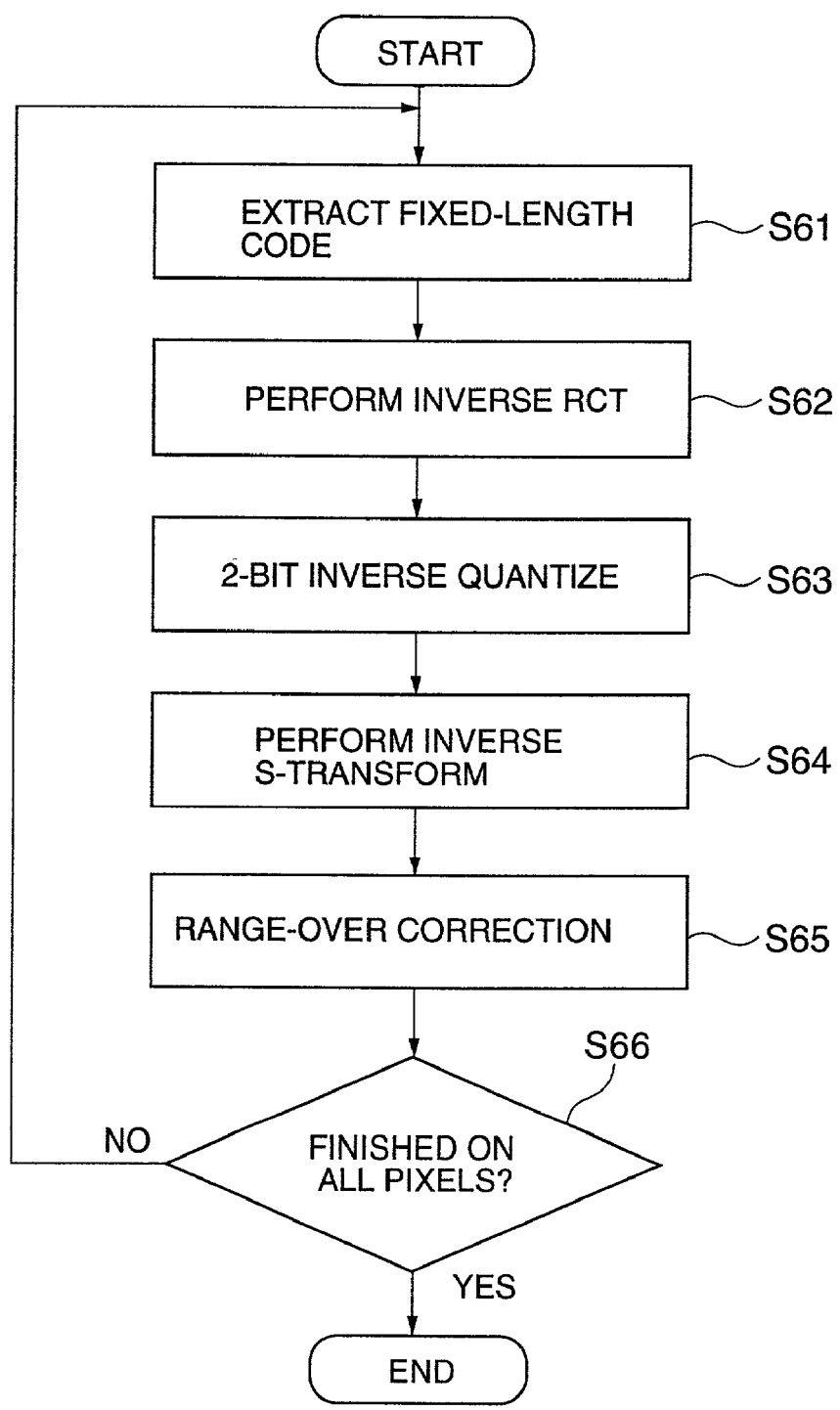
FIG. 14 shows an operation flow chart on the decoding part shown in FIG. 13.

FIG. 13 shows a block diagram of a decoding part (decompressing part) in the image data processing apparatus in the first embodiment. FIG. 14 shows an operation flow chart of the decoding part shown in FIG. 13.

In a code division part 41, the image data Yll, Yhl, Ylh, Yhh, Ull, and Vll for 4 pixels is extracted from the fixed-length code 40 obtained through the encoding process described above with reference to FIGS. 10, 11 and 12 (in a step S66). Then, by an inverse RCT part 42, Rll, Gll, Gll, Rhl', Rlh', Rhh', Bhl', Blh', Bhh', Ghl', Glh', and Ghh' are generated and held (in a step S62). Then, in an inverse quantization part 43, 2-bit inverse quantization is performed on the coefficients other than LL, and thereby, Rhl, Rlh, Rhh, Ghl, Glh, Ghh, Bhl, Blh and Bhh are obtained (in a step S63). Then, in an inverse S-transform part 44, inverse S transform is performed on each coefficient, and, thereby, R, G, and B for 4 pixels, i.e., Ra, Rb, Rc, Rd, Ga, Gb, Gc, Gd, Ba, Bb, Bc, and Bd, are calculated (in a step S64), which are then input into a range-over correcting part 45, which performs range-over correction operation (in a step S65).

These processes are repeated until all the pixels have been processed (decoded). The range-over correction part 45 includes the above-mentioned range-over pixel check part 1, component value correcting part 2, and component value distributing part 3 shown in FIG. 4.

Figure 15:
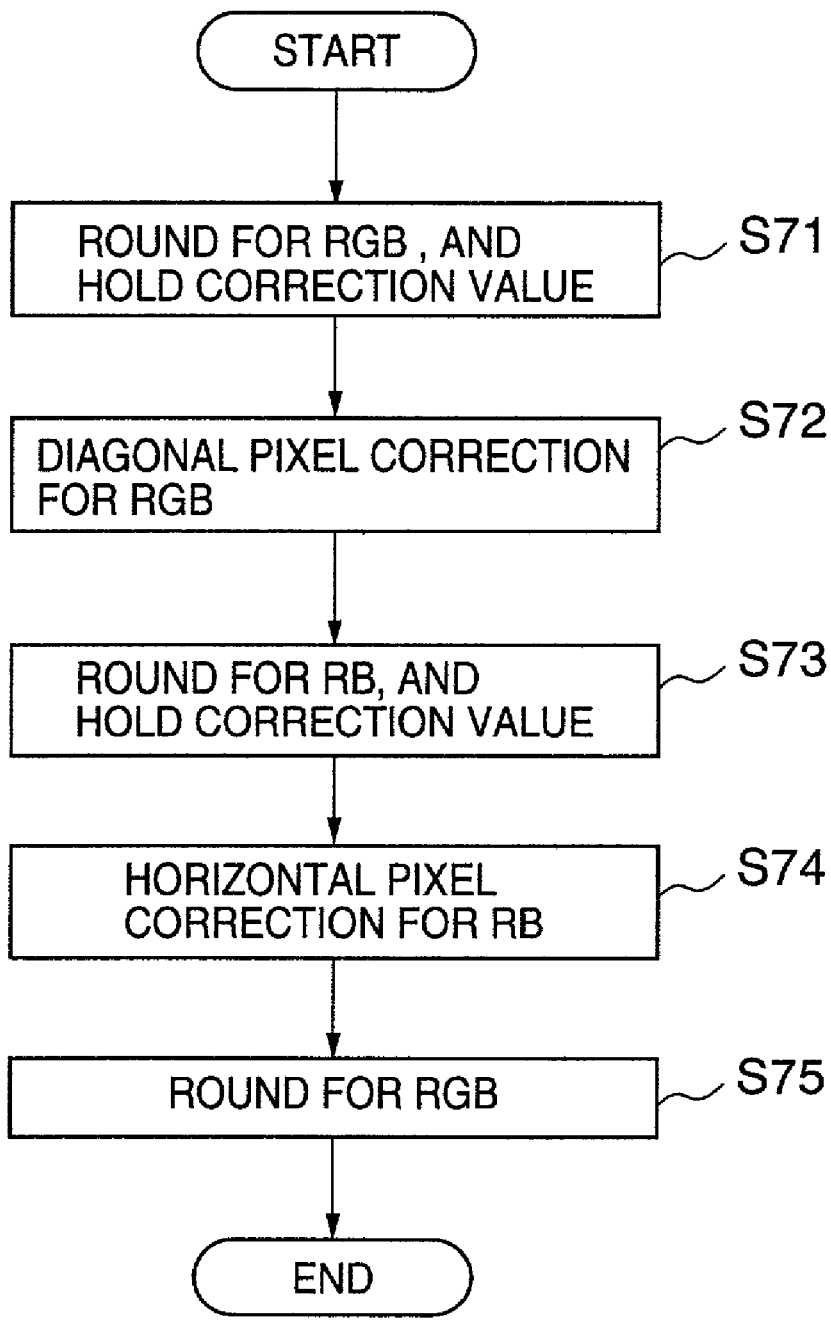
FIG. 15 shows an operation flow chart illustrating range-over correction processing according to the image data processing apparatus in the first embodiment.

FIG. 15 shows an operation flow chart on the range-over correction processing in the image data processing apparatus in the first embodiment of the present invention, and FIGS. 16 through 19 show operation flow charts on the processing shown in FIG. 15 in detail.

Figure 16:
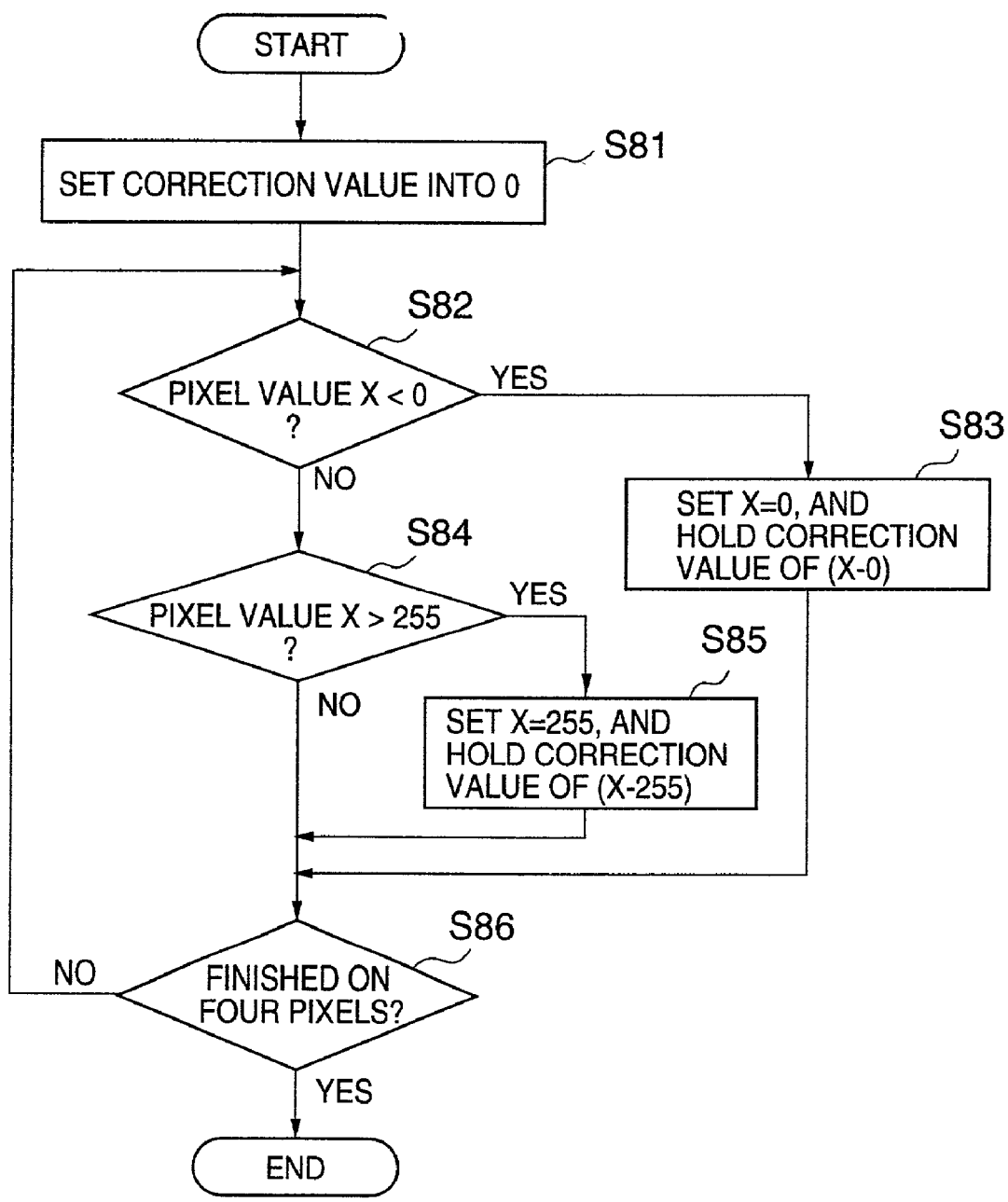
FIGS. 16 through 19 show operation flow charts illustrating the processing shown in FIG. 15 in more detail.

In this case of the operation, the amount of correction on each pixel is calculated as shown in FIG. 16 for all RGB components, and is held, in a step S71. As shown in FIG. 16, amount of correction=range-over amount Then, as described above, as to the quantization error, the above-mentioned case 1 is assumed. Accordingly, the error on HH is estimated as being minimum. Further, taking into consideration of coping with errors on both HL and LH, the range-over amount (correction amount) is added to a diagonal pixel in a step S72. This means that the middle column in the above-mentioned table 3 is applied.

Then, after that, as the above-mentioned rounding processing is performed only on G, the amount of correction is calculated only for R and B in a step S73, and the amount of correction is added to a horizontally-adjacent pixel in a step S74. This means that, in the middle column in the table 3 is applied as mentioned above, and, also, re-distribution is made in a horizontal direction (quantization error on HL is first regarded). Then, finally the rounding processing is performed in a step S75.

Then, with reference to FIG. 16, an operation flow of the rounding and the correction amount holding processing will now be described.

First, each of the amounts of correction on all the positions a, b, c, and d is set to 0 (in a step S81). Then in a step S82, when the component value x is less than 0, the value is set such that x=0, the relevant position (a through d) and the correction amount (x−0) are held in a step S83. When the component value x is larger than 255 in a step S84, the value is set such that x=255, and the relevant position (a through d) and the correction amount (x−255) are held (in a step S85). This processing is repeated on x for the 4 pixels a through d (in a step S86).

Figure 17:
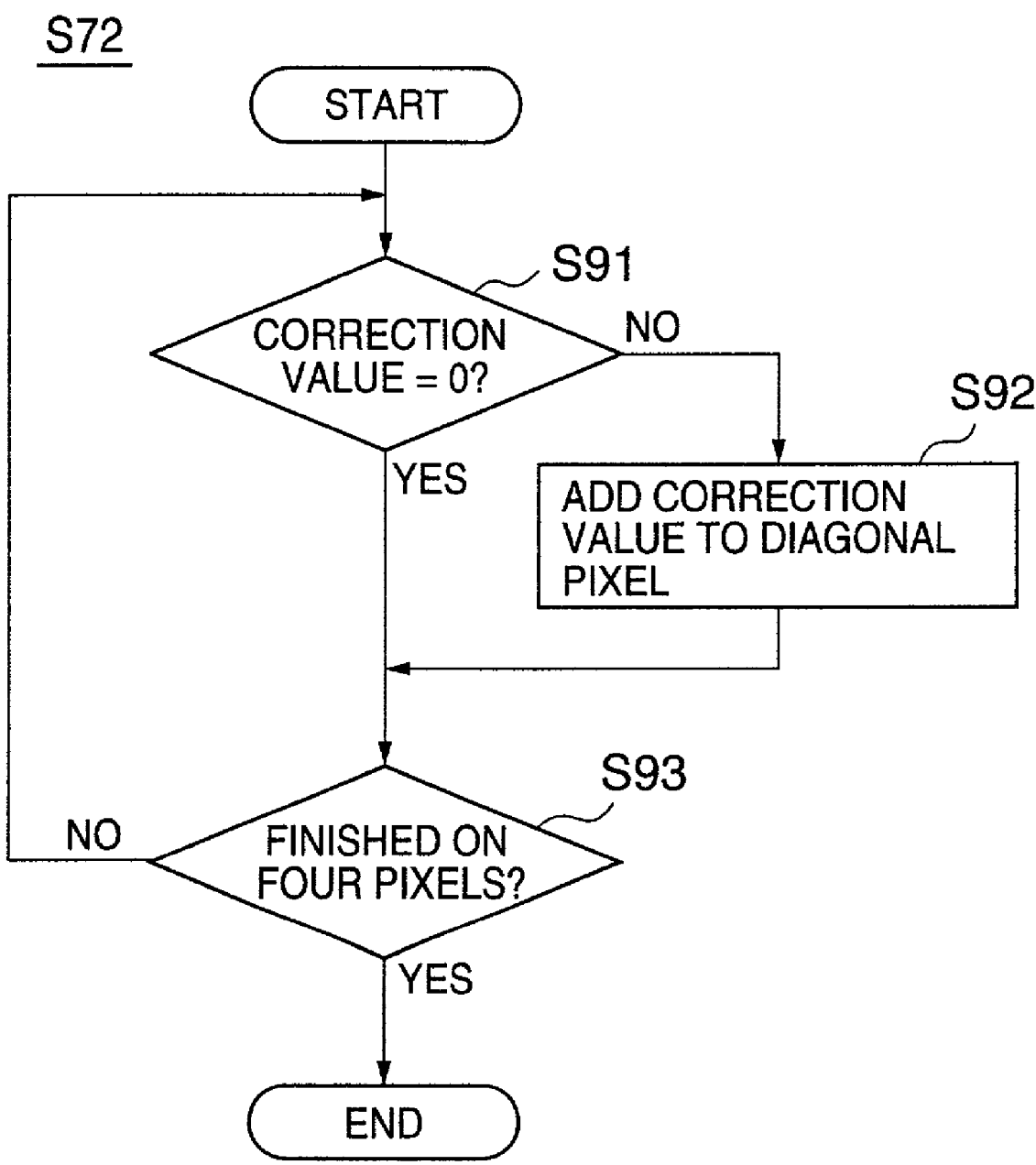

The flow of above-mentioned diagonal position correction processing will now be described with reference to FIG. 17.

First, it is determined whether or not the amount of correction is 0 in a step S91. When the amount of correction is not 0, a step S92 is performed, and the amount of correction is added to the component value on the diagonally-adjacent pixel. This processing is repeated on the amount of correction for the 4 pixels (a through d) in a step S93.

Figure 18:
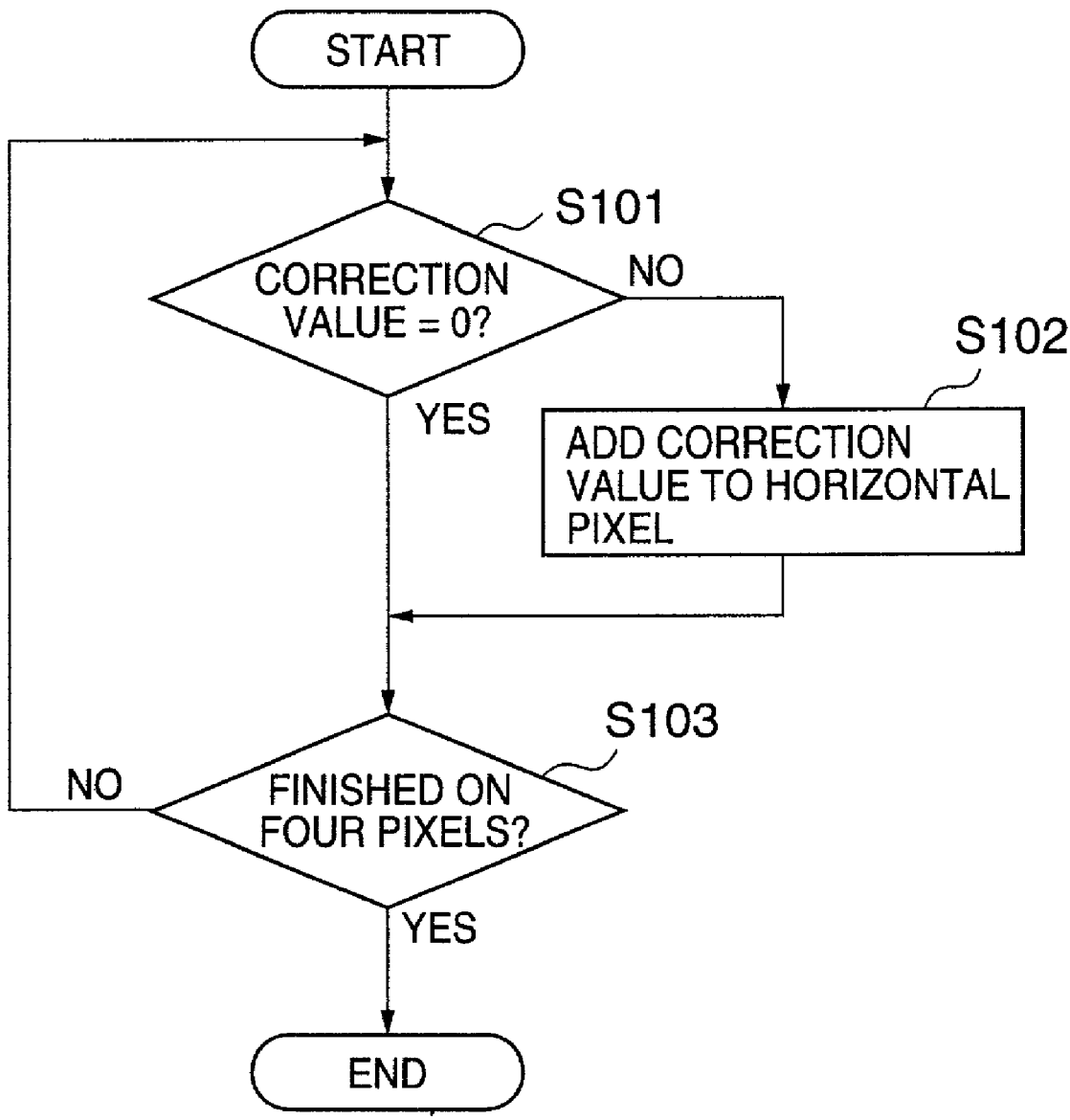

The flow of above-mentioned horizontal position correction processing will now be described with reference to FIG. 18.

First, it is determined whether or not the amount of correction is 0 in a step S101. When the amount of correction is not 0, the step S102 is performed, and the amount of correction is added to the component value on a horizontally-adjacent pixel. This processing is repeated on the amount of correction for the 4 pixels (in a step S103).

Figure 19:
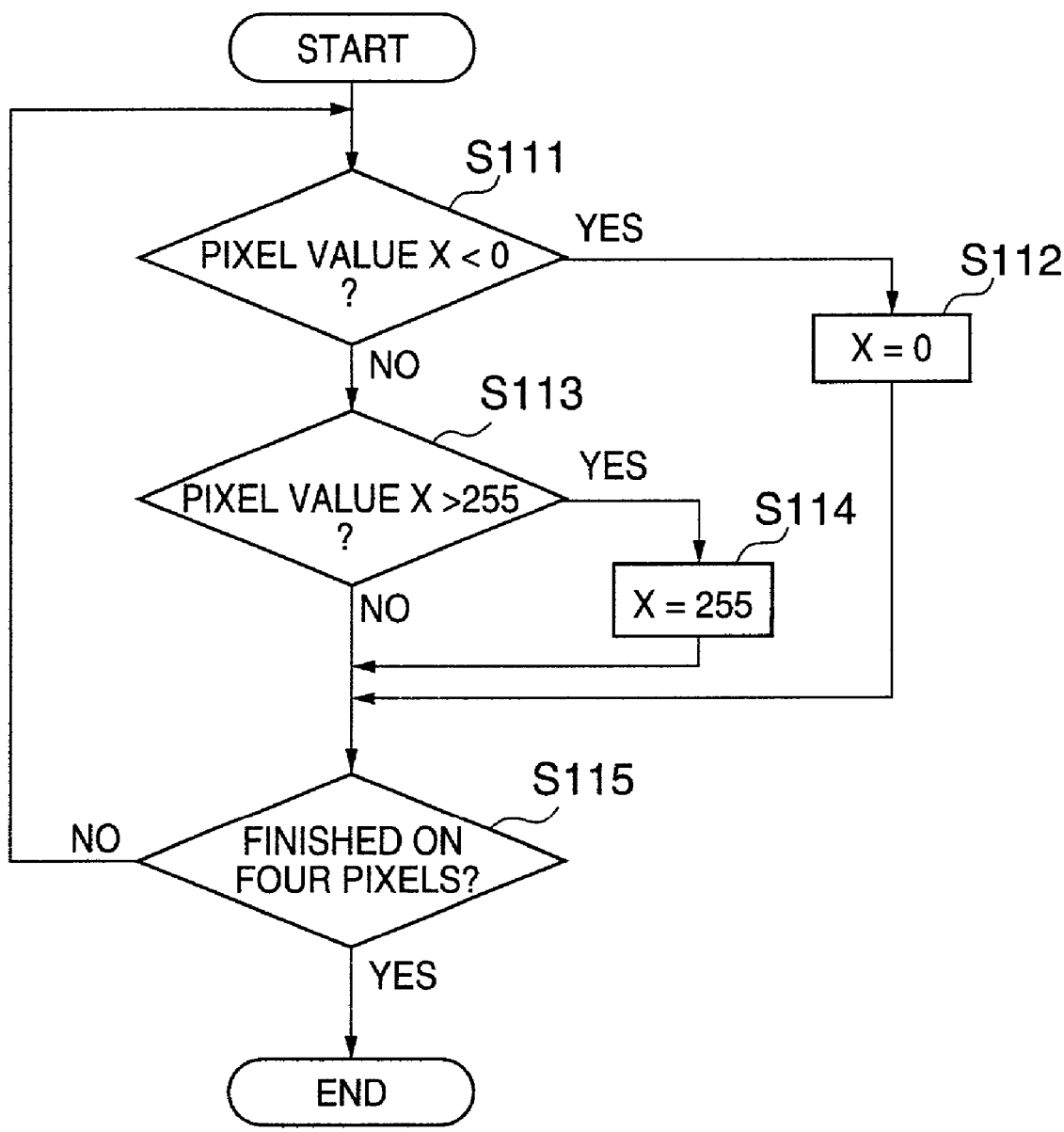

An operation flow of the above-mentioned rounding processing will now be described with reference to FIG. 19.

First, when the component value x is less than 0 in a step S111, it is set such as x=0 in a step S112. When the component value x is larger than 255 in a step S113, it is set such that x=255 in a step S114. Then, this processing is repeated on x for the 4 pixels (in step S115).

Figure 20:
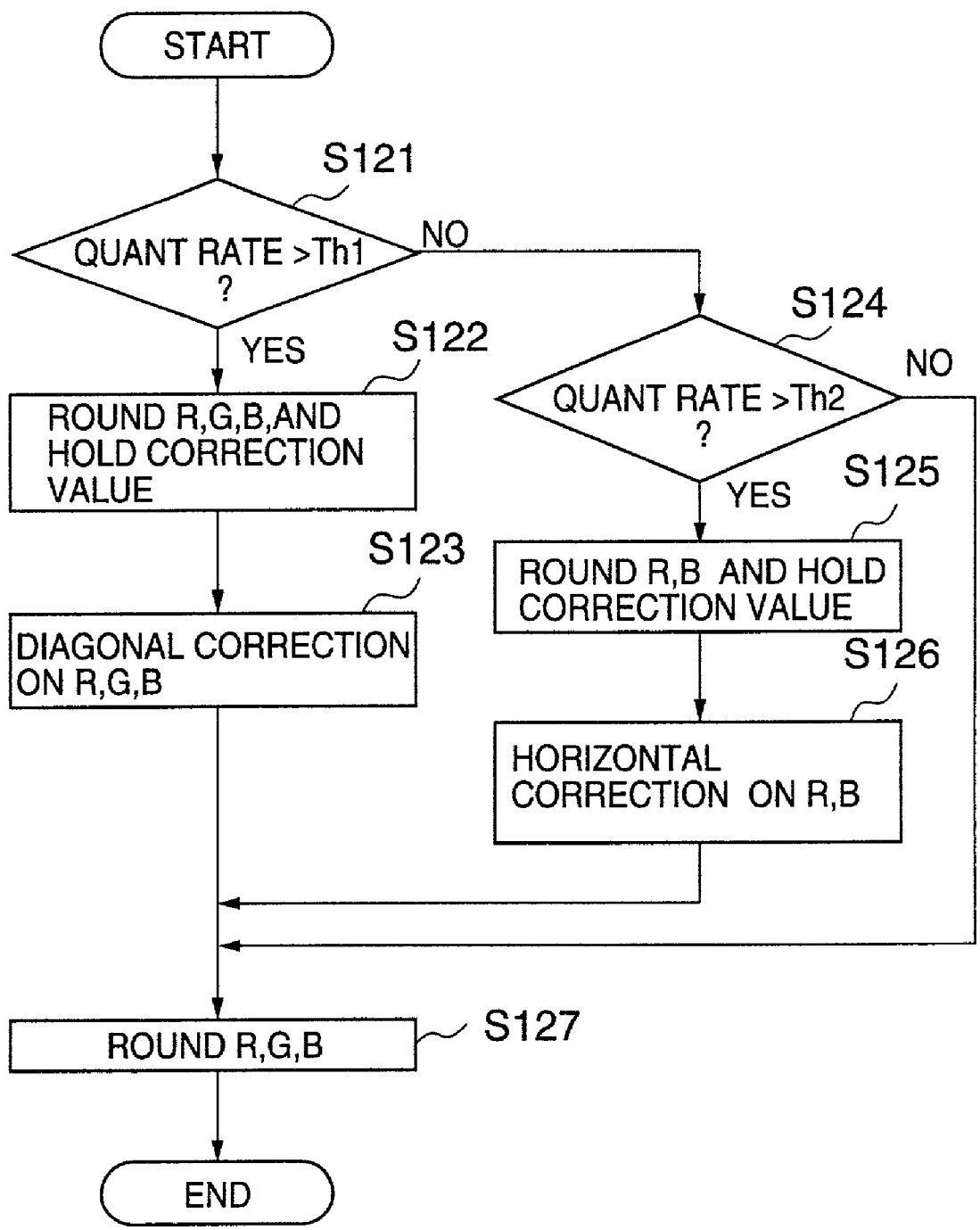
FIG. 20 shows an operation flow chart illustrating range-over correction processing according to the image data processing apparatus in a second first embodiment (variant of the first embodiment) of the present invention.
Figure 21:
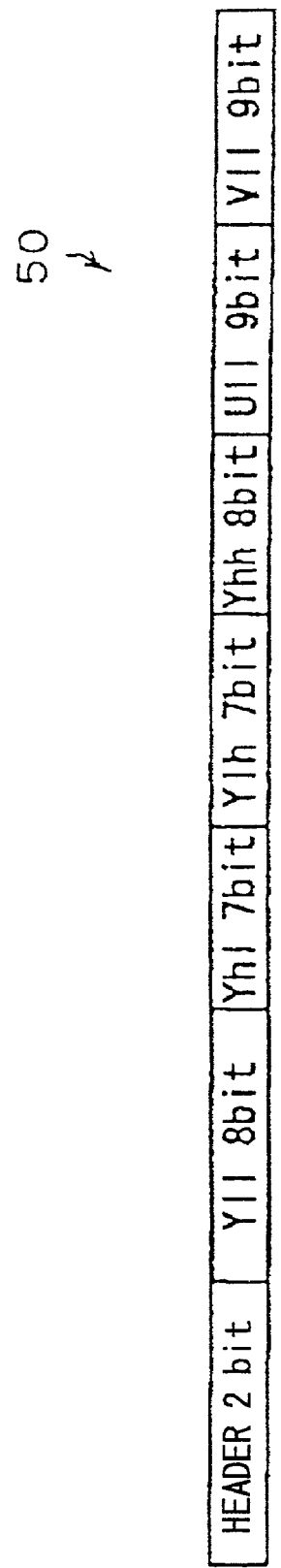
FIG. 21 shows an example of a configuration of a fixed-length code generated by processing according to the above-mentioned second embodiment.

FIG. 20 shows an operation flow on the range-over correction processing in the image data processing apparatus in a second embodiment of the present invention. FIG. 21 shows an example of configuration of fixed-length code generated by processing concerning processing shown in FIG. 20.

In the second embodiment, in a step S121, in case the rate of quantization on all the coefficients is larger than a threshold Th1, the amount of correction on each pixel is calculated through the processing shown in FIG. 16 for all R, G and B, and are held (in a step S122). Furthermore, the range-over amount (the amount of correction in FIG. 16) is added to a diagonally-adjacent pixel for all R, G and B (in a step S123), and the rounding processing is performed for all R, G and B (in a step S127). However, when the rate of quantization on all the coefficients is not larger than the threshold Th2 in the step S121, the step S124 is performed. In the step S124, when the rate of quantization on all the coefficients is larger than another threshold Th2 (Th1>Th2), the amount of correction on each pixel calculated by the processing shown in FIG. 16 is held in a step S124. Then, for R and B, the range-over amount is added to a diagonally-horizontal pixel in a step S126, and, then, for all R, G and B, the rounding processing is performed, in a step S127. When the rate of quantization on all the coefficients is not larger than the threshold Th2, the step S127 is immediately performed without the steps S125 and S126 being performed. With reference to FIGS. 16 through 19, the details of processing therefor have been already described.

In the second embodiment, as shown in FIG. 21, a value in a fixed length of 2 bits is added as a header on each pixel such as to indicate as to whether or not the component value is larger than the threshold Th1 or Th2. For example, when it is "11", the rate of quantization>Th1. "10" indicates that Th1≧quantization rate>Th2. "01" indicates that quantization rate<Th2. Thereby, the step S121 or S124 can make the determination.

The above-mentioned discussion assumes S-transform. However, the concept of the present invention may also be applied to general transform into frequency domain such as orthogonal transform, widely. That is, it can also be said that, which pixel should bear the rang-over amount should be determined by probabilistic magnitude relationship of products between respective elements (which is constants) of a matrix which is used for transform which is inverse of the transform into frequency domain, and quantization errors on respective frequency transform coefficients which are multiplied with these elements, respectively, in inverse transform.

Ordinarily, image data has low-frequency components more than high-frequency component. Accordingly, when an image is considered in a frequency domain, it is possible to allocate codes depending on such unevenness in frequency components. Thereby, it is possible to effectively reduce the data amount. The above-mentioned general transform such as orthogonal transform is transform of transforming image data into values in a frequency domain (corresponding to orthogonal transform coefficients, for example).

Specifically, transform A is considered which transforms n pieces of image data, i.e., f0, f1, . . . , fn−1 into n coefficients, i.e., F0, F1, . . . , Fn−1, as follows:

Transform A $$\begin{bmatrix} F0 \\ F1 \\ \vdots \\ Fn-1 \end{bmatrix} = \begin{bmatrix} a11 & a12 & \ldots & a1n \\ a21 & a22 & \ldots & a2n \\ \vdots & \vdots & \ldots & \vdots \\ an1 & an2 & \ldots & ann \end{bmatrix} \begin{bmatrix} f0 \\ f1 \\ \vdots \\ fn-1 \end{bmatrix}$$

Then, the inverse transform thereof B is as follows:

Transform B $$\begin{bmatrix} f0 \\ f1 \\ \vdots \\ fn-1 \end{bmatrix} = \begin{bmatrix} b11 & b12 & \ldots & b1n \\ b12 & b22 & \ldots & b2n \\ \vdots & \vdots & \ldots & \vdots \\ bn1 & bn2 & \ldots & bnn \end{bmatrix} \begin{bmatrix} F0 \\ F1 \\ \vdots \\ Fn-1 \end{bmatrix}$$

Then, the encoding is to obtain the coefficients F0, F1, . . . , Fn−1 from the image data f0, f1, . . . , fn−1, and, then, as the necessity arises, these coefficients are quantized. Then, further as the necessity arises, entropy coding is performed thereon.

On the other hand, in order to decode the thus-obtained entropy codes, they are decoded so as to obtain the quantized coefficients, and, then, inverse quantization is performed thereon, and, then, the above-mentioned inverse transform B is performed. Thereby, original image data is obtained.

Here, assuming that the values obtained through the inverse quantization are F0', F1', . . . , Fn−1', and quantization errors included therein are eF0', eF1', . . . , eFn−1', respectively, as $$f0 = b11 \cdot F0 + b12 \cdot F1 + \ldots + b1n \cdot Fn-1$$

then, $$ef0 = b11 \cdot eF0' + b12 \cdot eF1' + \ldots + b1n \cdot eFn-1' \quad (19)$$

where ef0 denotes error occurring in the data f0.
Similarly, $$ef1 = b21 \cdot eF0' + b22 \cdot eF1' + \ldots + b2n \cdot eFn-1' \quad (20)$$

There, it is noted that bij (element of a matrix) on the inverse transform B is constant, and, also, average magnitude relationship between the quantization errors eF0', eF1', . . . , eFn−1' is previously determined, in many cases.

For example, in case of linear quantization, as the number of quantization steps (denominator of division in the linear quantization) becomes larger, the quantization error becomes larger, and, also, in many cases, the number of quantization steps is determined for each coefficient, i.e., F0, F1, . . . , or Fn−1. That is, when decoding is performed, it can be estimated that which term of the right side of $$ef0 = b11 \cdot eF0' + b12 \cdot eF1' + \ldots + b1n \cdot eFn-1'$$

i.e., which is maximum of the products of the elements bij and quantization errors eFk can be estimated previously. In other words, it is possible to estimate which term in the right side is a dominant one.

Assuming that the dominant term in the right side of the formula (19) is b1n·eFn−1', $$ef0 \approx b1n \cdot eFn-1' \quad (21)$$

Similarly, assuming that the dominant term in the right side of the formula (20) is $b_{2n} \cdot eF_{n-1}'$, $$ef1 \approx b_{2n} \cdot eF_{n-1}' \tag{22}$$

The elements (in the matrix) in the inverse transform B may have a character/property. For example, in case where b1n=−b2n, from the above-mentioned formulas (21) and (22), $$ef0 \approx -ef1$$

This means, in case an error e occurs in image data f0, an error −e should occur in image data f1.

Accordingly, in case the image data f0 is close to the range upper limit (for example, 255), and range-over occurs on f0 after decoding (for example, 260), the range-over amount (260−255=5) should be added to the decoded value on the image data f1.

Even when b1n=−b2n does not hold, but the polarity therebetween is different, the polarities of errors occurring in the image data f0 and f1 should be opposite.

Accordingly, the range-over amount on f0 should be added to the decoded value on f1. Thereby, error on f1 itself may also be corrected, as a result.

Similarly, there are many examples of transform schemes in which a pair having the same absolute values and different polarities is included in the elements of inverse-transform matrix, for example, Hadamard transform, slant transform, S-transform, wavelet transform (such as wavelet transform of 5×3, 9×7 or the like, described later). However, in order to obtain the effect of the present invention, the absolute values are not necessarily the same but at only the polarities should be different/opposite.

According to the present invention, i.e., 'a pixel which bears the rang-over amount is determined based on probabilistic magnitude relationship of the respective products between elements of the inverse-transform matrix and quantization errors occurring in frequency transform coefficients multiplied by these elements, respectively, may be applied not only S-transform but also various transform schemes as long as they has such a character/property.

A principle of the present invention will now be described again by using wavelet transform which is described in JPEG2000.

Figure 22:
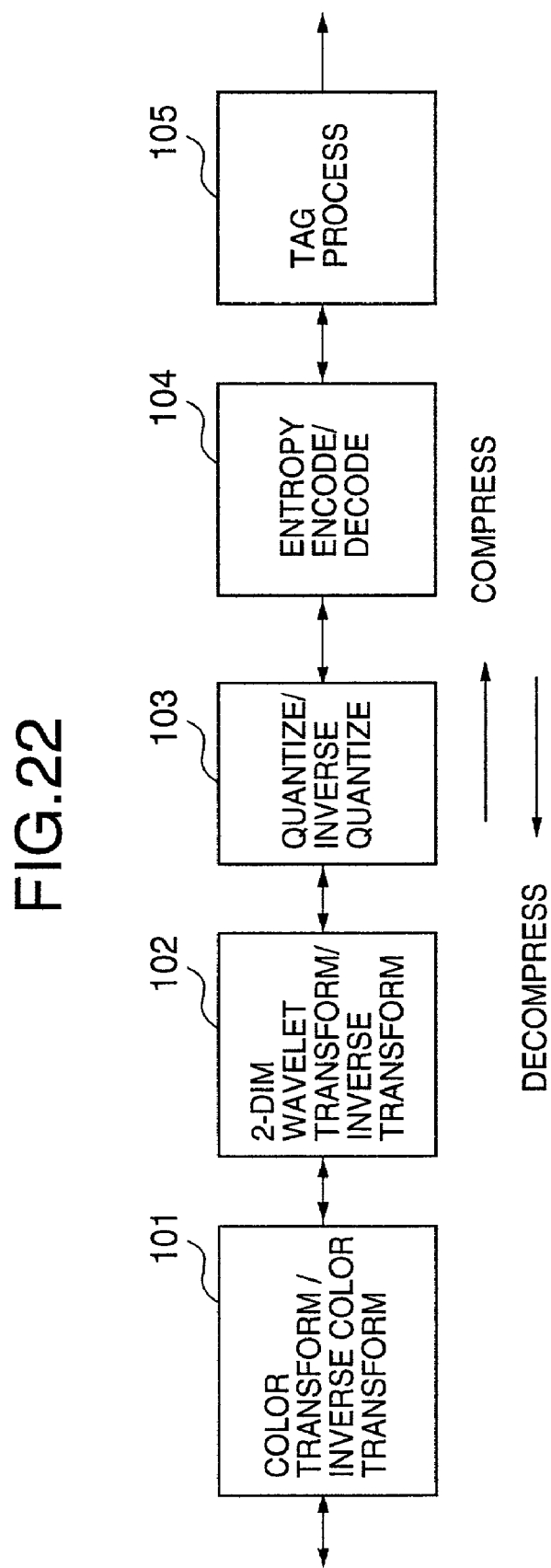
FIG. 22 shows a block diagram illustrating an image data processing apparatus in a third embodiment of the present invention, in particular, image compression/decompression algorithm according to a DWT scheme in JPEG2000.

FIG. 22 shows an image data processing scheme in a third embodiment of the present invention illustrating image compression/decompression algorithm on DWT in JPEG2000.

As shown in FIG. 22, an image processing apparatus in this third embodiment of the present invention includes a color space transform/inverse transform part 101, or a 2-dimensional wavelet transform/inverse transform part 102, a quantization/inverse quantization part 103, and an entropy coding/decoding part 104 and a tag processing part 105. Each part may include separate parts for forward/inverse transform directions. Furthermore, processing performed by each part may be performed for every image data component.

There are two types of wavelet transform schemes specified by JPEG2000, i.e., 5×3 wavelet transform and 9×7 wavelet transform, and only these transform schemes will now be described. However, the present invention may also be applied to other types of wavelet transform schemes.

In 5×3 wavelet transform, first vertically, the following formula (23) is first applied to pixel values (indicated as P(2i) or the like) on the even-numbered pixels, and pixel values (indicated as P(2i+1) or the like) on the odd-numbered pixels, and, thus, wavelet coefficients on a middle step (C(2i+1) or the like) are obtained. Then, after that, the following formula (24) is applied to the pixel values P(2i) and also the above-mentioned wavelet coefficients (C(2i+1) or the like), and, thus, wavelet coefficients (C(2i) or the like) in the middle step are obtained.

$$C(2i+1) = P(2i+1) - \lfloor (P(2i)+P(2i+2))/2 \rfloor \tag{23}$$

$$C(2i) = P(2i) + \lfloor (C(2i-1)+C(2i+1)+2)/4 \rfloor \tag{24}$$

where the symbols $\lfloor , \rfloor$ denote floor functions.

Then, horizontally, the above-mentioned formula (23) is applied to the coefficient values on odd-numbered and even-numbered pixels (here, as once undergoing the transform vertically, P(2i) and so forth denote coefficients), and, thus, wavelet coefficients are obtained. Then, wavelet coefficients are obtained through the formula (24) applied to the even-numbered coefficient values and odd-numbered wavelet coefficients obtained previously.

Figure 23:
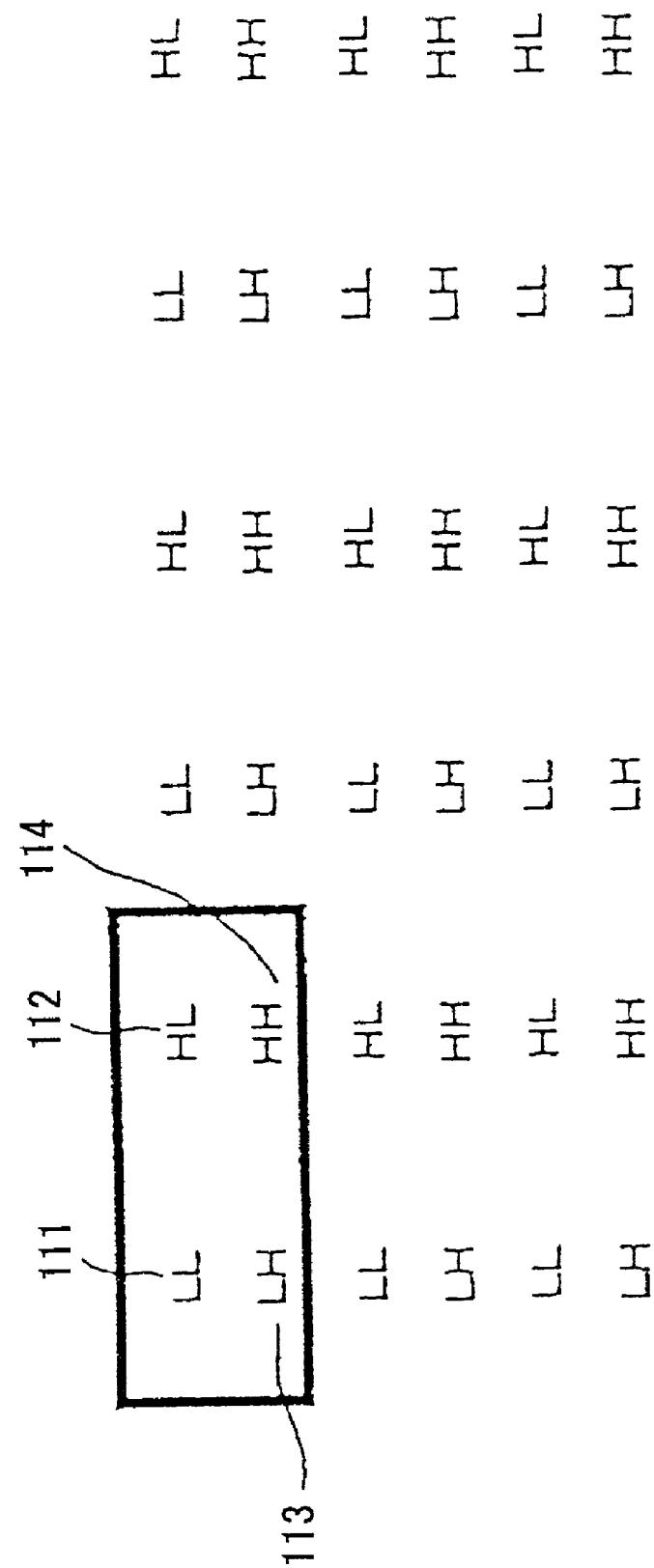
FIG. 23 illustrates a two-dimensional arrangement of wavelet coefficients together with types of the coefficients.

FIG. 23 illustrate a 2-dimensional arrangement of wavelet coefficients and types thereof.

After the above-mentioned vertical and horizontal transform has been made, such a 2-dimensional arrangement of final wavelet coefficients is obtained. By expressing as C(x, y), C(2i, 2j) is a coefficient LL 111, C(2j+1, 2j) is a coefficient HL 112, C(2i, 2j+1) is a coefficient LH 113, and C(2i+1, 2j+1) is a coefficient HH 114, where i=0 and j=0. Thus, according to wavelet transform, through single transform (decomposition), each of the four types of coefficients LL, HL, LH and HH are obtained in number corresponding to ¼ the number of the total pixels. With regard to decomposition, definition is made in JPEG 2000, Part I, FDIS (Final Draft International Standard), as follows:

Decomposition Level

A collection of wavelet subbands where each coefficient has the same spatial impart or span with respect to the source component samples. These include the HL, LH, and HH subbands of the same two dimensional subband decomposition. For the last decomposition level, the LL subband is also included.

At a time of inverse transform, inverse transform is carried out on these four types of coefficients. First, for the two-dimensional arrangement of coefficients, the following formula (25) is applied horizontally to coefficient values (indicated as C(2i), C(2i+1) or the like) on the even-numbered and odd-numbered coefficients, and, thus, wavelet coefficients on a middle step are obtained. Then, after that, the following formula (26) is applied to the odd-numbered coefficient values (C(2i+1) or the like) and even-numbered wavelet coefficient values obtained previously, and, thus, wavelet coefficients on the middle step are obtained.

$$P(2i) = C(2i) - \lfloor (C(2i-1)+C(2i+1)+2)/4 \rfloor \tag{25}$$

$$P(2i+1) = C(2i+1) + \lfloor (P(2i)+P(2i+2))/2 \rfloor \tag{26}$$

where the symbols $\lfloor , \rfloor$ denote floor functions.

Then, vertically the above-mentioned formula (25) is applied to the even-numbered and odd-numbered coefficient values, so that pixel values are obtained, and, after that, final pixel values are obtained through the formula (26) applied to the odd-numbered coefficient values, and even-numbered pixel values obtained previously. Thereby, the two-dimensional arrangement of coefficients in the frequency domain are inverse-transformed into a two-dimensional arrangement P(x, y) of pixel values.

Thus, also in inverse transform of wavelet transform, each pixel value is given as a linear summation of wavelet coefficients, and, therefor, four types of formulas are used depending on pixel positions in each pixel unit.

FIGS. 24A through 27B show examples of constants used for 5×3 wavelet inverse transform, and each of FIGS. 24A, 25A, 26A and 27A shows constant values on respective pixel positions while each of FIGS. 24B, 25B, 26B and 27B shows corresponding coefficient positions.

Figure 24A:
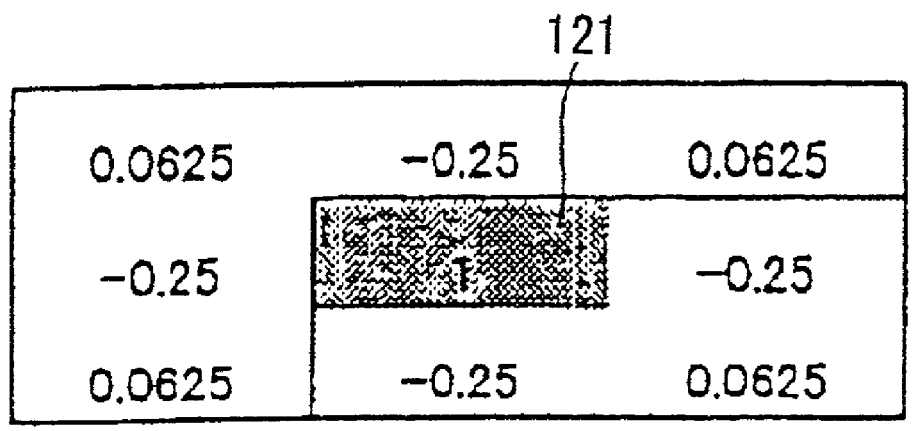
Figure 24B:
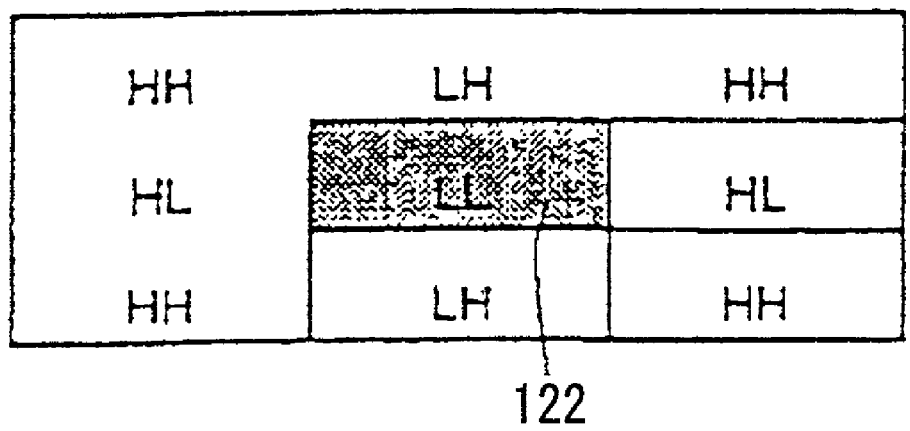

First, a pixel value P(2i, 2j) is given as a linear summation of nine coefficients surrounding the relevant pixel position. FIG. 24A shows constants (corresponding to the above-mentioned elements of the inverse-transform matrix) to be multiplied with these nine coefficients at positions corresponding to the coefficients. For example, the position of the coefficient corresponding to the pixel position 121 of the pixel value P(2i, 2j) is shown at a position 122 (position of LL). Namely, the following inverse transform is performed in the case of FIGS. 24A and 24B:

$$P(2i, 2j)=0.0625 \cdot C(2i-1, 2j-1)-0.25 \cdot C(2i, 2j-1)+ \\ 0.0625 \cdot C(2i+1, 2j-1)-0.25 \cdot C(2i-1, 2j)+1 \cdot C(2i, 2j)-0.25 \cdot C(2i+1, 2j)+0.0625 \cdot C(2i-1, 2j+1)- \\ 0.25 \cdot C(2i, 2j+1)+0.0625 \cdot C(2i+1, 2j+1)-0.75$$

where these coefficients $C(2i-1, 2j-1)$, $C(2i,2j-1)$, $C(2i+1,2j-1)$, $C(2i-1,2j)$, $C(2i, 2j)$, $C(2i+1,2j)$, $C(2i-1,2j+1)$, $C(2i,2j+1)$ and $C(2i+1,2j+1)$ correspond to HH, LH, HH, HL, LL, HL, HH, HL and HH, respectively, shown in FIG. 24B.

In case of 5×3, as the constant term '2' is included in the formula (25), the constant '−0.75' is included in the above formula on inverse transform. Further, precisely, the floor function is included in the formula. However, it is omitted as this omission does not affect the discussion according to the present invention.

Assuming that the coefficients such as $C(2i, 2j)$ are those obtained after inverse quantization, and, thus, include quantization error $C(2i, 2j)'$, the following formula can be obtained as in the above discussion. In the formula, the above-mentioned constant term is not relevant in discussion of errors.

$$P(2i, 2j)' = 0.0625 \cdot C(2i-1, 2j-1)' - 0.25 \cdot C(2i, 2j-1)' + \\ 0.0625 \cdot C(2i+1, 2j-1)' - 0.25 \cdot C(2i-1, 2j)' + \\ C(2i, 2j)' - 0.25 \cdot C(2i+1, 2j)' + 0.0625 \cdot C(2i-1, 2j+1)' - \\ 0.25 \cdot C(2i, 2j+1)' + 0.0625 \cdot C(2i+1, 2j+1)'$$

Similarly, FIGS. 25A through 27B show constant values used for inverse transform on P(2i+1, 2j), P(2i, 2j+1), P(2i+1, 2j+1), respectively. Same as in FIGS. 24A and 24B, positions of respective pixel values are shown as pixel positions 123, 125 and 127, while corresponding coefficient positions are shown as 124, 126 and 128 (HL, LH, and HH), respectively, there.

According to the above discussion, in case of decoding, probabilistic C(2i, 2j)' and so forth should be previously known. There, C(2i, 2j) is a coefficient LL, C(2i+1, 2j) is a coefficient HL, C(2i+1, 2j) is a coefficient LH, and C(2i+1, 2j+1) is a coefficient HH, as mentioned above. When performing linear quantization in encoding which uses wavelet transform, usually the number of quantization steps (denominator of division performed on the coefficient) is set for these four types of coefficients, as in JPEG2000. As the number of quantization steps is embedded into each code obtained in performing linear quantization in encoding process employing wavelet transform according to JPEG2000, it is possible to know this information in case of decoding. Moreover, also in case quantization is made according to another scheme such as a truncate scheme in which code reduction is made for quantization other than linear quantization, it should be possible to know necessary information on numbers of quantization steps in case of decoding.

Assuming that the numbers of quantization steps on LL, HL, LH, and HH are 4, 32, 32, and 64 (1:8:8:16) in the stated order, for example, usually, since probable quantization errors can be approximated as being proportional to the numbers of quantization steps, the following relationship among the quantization errors can be obtained:

$$C(2i, 2j)':C(2i+1, 2j)':C(2i+1, 2j)':C(2i+1, 2j+1)'=1:8:8:16$$

As shown in FIG. 23, although many LL coefficients exist, since the probable quantization errors on all of them are determined according to the number of quantization steps, they become equal.

In order to perform inverse quantization, as a simplest scheme, the above-mentioned number of quantization steps is multiplied with the corresponding wavelet coefficient. In this case,

[wavelet coefficient before quantization]=[wavelet coefficient after inverse quantization]

Thus, it can be clearly seen that the above-mentioned approximation holds.

In order to perform inverse quantization at more precisely, it is a common scheme that an experimentally obtained constant α is used, as follows:

[wavelet coefficient after inverse quantization]= ([wavelet coefficient]±α)×[number of quantization steps]

In this case, although the quantization error may have a value of positive, negative or zero, the above-mentioned approximation also holds.

FIGS. 28A through 31B show degrees of contribution by respective positions onto errors occurring in the above-mentioned four types of coefficients, obtained from the constants shown in FIGS. 24A through 27B.

When the above-mentioned probabilistic ratios of quantization errors are multiplied with the constants of FIGS. 24A through 27B, the degrees of contribution by the respective positions onto errors occurring in the pixels at positions on the four types (positions of LL, HL, LH and HH) are shown in FIGS. 28A through 31B, respectively. FIGS. 28A through 31A show the degrees of contribution on respective pixels while FIGS. 28B through 31B show corresponding coefficient positions. In each of FIGS. 28A through 31A, halftone is applied to the positions of coefficients having the largest contribution degrees.

As to FIGS. 31A and 31B, the contribution from the HH position is the maximum one of the contribution degrees to the error on the pixel at the HH position. Therefore, when the pixel at the HH position has range-over (exceeding the range or below the range), it can be estimated that, as a largest probability, this error is mainly caused by the coefficient at the HH position (i.e., the HH coefficient). Since actual range-over occurs not by the error of HH coefficient solely but by a sum of total 25 times of (error on coefficient× constant), the above-mentioned estimation may not precisely hold. However, it can be said that, in many cases, the above-mentioned estimation holds.

In case a pixel at the HH position exceeds or falls below the range mainly due to the error of the HH coefficient, how the error of the HH coefficient affects other pixels will now be considered. When FIGS. 31A and 31B are compared with FIGS. 29A and 29B, the degree of contribution from the HH position is 9.0 in FIG. 31A while it is −3 in FIG. 29A, which has the reverse polarity. Further, this degree of contribution of −3 is the second one (in magnitude) of those shown in FIG. 29A.

Accordingly, when the pixel at the HH position exceeds the range, the pixel at the HL position is likely to, at a high probability, fall below the range. Thus, it can be estimated that the range-over amount of the pixel at the HH position should be distributed to the pixel at the HL position. Similarly, in case the pixel at the HH position falls below the range, it can be estimated that the range-over amount of the pixel at the HH position should be distributed to the pixel at the HL position.

Further, as the same discussion of '9' and '−3' holds in a case FIGS. 31A and 30A are compared, at a same probability, it can also be said that the range-over amount of the pixel at the HH position should be distributed into the pixel at the LH position.

Through the same discussion, in case an error occurs at an HL position, according to FIGS. 29A and 29B, it can be estimated that this error is mainly caused by the error by the coefficient at the HL position (the maximum degree of contribution of 6). Further, according to FIGS. 28A and 28B, the error on the coefficient at the HL position contributes onto the pixel at the LL position in the reverse direction and also with the maximum magnitude (degree of contribution: −2). Accordingly, the range-over amount occurring on the pixel at the LH position should be distributed onto the pixel at the LL position. Subsequent to the LL position, the pixel at the LH position having the contribution degree of −1 (see FIGS. 30A and 30B) is a second candidate to bear the range-over amount.

Further, as a subsequent third candidate for the LH position, as it is considered that the range-over occurs due to the HH position having the contribution degree of '−3' (see FIGS. 29A and 29B) having the magnitude subsequent to the magnitude of the above-mentioned contribution degree of '6' from the LH position itself, the range-over amount should be distributed to the HH position having the contribution degree of '9' onto the HH position itself (see FIGS. 31A and 31B) which has the polarity (positive) reverse to the polarity (negative) of the above-mentioned contribution degree of '−3'.

Figure 28A:
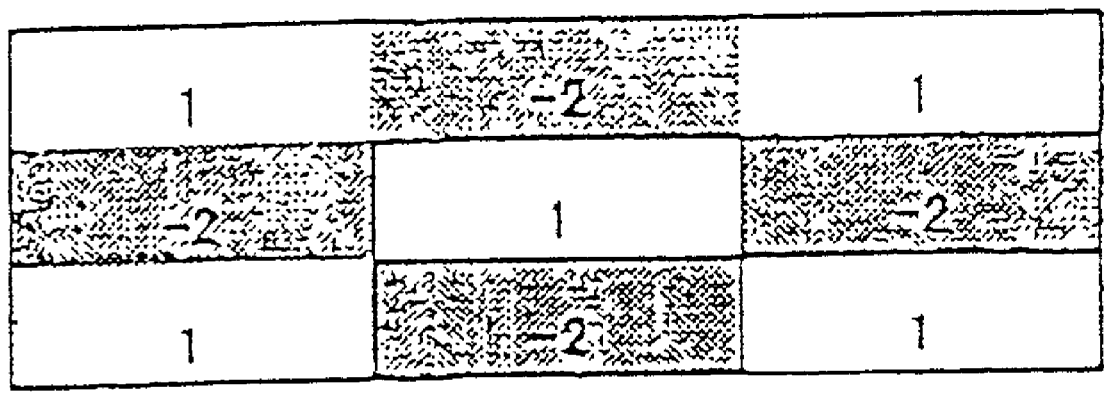
FIGS. 28A and 28B shows contribution degrees on an error occurring in a pixel at LL position, obtained from the constants shown in FIG. 24A.
Figure 28B:
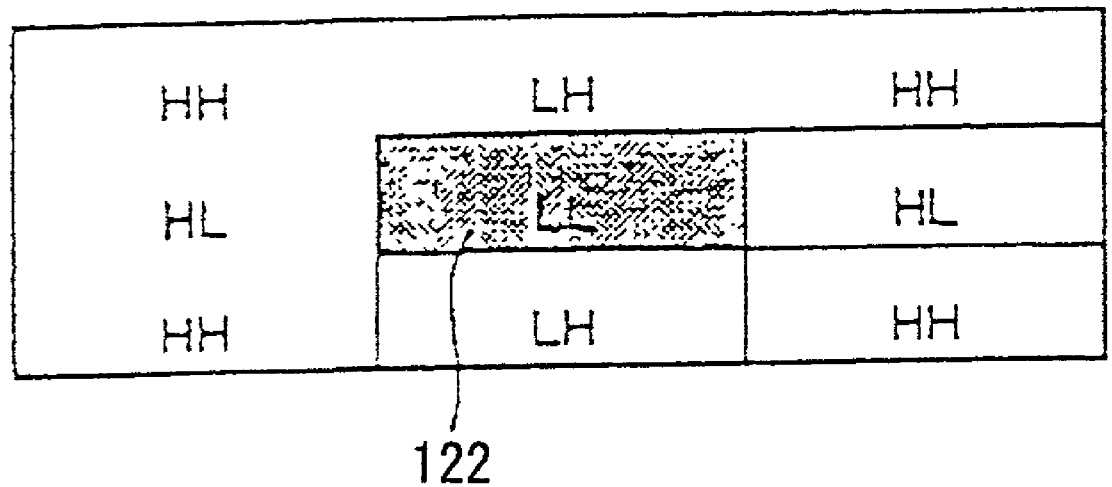

A range-over amount at the LL position should be distributed to HL or LH having the contribution degree of '6' having the reverse polarity and maximum magnitude onto HL or LH itself (see FIGS. 29A, 29B and 30A, 30B) with respect to the contribution degree of '−2' (see FIGS. 28A and 28B).

FIG. 32 shows an example of distribution places predetermined from a probabilistic viewpoint, on the occasion of range over, according to the above discussion.

Thus, the range-over amount should be distributed to the pixel at HL or LH position, when the pixel at LL position causes range over; the range-over amount should be distributed to the pixel at LL position (the next candidate is LH position), when the pixel at HL position causes range-over; the range-over amount should be distributed to the pixel at LL position (the next candidate is HL position), when the pixel at LH position causes range over; and the range-over amount should be distributed to the pixel at HL or LH position, when the pixel at HH position causes range over.

In the above discussion, it is assumed that the ratio on the numbers of the quantization steps is 1:8:8:16 as mentioned above. In case the same is assumed as 1:1:1:1, for example, different discussion should be made.

FIG. 33 shows the contribution degrees in case the ratio on the numbers of the quantization steps is 1:1:1:1. In FIG. 33, merely the contribution degree having the maximum magnitude is shown for each position, and corresponds to a summary of the information shown in FIGS. 28A through 31B. By applying the same discussion, the same result as that shown in FIG. 32 is obtained. Accordingly, it is possible to determine the range-over-amount distribution destinations regardless of the ratio of the numbers of quantization steps.

According to the scheme shown in FIG. 33, from the LL position, the pixel of HL position is "a pixel adjacent in the horizontally right direction", and the pixel of LH position is "a pixel adjacent in the vertically downward" (see FIG. 23). However, as the symmetry in contribution can be seen from FIGS. 28A through 31B, it can also be said for the same case that the pixel of HL position is "a pixel adjacent in the horizontally left direction", and the pixel of LH position is "a pixel adjacent in the vertically upward". Accordingly, it is also possible not to distinguish between right and left and between upward and downward.

Although 5×3 wavelet has been discussed above, for example, 9×7 wavelet will now be discussed in the same manner, as another example.

FIGS. 34 through 37 show examples of constants used for 9×7 wavelet inverse transform. In FIGS. 34 through 37, the pixel values $P(2i, 2j)$, $P(2i+1, 2j)$, $P(2i, 2j+1)$, and $P(2i+1, 2j+1)$ are shown in pixel positions 131, 132, 133, and 134, and they correspond to the coefficient positions LL, HL, LH, and HH, respectively.

FIG. 38 shows degrees of contribution in case the ratio of the numbers of quantization steps is assumed as being 1:8:8:16, while FIG. 39 assumes the same as being 1:1:1:1. In FIGS. 38 and 39, for the sake of simplification, only the contribution degree of the maximum magnitude is shown for each position.

Also in the case of 9×7 wavelet transform, same as in the case of 5×3 wavelet transform, the constants used for wavelet inverse transform shown in FIGS. 34 through 37 are obtained, and, then, based on the contribution degrees shown in FIGS. 38 and 39, through the same discussion, it can be said that the scheme shown in FIG. 32 can also be applied. As to the specific detail scheme of 9×7 wavelet transform, see JPEG2000, standard specification and so forth.

According to the above discussion, when image data components inverse-transformed from the frequency domain is processed, a pixel which has a component value exceeding/falling below the range is searched for. Then, the range-over amount is reduced/added so as to make the component value fall within the range. Then, the component value on a pixel predetermined by using a probabilistic magnitude relationship of products between respective elements of the matrix used for the inverse transform and respective quantization errors to be multiplied with these elements should be added/reduced accordingly to bear he range-over amount.

Then, after that, when this predetermined pixel thus having the component value added/reduced to bear the range-over amount then becomes excess or below the range, re-distribution or rounding processing mentioned above with reference to the first embodiment of the present invention should be made.

FIG. 40 shows a preferable scheme in the above-described third embodiment in which, in case, after the range-over amount is borne by a predetermined pixel, which then has a component value exceeding/falling below the predetermined range, the thus-occurring second range-over amount is then borne by a second predetermined pixel. In FIG. 40, in the third line, the range-over amount of LH position is distributed to/borne by the LL position pixel, and, then, the second range-over amount, if any, is distributed to/borne by the LH position. In this connection, this range-over amount of LL position may be borne by either the LH position pixel or HL position pixel, probabilistically. Then, by holding the position information of the distribution origin, it is possible to know whether this range-over occurs due to distribution from HL or LH. However, in order to omit holding this information, the second predetermined pixel is determined as LH position pixel in this case for the sake of simplification of operation needed for performing the range-over dealing-with processing.

In order to further simplify the processing, the following discussion is made. That is, without regarding the absolute values of the above-mentioned contribution degrees, merely the polarities thereof should do well. Accordingly, without regarding the quantization errors, it is possible to obtained an effect of effective range-over correction even when the effect may not be necessarily maximum or optimum, as long as the polarities of the elements of the inverse transform matrix are opposite. Furthermore, by regarding not only the polarities of the elements of the inverse transform matrix but also the magnitudes thereof, an effect of effective range-over correction can be obtained without regard of the quantization errors, i.e., the ratio of the numbers of quantization steps.

FIGS. 41A through 44B show merely the polarities on the contribution degrees obtained from FIGS. 28A through 31B, respectively. FIGS. 41A through 44A show the polarities of the contribution degrees, while FIGS. 41B through 44B show the corresponding coefficient positions. In FIGS. 41A through 44A, halftone is applied to the coefficient position having the maximum contribution degree.

Figure 41A:
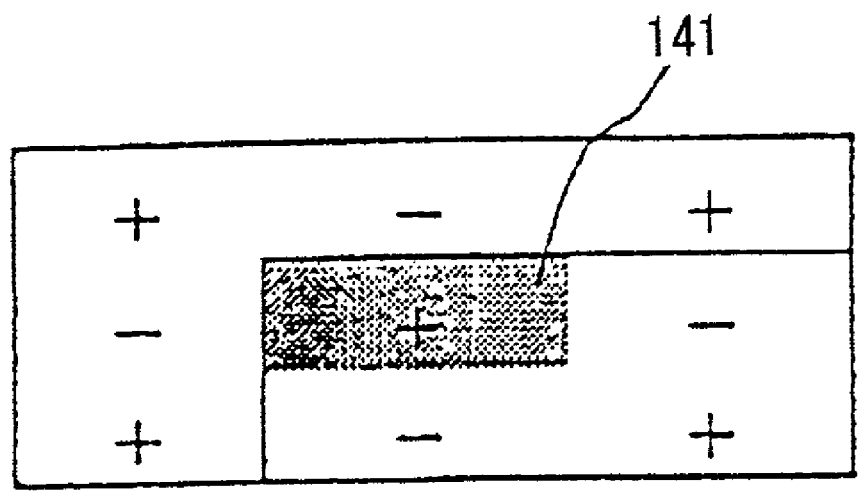
FIGS. 41A and 41B illustrate polarities of the constants shown in FIGS. 28A and 28B.
Figure 41B:
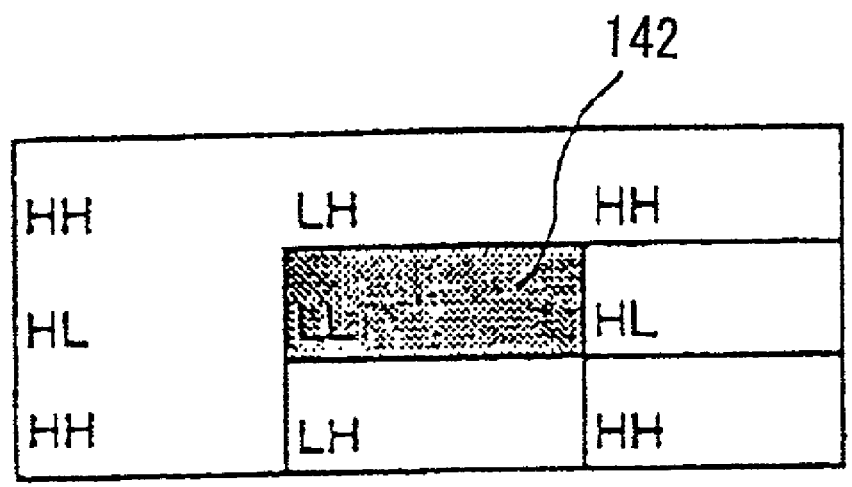
Figure 42A:
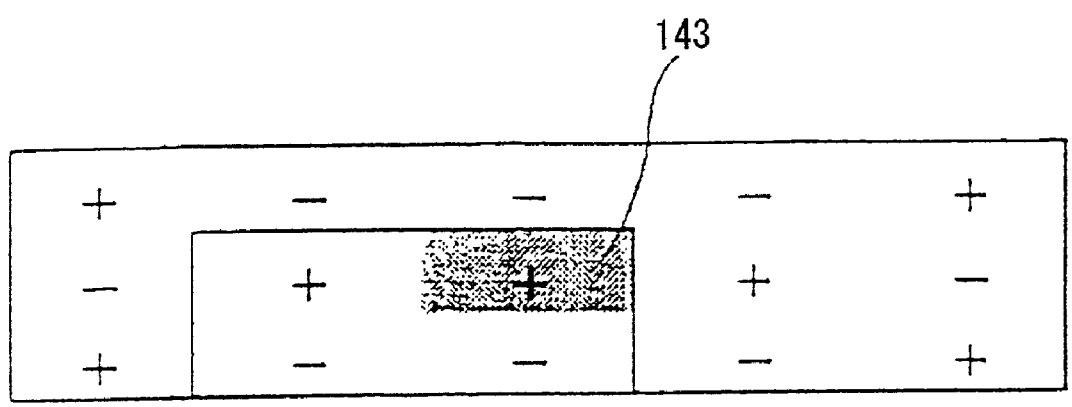
FIGS. 42A and 42B illustrate polarities of the constants shown in FIGS. 29A and 29B.
Figure 42B:
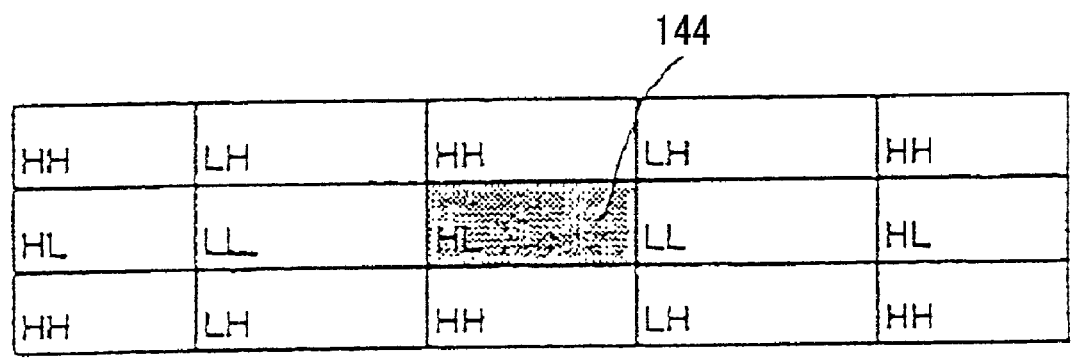
Figure 43A:
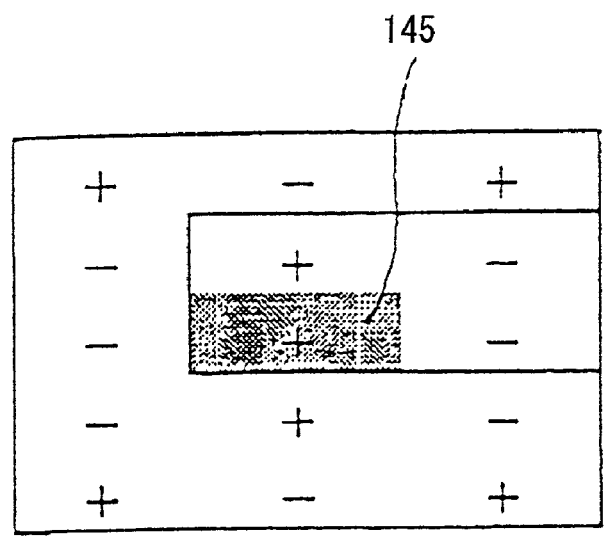
FIGS. 43A and 43B illustrate polarities of the constants shown in FIGS. 30A and 30B.
Figure 43B:
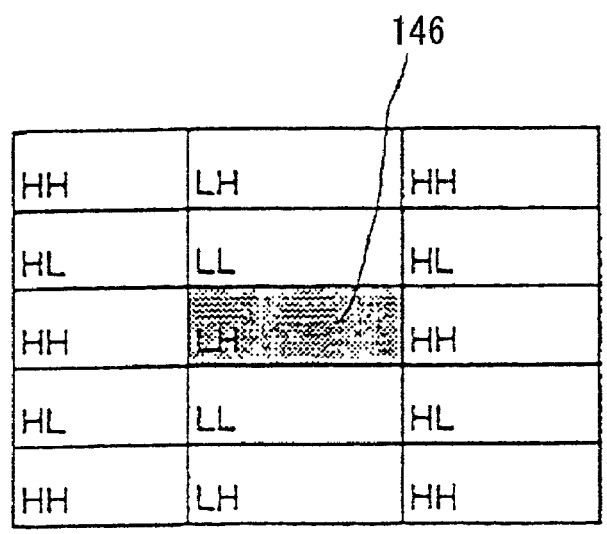
Figures 44A, 44B:
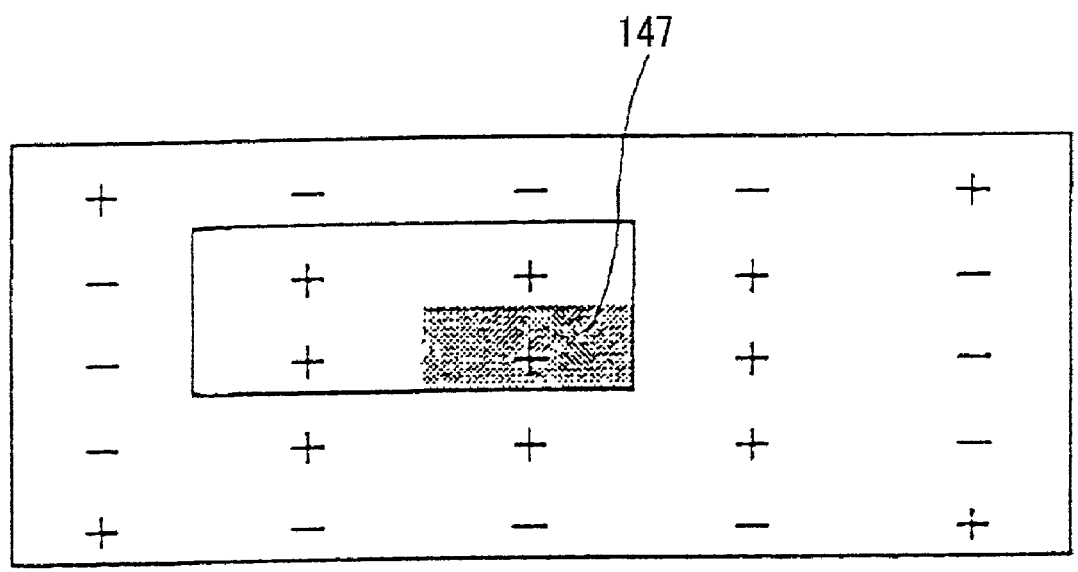
FIGS. 44A and 44B illustrate polarities of the constants shown in FIGS. 31A and 31B.

The pixel value P(2i, 2j) is given as a linear sum of the nine coefficients which surround the relevant pixel position. FIG. 41A shows the polarities of the respective constants to be multiplied with these nine coefficients at the corresponding positions of the coefficients shown in FIG. 41B. In the figures, the pixel position 141 corresponds to the pixel value P(2i, 2j) and the coefficient position 142 (position of LL) corresponds thereto. Similarly, FIGS. 42A through 44A shows the polarities of the constants used for the inverse transform for the pixel values P(2i+1, 2j), P(2i, 2j+1) and P(2i+1, 2j+1). Similar to FIGS. 41A and 41B, the pixel positions 143, 145 and 147 correspond to the respective pixel values, and the coefficient positions 144, 146 and 148 (positions of HL, LH and HH) correspond thereto, respectively.

There, the positive polarity (+) means that, when the polarity of the quantization error of the wavelet coefficient with which the relevant coefficient is multiplied is positive, the positive error is propagated into the pixel value. Similarly, the negative polarity (-) means that, the error in the opposite polarity is propagated. FIG. 45 shows these polarities in summary. FIG. 45 shows the direction (polarity) of contribution from the coefficients, onto each position according to 5×3 wavelet inverse transform. In case of 9×7 wavelet inverse transform, the same result as that shown in FIG. 45 is obtained.

For example, when the pixel of LL position exceeds the range and it originates from the error of the coefficient of HL position, the error of the coefficient HL is propagated with the opposite polarity to the pixel of HH position (in the first and fourth lines of FIG. 45). Moreover, when the range over on the pixel at he LL position originates from the error of the coefficient of LH position, the error of this coefficient lH is similarly propagated with the opposite polarity to the pixel of HH position. (in the same first and fourth lines of FIG. 45). That is, a method for distributing the range-over amount on the pixel of LL position to HH position can be considered. This scheme corresponds to the above-described first embodiment of the present invention from the standpoint in that a process should be determined such that a predetermined effect can be obtained regardless of which coefficient causes the error'. As the relationships with the pixels at the HL position and LH position are the same, this scheme can do well.

FIG. 46 shows an example of distribution places predetermined only from the polarities of the contribution degrees on the occasion of range-over.

In case the range-over correction processing is performed on every four pixels defined by rectangular shown in FIG. 23 for the purpose of saving the memory capacity, a simple scheme only in consideration of polarity can be employed in which, a first distribution place can be specified as a diagonal pixel, as shown in FIG. 46. That is, when a pixel having range-over occurring therein is any of LL position, HL position, LH position, or HH position, the first distribution is made onto the pixel located diagonal therefrom, as shown in FIG. 46. In case range-over again occurs as a result of the above-mentioned first distribution being performed, it can be estimated that the above-mentioned first estimation is wrong. Accordingly, it is estimated that the correct origin of the error is HH position, and, thus, re-distribution is made between LL and LH positions, and between HL and HH positions.

FIGS. 47 through 49 show other examples of he distribution places predetermined only from the polarities of contribution degrees, on the occasion of range over, respectively.

Similar to the scheme shown in FIG. 46, in case of taking only the polarity into consideration for determining the distribution place, the selection shown in FIG. 47 on the second distribution place is also possible. That is, the first distribution is made according to the scheme shown in FIG. 46, and, then, in case range-over again occurs as a result of the above-mentioned first distribution being performed, it can be estimated that the above-mentioned first estimation is wrong. Accordingly, it is estimated that the correct origin of the error is HH position, and, thus, re-distribution is made between LL and HL positions, and between LH and HH positions.

As to the scheme shown in FIG. 48, similar to the scheme shown in FIG. 46, in case of taking only the polarity into consideration for determining the distribution place, the selection shown in FIG. 48 on the second distribution place is also possible. That is, the first distribution is made, different from the schemes shown in FIGS. 46 and 47, and, thus, the range-over amount is first distributed to a pixel vertically adjacent to the pixel first having the range-over occurring therein, as shown in FIG. 48. Then, in case range-over again occurs as a result of the above-mentioned first distribution being performed, it can be estimated that the above-mentioned first estimation is wrong. Accordingly, it is estimated that the correct origin of the error is LH position, and, thus, re-distribution is made onto a pixel diagonally adjacent to or horizontally adjacent to the above-mentioned pixel first having the range-over occurring therein, as shown in FIG. 48.

As to the scheme shown in FIG. 49, similar to the scheme shown in FIG. 46, in case of taking only the polarity into consideration for determining the distribution place, the selection shown in FIG. 48 on the second distribution place is also possible. That is, the first distribution is made, different from the schemes shown in FIGS. 46, 47 and 48, and, thus, the range-over amount is first distributed to a pixel horizontally adjacent to the pixel first having the range-over occurring therein, as shown in FIG. 49. Then, in case range-over again occurs as a result of the above-mentioned first distribution being performed, it can be estimated that the above-mentioned first estimation is wrong. Accordingly, it is estimated that the correct origin of the error is HL position, and, thus, re-distribution is made onto a pixel diagonally adjacent to or vertically adjacent to the above-mentioned pixel first having the range-over occurring therein, as shown in FIG. 49.

These schemes are those which disregard the probable standpoint and give priority to simplification of processing. In contrast thereto, schemes in consideration of the degree of contribution based not only on the polarities of elements of the matrix used for inverse transform but also the magnitudes thereof can be considered. In this case, FIG. 33 mentioned above also shows the degree of contribution based not only on the polarities of elements of the matrix used for inverse transform but also the magnitudes thereof. Therefore, in 5×3 wavelet transform, the distribution place predetermined using "the degree of contribution based not only on the polarities of elements of the matrix used for inverse transform but also the magnitudes thereof are those shown in FIG. 32 or 40.

Similarly, in the case of 9×7 wavelet, FIG. 39 shows the degree of contribution and FIG. 40 shows the distribution place.

Figure 50:
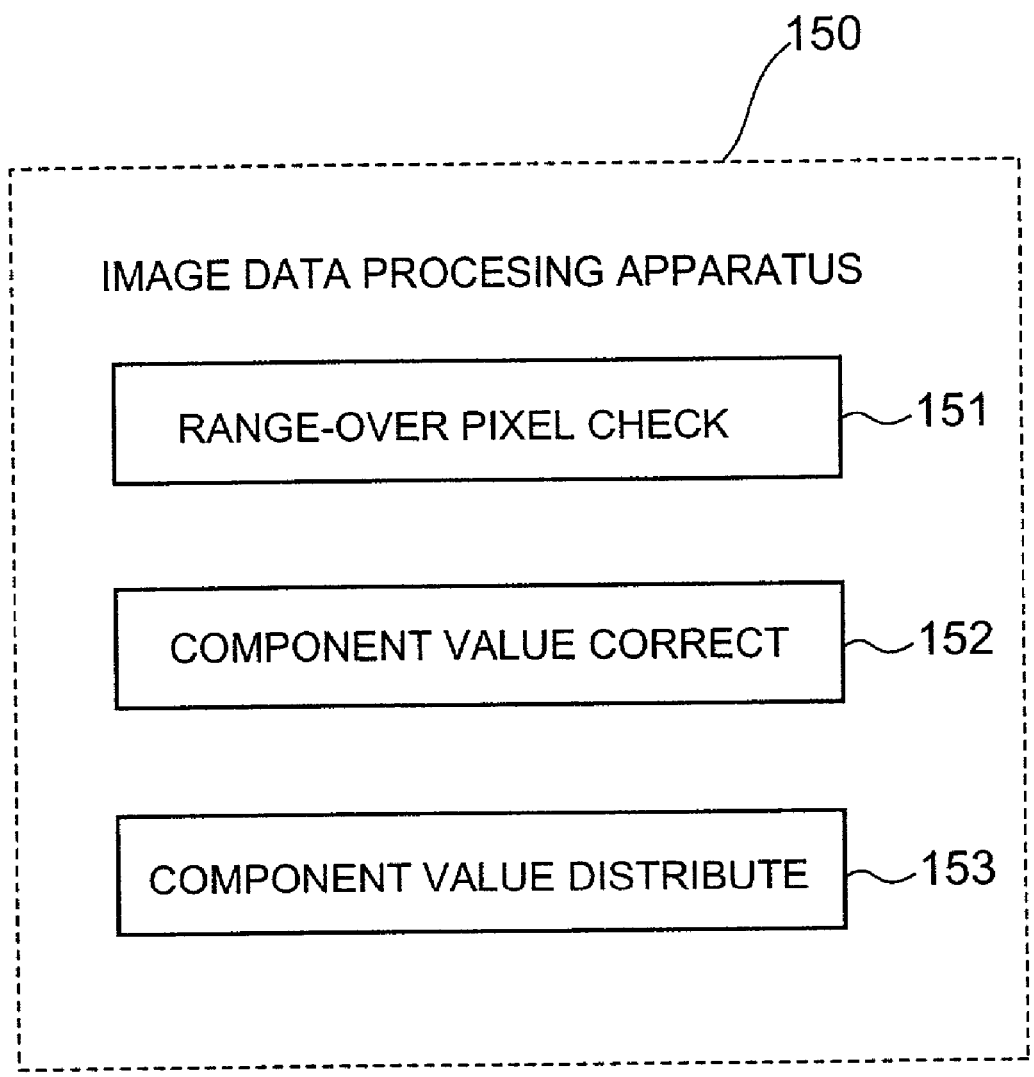
FIG. 50 shows a partial block diagram of the image data processing apparatus in the third embodiment of the present invention.

FIG. 50 shows a block diagram illustrating an image data processing apparatus in the above-described third embodiment of the present invention.

The image data processing apparatus in the third embodiment of the present invention shown in FIG. 50 processes image data components (for example, the above-mentioned R values, B values, or brightness or color difference values being described later) having undergone inverse transform of a predetermined transform into frequency domain, and, includes a range-over pixel check part 151 searching for a pixel having a component value exceeding the upper limit of a predetermined range, a component value correcting part 152 reducing the component value of the pixel so as to make it fall within the predetermined range, and a component value distributing part 153 increasing the component value of a pixel predetermined based on the polarity (or, polarity and magnitude) of each element of a matrix used for the inverse transform. Also according to the third embodiment of the present invention, it is possible to control change in color tone/hue during inverse transform (decompression/decoding) by a simple scheme, in case of range-over from the upper limit, and, thereby, it is possible to perform decompression/decoding with effectively reduced loss in image quality.

Further, in the above-mentioned third embodiment, the range-over pixel check part 151 also searches for a pixel having a component value below the lower limit of the predetermined range, the component value correcting part 152 increases the component value of the pixel so as to make it fall within the predetermined range, and the component value distributing part 153 reduces the component value of a pixel predetermined based on the polarity (or, polarity and magnitude) of each element of a matrix used for the inverse transform. According to the third embodiment of the present invention, it is possible to control change in color tone/hue during inverse transform (decompression/decoding) by a simple scheme, in case of range-over from the upper limit, and, thereby, it is possible to perform decompression/decoding with effectively reduced loss in image quality.

In any of the above-mentioned cases where the range-over amount borne by or distributed to the predetermined pixel, this predetermined pixel may thus have a component value exceeding or below the predetermined range, due to accumulation of errors between coefficients, or the like. In such a case, re-distribution or rounding processing is performed according to any of the above-mentioned tables 2 and 3, where 'subsequently bear' means the re-distribution.

For this purpose, in case the pixel having the range-over amount distributed thereto has the value exceeding the upper limit of the predetermined range, the component value correcting part 152 reduces the component value of the pixel having the range-over amount distributed thereto so as to make it fall within the predetermined range, and, also, the component value distributing part 153 increases a value on a second pixel predetermined based on the polarity (or polarity and magnitude) of each element of the matrix used for the inverse transform. Thereby, even in case where rang-over occurs repeatedly, it is also possible to control change in color tone/hue during inverse S-transform (decompression/decoding) by a simple scheme, and, thereby, it is possible to perform decompression/decoding with effectively reduced loss in image quality.

Similarly, for the same purpose, in case the pixel having the range-over amount distributed thereto has the value below the lower limit of the predetermined range, the component value correcting part 152 also increases the component value of the pixel having the range-over amount distributed thereto so as to make it fall within the predetermined range, and, also, the component value distributing part 153 reduces a value on a second pixel predetermined based the polarity (or polarity and magnitude) of each element of the matrix used for the inverse transform. Thereby, even in case where rang-over occurs repeatedly, it is also possible to control change in color tone during inverse S-transform (decompression/decoding) by a simple scheme, and, thereby, it is possible to perform decompression/decoding with effectively reduced loss in image quality.

Further, the image data processing apparatus in the third embodiment of the present invention performs rounding processing in case the component value on the above-mentioned second pixel having the value thus increased through the re-distribution, thereby, has the value exceeding the upper limit of the predetermined range, such as to reduce the value exceeding the upper limit so as to make the value on the pixel same as the upper limit of the predetermined range. Similarly, the image data processing apparatus in the third embodiment of the present invention performs rounding processing in case the component value on the above-mentioned second pixel having the value thus reduced through the re-distribution, thereby, has the value below the lower limit of the predetermined range, such as to increase the value below the lower limit so as to make the value on the pixel same as the lower limit of the predetermined range.

In the image data processing apparatus in the third embodiment of the present invention, the above-mentioned predetermined pixel is one adjacent vertically to the range-over pixel, and also, the above-mentioned second predetermined pixel is one adjacent horizontally or diagonally to the same range-over pixel.

Instead, in the image data processing apparatus in the third embodiment of the present invention, the above-mentioned predetermined pixel may be one adjacent horizontally to the range-over pixel, and also, the above-mentioned second predetermined pixel may be one adjacent vertically or diagonally to the same range-over pixel.

Instead, in the image data processing apparatus in the third embodiment of the present invention, the above-mentioned predetermined pixel may be one adjacent diagonally to the range-over pixel, and also, the above-mentioned second predetermined pixel may be one adjacent horizontally to the same range-over pixel.

Further, in the image data processing apparatus in the third embodiment of the present invention, the above-mentioned predetermined pixel may be one adjacent vertically, horizontally or diagonally to the range-over pixel.

Further, in the image data processing apparatus in the third embodiment, it is preferable to make the amount reduced from/added to the range-over pixel so as to make the pixel have the component value fall within the predetermined range equal to the amount added to/reduced from the predetermined pixel to which the range-over amount is thus distributed from the range-over pixel. Thereby, it is possible to maintain the total component value of all the pixels, and, thus, hue change occurring through image data compression/decompression can be effectively reduced.

In the above-described third embodiment, as described above, the inverse transform is performed on the color difference components of image data, and, the above-mentioned component values are of R values, G values or B values. Then, after the inverse transform, inverse color transform is performed so as to obtain these component values. In this decoding processing, range-over occurring in RGB value is dealt with by using the polarity (or polarity and magnitude) of each element of the matrix used for the inverse transform.

However, the present invention in the above-mentioned third embodiment may also be applied to a case where the inverse transform is performed on the brightness component of image data, and, the above-mentioned component values are of G values. Then, after the inverse transform, inverse color transform is performed so as to obtain these component values. In this decoding processing, range-over occurring in G value is dealt with by using by using the polarity (or polarity and magnitude) of each element of the matrix used for the inverse transform.

In general, in order to maintain the image quality through the compression/decompression, the quantization rate on the brightness data is made lower than that on the color difference data. Thereby, as can be seen from the above-mentioned formulas (12) through (14), it can be estimated that quantization error occurring on G value is smaller than that on R or B value. As a result, even when quantization error occurs, the range-over amount is relatively small on G value.

Therefore, in the image data processing apparatus in this embodiment, in case G value exceeds the upper limit of the predetermined or becomes below the lower limit thereof, merely rounding processing is performed, i.e., the above-mentioned ceiling processing or flooring processing, without performing distribution of correction value.

Further, in order to make the compression rate on image data variable, it is common that the quantization rate at a time of encoding is made variable, and when the quantization rate is low, it can be estimated that range-over itself is not likely to occur.

Therefore, in the image data processing apparatus in the embodiment, a part of switching as to whether the range-over amount is distributed or merely rounding processing as mentioned above is performed, depending on the quantization rate on the frequency transform coefficients, may preferably be provided. Thereby, it is possible to simplify the processing in case it is estimate that range-over amounts, if any, have smaller values.

Further, in the image data processing apparatus in the third embodiment, a part of switching as to whether the range-over amount is distributed or merely rounding processing as mentioned above is performed, depending on the quantization rate on the frequency transform coefficients, in case where range-over occurs in G value, may preferably be provided. Thereby, it is possible to simplify the processing in case it is estimate that range-over amounts, if any, have smaller values.

The above-described third embodiment of the present invention will now be described in more detail.

Figure 51:
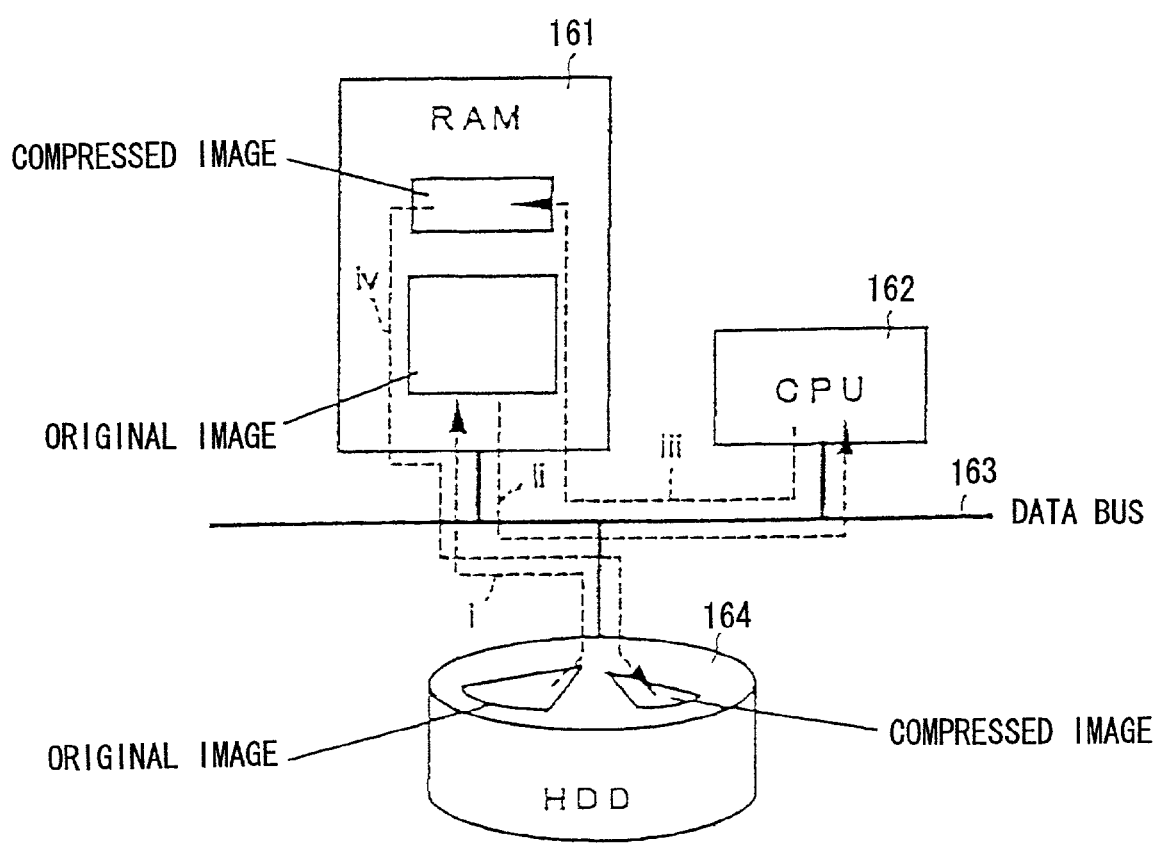
FIG. 51 shows an example of a specific configuration of the image data processing apparatus in the third embodiment of the present invention.

FIG. 51 shows a specific configuration of the image data processing apparatus in the third embodiment of the present invention shown in FIG. 50. The image data processing apparatus includes a RAM 161, a CPU 162, and a HDD 164, which are connected through a data bus 163. This apparatus performs image data compression processing (encoding processing) on an original image.

The original image recorded on the HDD 164 is read onto the RAM 161 by a command from the CPU 162 (i). Then, as a compression step, the CPU 162 reads the image from the RAM 161 partially every time (ii), and compresses it through a common encoding scheme described later. The CPU 162 writes the data after compression onto another area on in the RAM 11 (iii). After the entire original image is compressed, the data after compression is recorded onto the HDD 164 by a command from the CPU 162 (iv).

Further, in the same apparatus, decompression processing (decoding processing) of compressed image is performed by the following operation flow. The compressed image recorded onto the HDD 164 is read by a command from the CPU 162 onto the RAM 161 (inverse of iv). Then, as a decompression step, the CPU 162 reads partially every time the compressed image from the RAM 161 (inverse of iii), and decompress it by a decoding (decompression) processing according to the present invention. The CPU 162 writes the data after decompression onto another are in the RAM 161 (inverse of ii). After the entire compressed images are decompressed, the data after decompression is recorded onto the HDD 164 by a command from the CPU 162 (inverse of i).

Figure 52:
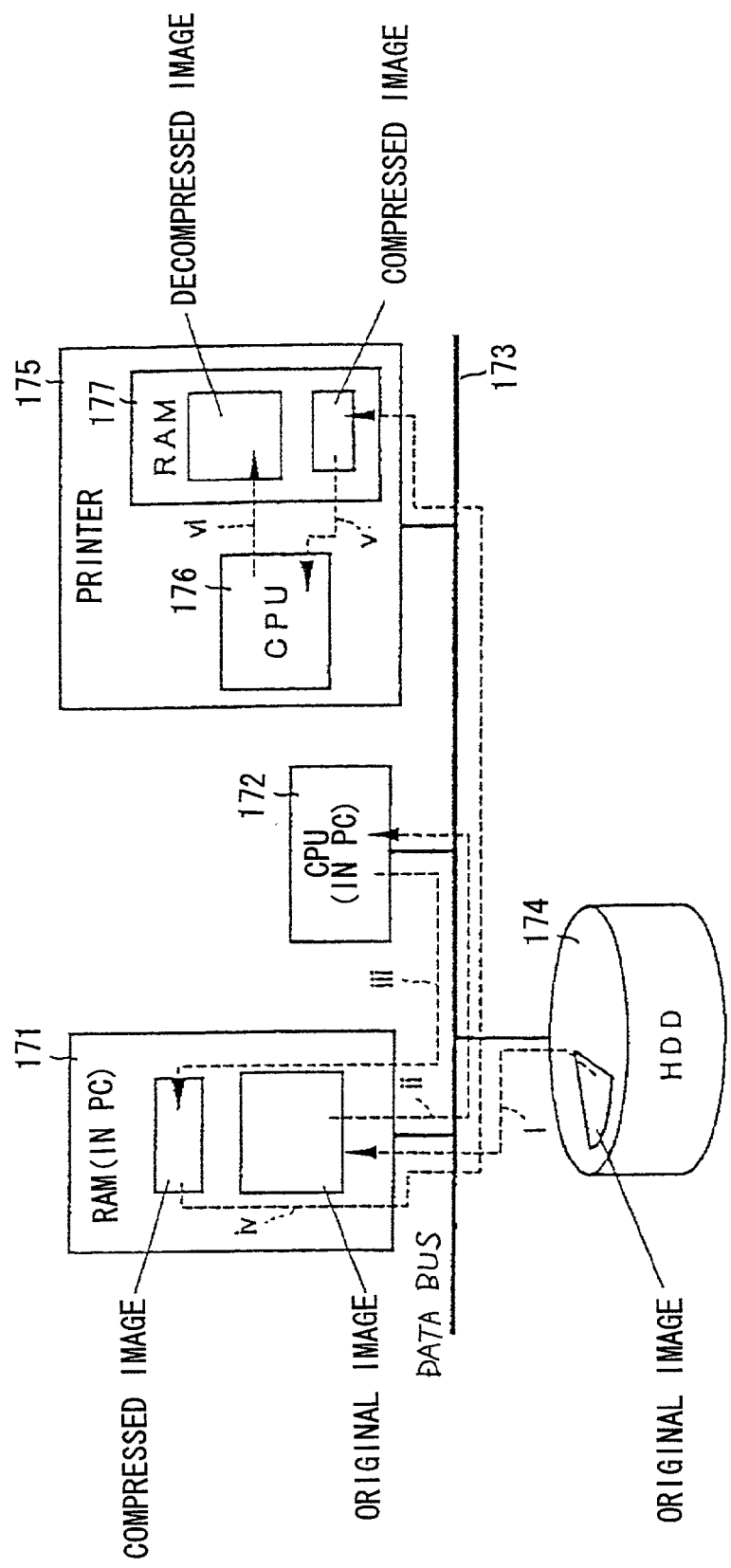
FIG. 52 shows another example of a specific configuration of the image data processing apparatus in the third embodiment of the present invention.

FIG. 52 shows another specific configuration of the image data processing apparatus in the third embodiment of the present invention.

The image data processing apparatus shown in FIG. 52 includes a RAM 171 in PC (Personal Computer), a CPU 172 and a HDD 174 in the PC, and a printer 175, which are connected through a data bus 173. On an occasion of printing-out of an original image, compression of the image is made and the data after compression is transmitted to the printer 175. Since the amount of transmission data to the printer 175 is thus reduced, the required transmission time is effectively shortened, and even considering the time required for the compression and decompression, a high-speed printing can be achieved.

The original image recorded onto the HDD 174 is read onto the RAM 171 by a command from the CPU 172 (i). Then, as a compression step, the CPU 172 reads the image from the RAM 171 partially every time, and compresses it by a common coding scheme described later. The CPU 172 writes the data after compression onto another area in the RAM 171 (iii). The data after compression is recorded onto a RAM 177 in the printer 175 by a command from the CPU 172 (iv). As an decompression step, a CPU 176 in the printer 175 decompresses the image by a decompression (decoding) processing according to the present invention which reads the data after compression (v). The CPU 176 writes the data after decompression onto the RAM 177 (vi). The printer 175 prints out the data after the decompression in a predetermined procedure, after the entire data is decompressed.

Figure 53:
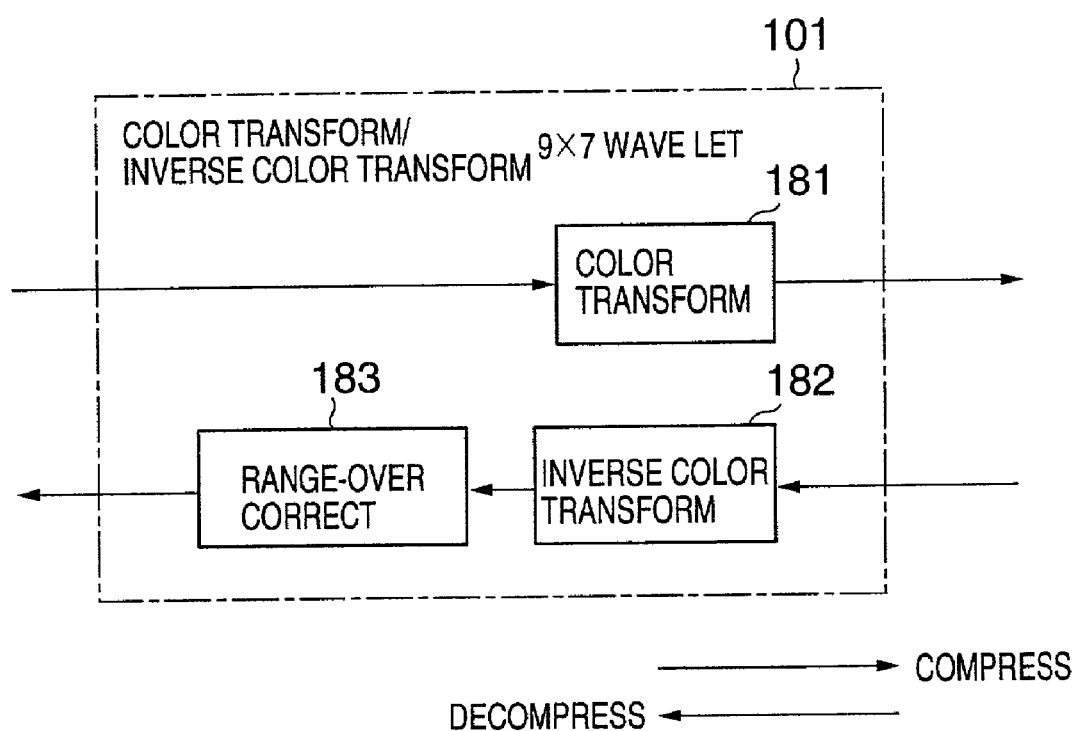
FIG. 53 shows a block diagram of a color transform/inverse transform part shown in FIG. 22 in detail.

FIG. 53 shows the color transform part/inverse color transform part 101 in the image data processing apparatus shown in FIG. 22 in detail. The outline of decompression processing according to JPEG2000 is as shown in FIG. 22. In this color transform part/inverse color transform part 101, in compression process, color transform is performed by a the color transform part 181, inverse color transform is performed by an inverse color transform part 182 in decompression processing, and, the above-mentioned range-over pixel value is dealt with by a range-over correction part 183 which includes the range-over check part 151, component value correction part 152 and component value distribution part 153 shown in FIG. 50. Moreover, 5×3 wavelet or 9×7 wavelet is applicable as transform of the present invention as mentioned above. Moreover, in case color transform is made into brightness values/color difference values from the RGB value by JPEG2000, RCT is employed in case of using 5×3 wavelet, while YCbCr transform (referred to as ICT according to JPEG2000) is employed in case of using 9×7 wavelet.

According to JPEG2000, as described above, coefficients F0, F1, . . . , Fn−1 are obtained from given image data f0, f1, . . . , fn−1, and, then, as the necessity arises, these coefficients are quantized, and, then, as the necessity arises, entropy encoding is performed on the coefficients having undergone the quantization. In decompression, similar processing is performed in an approximately inverse direction. The present invention is applied to range-over correction on RGB values or the like after undergoing inverse color transform (inverse color transform may be omitted) in the decompression. More precisely according to JPEG2000, compression is made after an offset is added to RGB value or the like (referred to as DC shift according to JPEG2000). Accordingly, according to the present invention, range-over correction is performed after the offset is cancelled.

Figure 54:
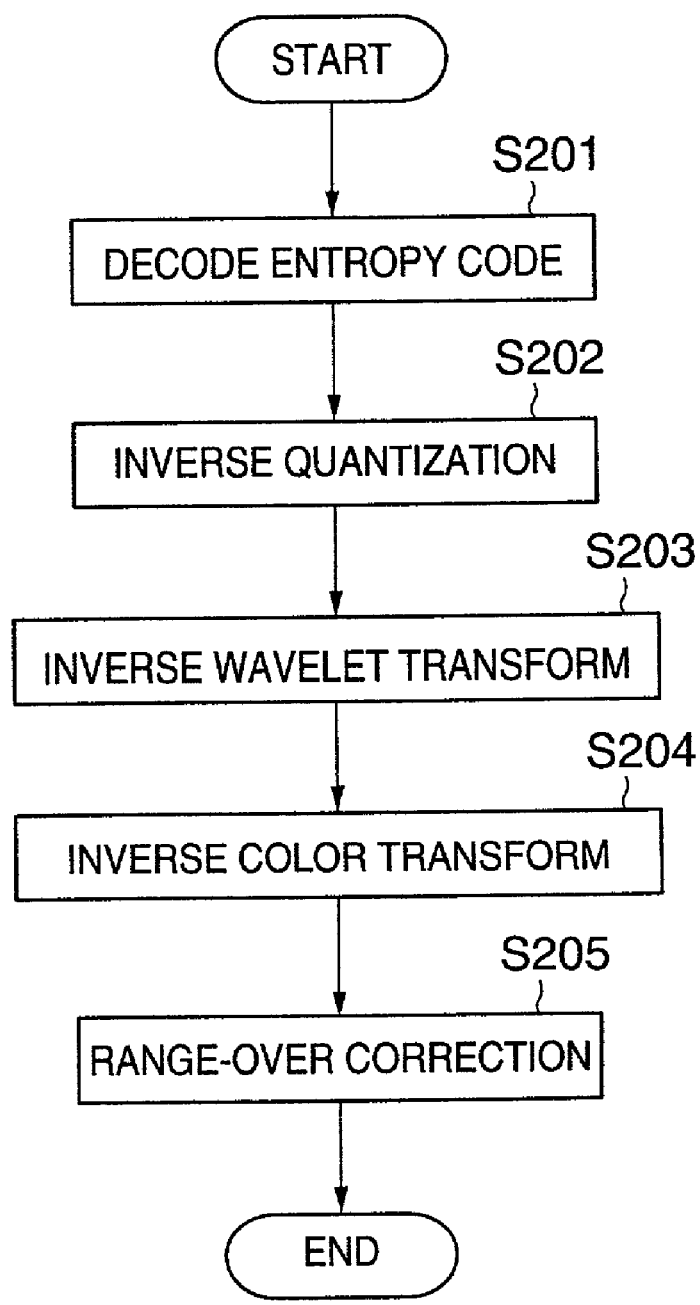
FIG. 54 shows an operation flow chart on the image data processing apparatus in the third embodiment of the present invention, and illustrates basic decoding processing.

FIG. 54 shows a flow chart illustrating basic processing of the image data processing apparatus in the third embodiment, while FIGS. 55 through 59 illustrate detail thereof.

As shown in FIG. 54, the image data processing apparatus decodes given entropy codes (in a step S201) and, then, after the completion of decoding, inverse quantization is performed on all the thus-obtained wavelet coefficients (in a step S202). Then, inverse wavelet transform is performed on the wavelet coefficients having undergone the inverse quantization, and, thus, brightness value and color difference value are calculated on each pixel (in a step S203). Then, inverse color transform is performed on the thus-obtained brightness value and color difference value (in a step S204). Finally, range-over correction processing is performed on the thus-obtained pixel values (in a step S205). This range-over correction processing may include the above-mentioned rounding and holding processing (after rounding processing, holding range-over amount), correction processing (distributing the range-over amount onto a predetermined pixel), and simple rounding processing. FIGS. 55 through 58 show details thereof.

Figure 55:
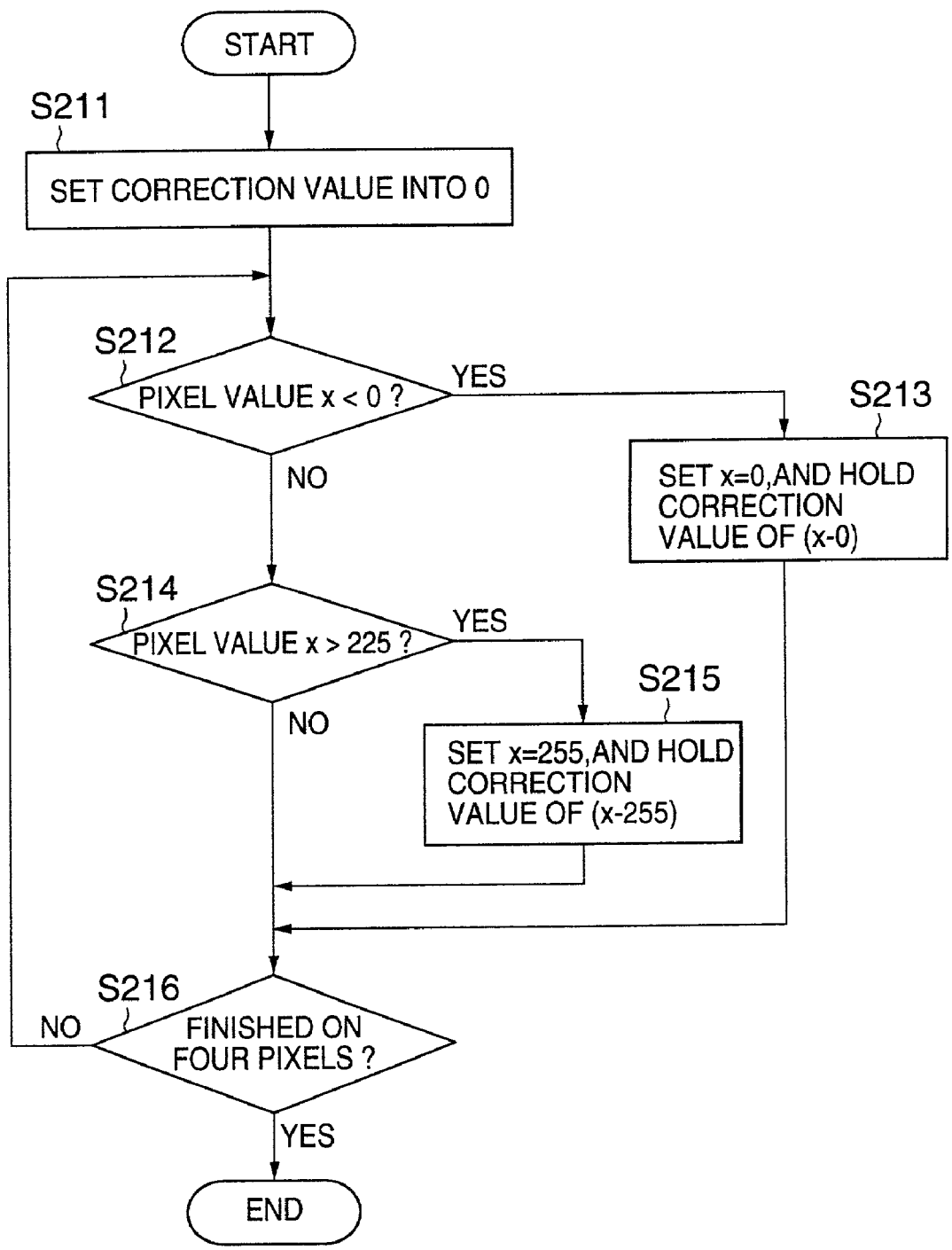
FIGS. 55 through 59 show operation flow charts illustrating the processing shown in FIG. 54 in more detail.

With reference to FIG. 55, the rounding and holding processing will now be described.

In this case of operation, RCT or ICT is performed, and, the component value x denotes R, G or B value. First, correction values on 4 pixels (LL, HL, LH, and HH position) are set to 0 (in a step S211). Then in a step S212, when the component value x is less than 0, the value is set such that x=0, and the relevant position (LL, HL, LH or HH) and the correction amount (x−0) are held in a step S213. When the component value x is larger than 255 in a step S214, the value is set such that x=255, and the relevant position (LL, HL, LH or HH) and the correction amount (x−255) are held (in a step S215). This processing is repeated on x for the 4 pixels (in a step S216).

Figure 56:
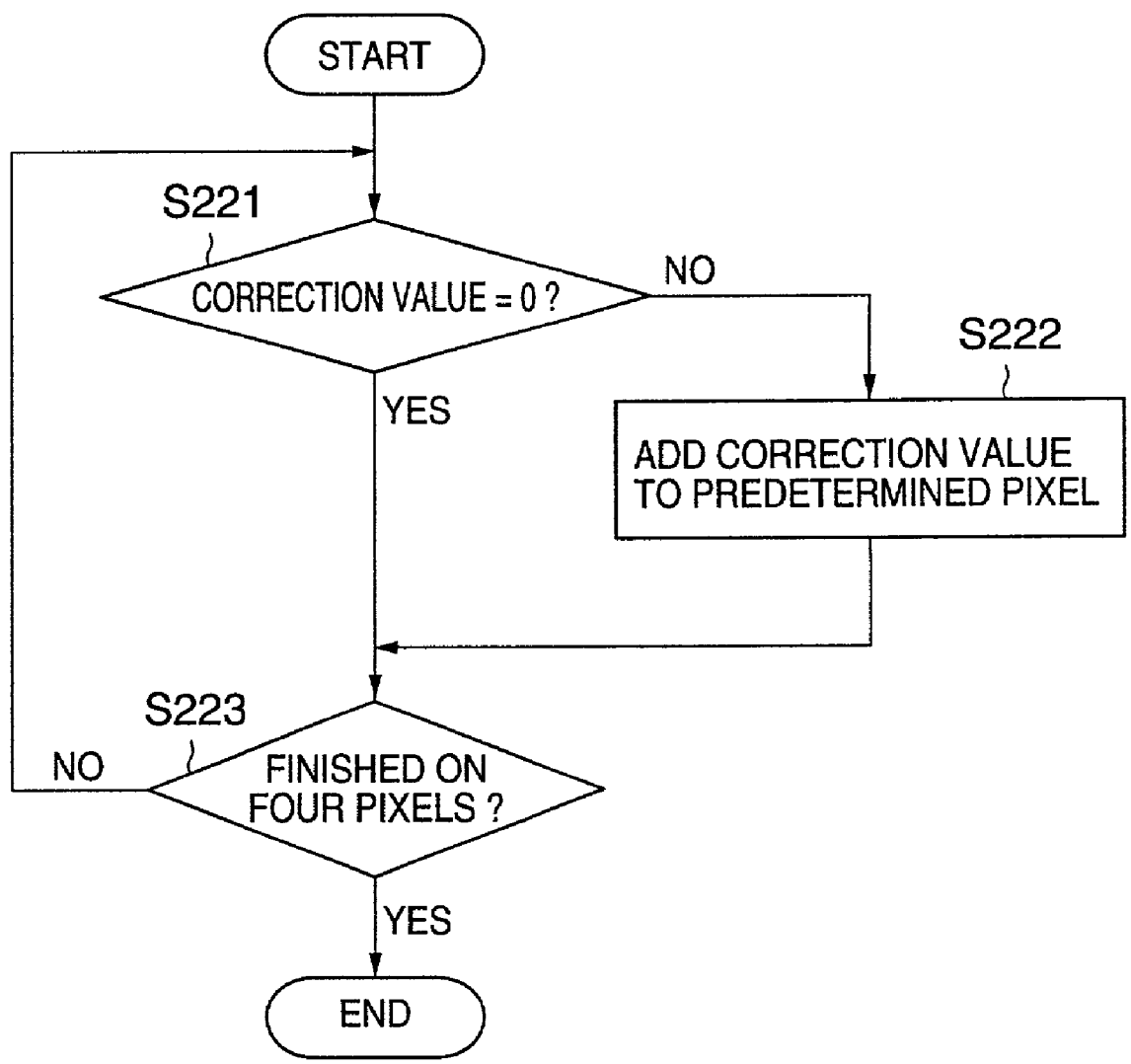

The flow of above-mentioned correction processing will now be described with reference to FIG. 56.

First, it is determined whether or not the amount of correction is 0 in a step S221. When the amount of correction is not 0, a step S222 is performed, and the amount of correction is added to the component value on a pixel predetermined according to any of the tables shown in FIGS. 46 through 49 (FIG. 32 or 40). This processing is repeated on the amount of correction for the 4 pixels (in a step S223).

Figure 57:
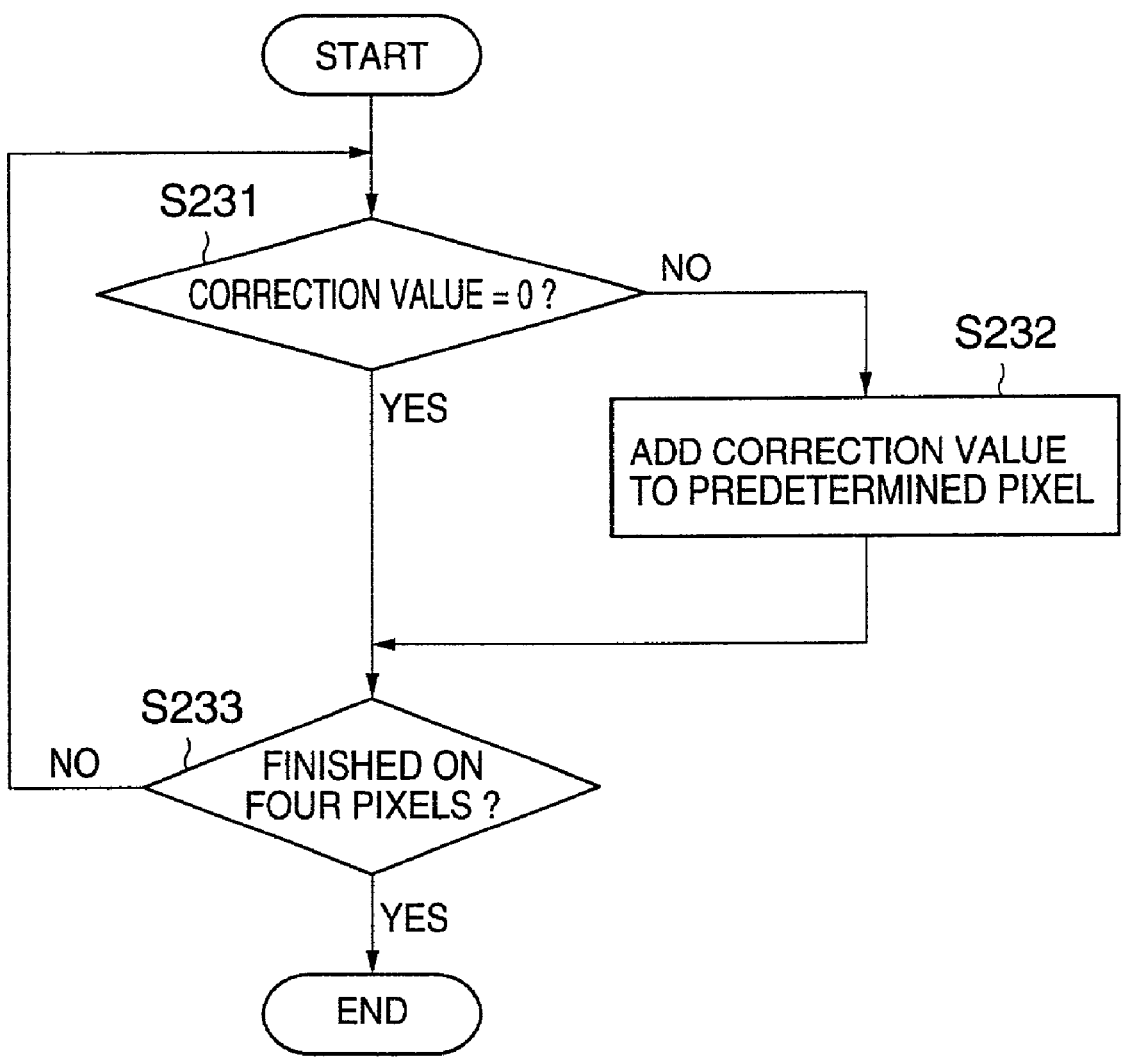

The flow of second correction processing will now be described with reference to FIG. 57.

First, it is determined whether or not the amount of correction is 0 in a step S231. When the amount of correction is not 0, the step S232 is performed, and the amount of correction is added to the component value on a pixel predetermined according to any of the tables shown in FIGS. 46 through 49 (FIG. 32 or 40). However, in this case, each table, 'pixel to second bear rang-over' is applied there. This processing is repeated on the amount of correction for the 4 pixels (in a step S233).

Figure 58:
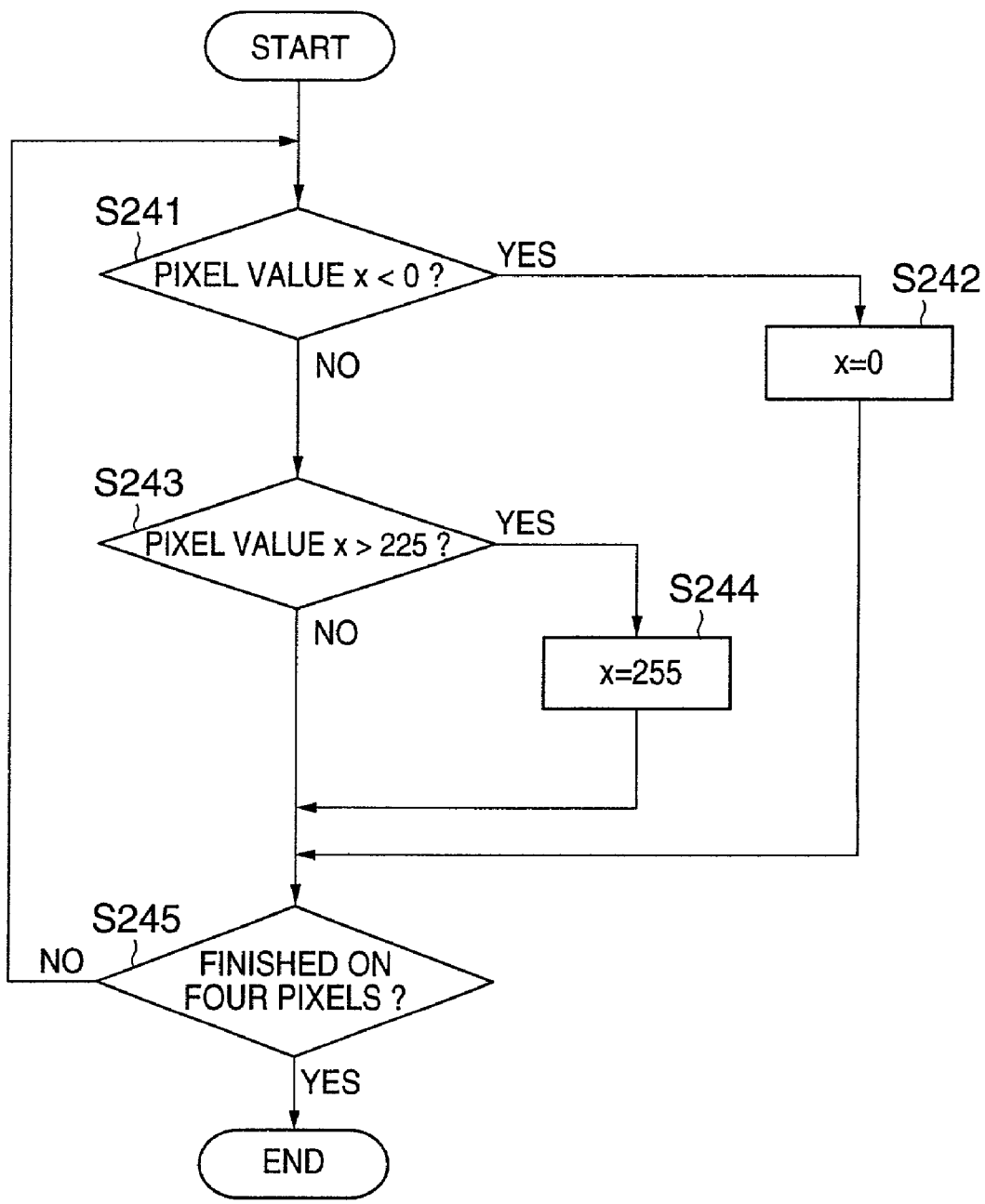

An operation flow of the above-mentioned simple rounding processing will now be described with reference to FIG. 58.

First, when the component value x is less than 0 in a step S241, it is set such as x=0 in a step S242. When the component value x is larger than 255 in a step S243, it is set such that x=255 in a step S244. Then, this processing is repeated on x for the 4 pixels (in step S245).

Figure 59:
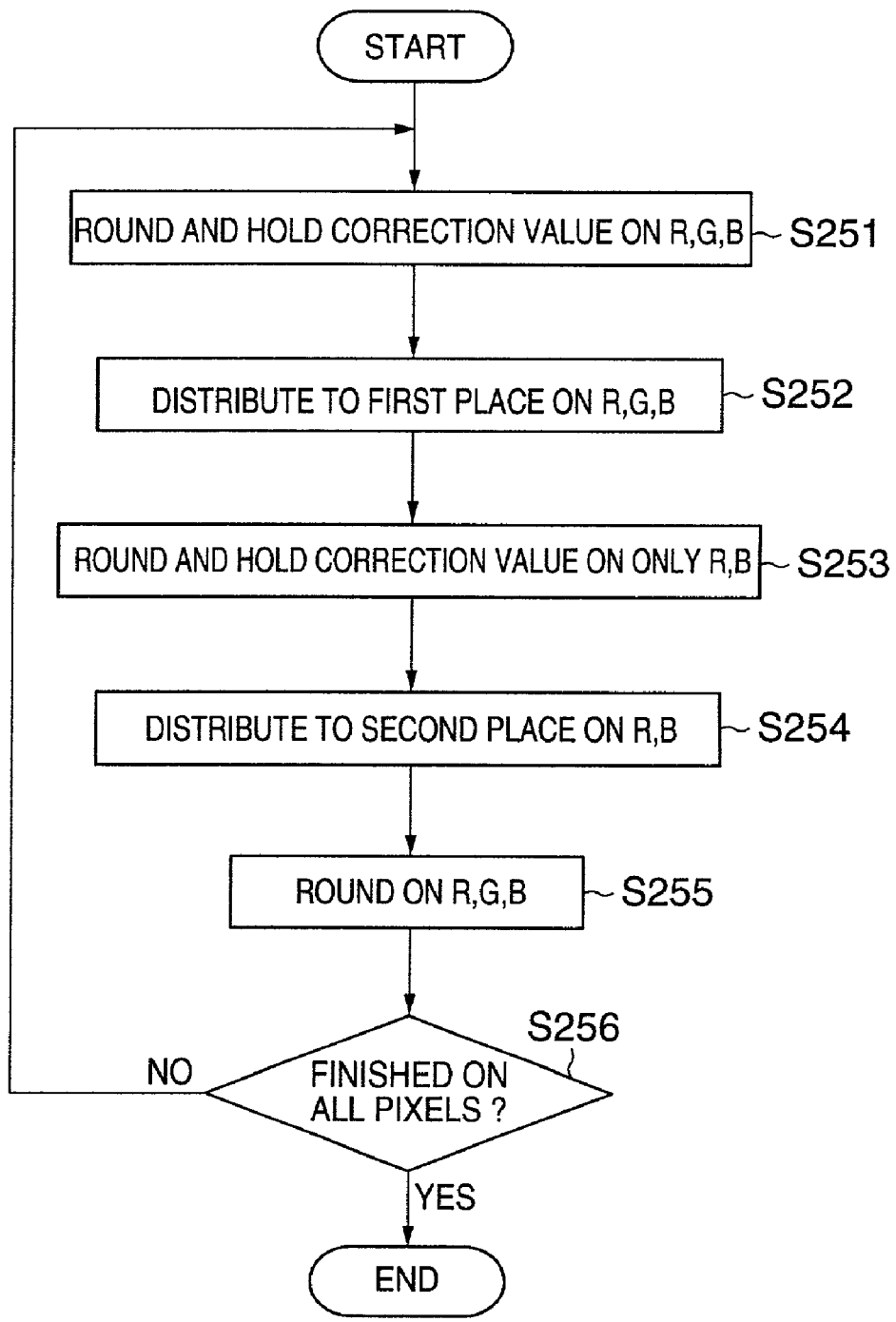

With reference to FIG. 59, the range-over processing in case the image data component is of RGB will now be described.

The correction amount is calculated for each pixel in 4-pixel unit shown in FIG. 23 for all the R, G and B values. First, rounding is performed on all R, G and B values, and, then, holds the thus-obtained respective correction values (in a step s251). Then, the correction values are distributed to the respective first distribution places for all R, G and B values (in a step S252). There, each correction value is equal to the corresponding range-over amount, as shown in FIG. 55.

The first distribution place is determined according to any one of the tables shown in FIGS. 46 through 49, i.e., horizontally, vertically or diagonally adjacent places. Then, rounding is performed only on R and B values, and the respective correction values are held (in a step S253). Then, these correction values are distributed to the second distribution places as the second correction (in a step S254). Finally, simple rounding is performed on all R, G and B values (in a step S255). This processing is performed on all the four pixels included in the given image.

Figure 60:
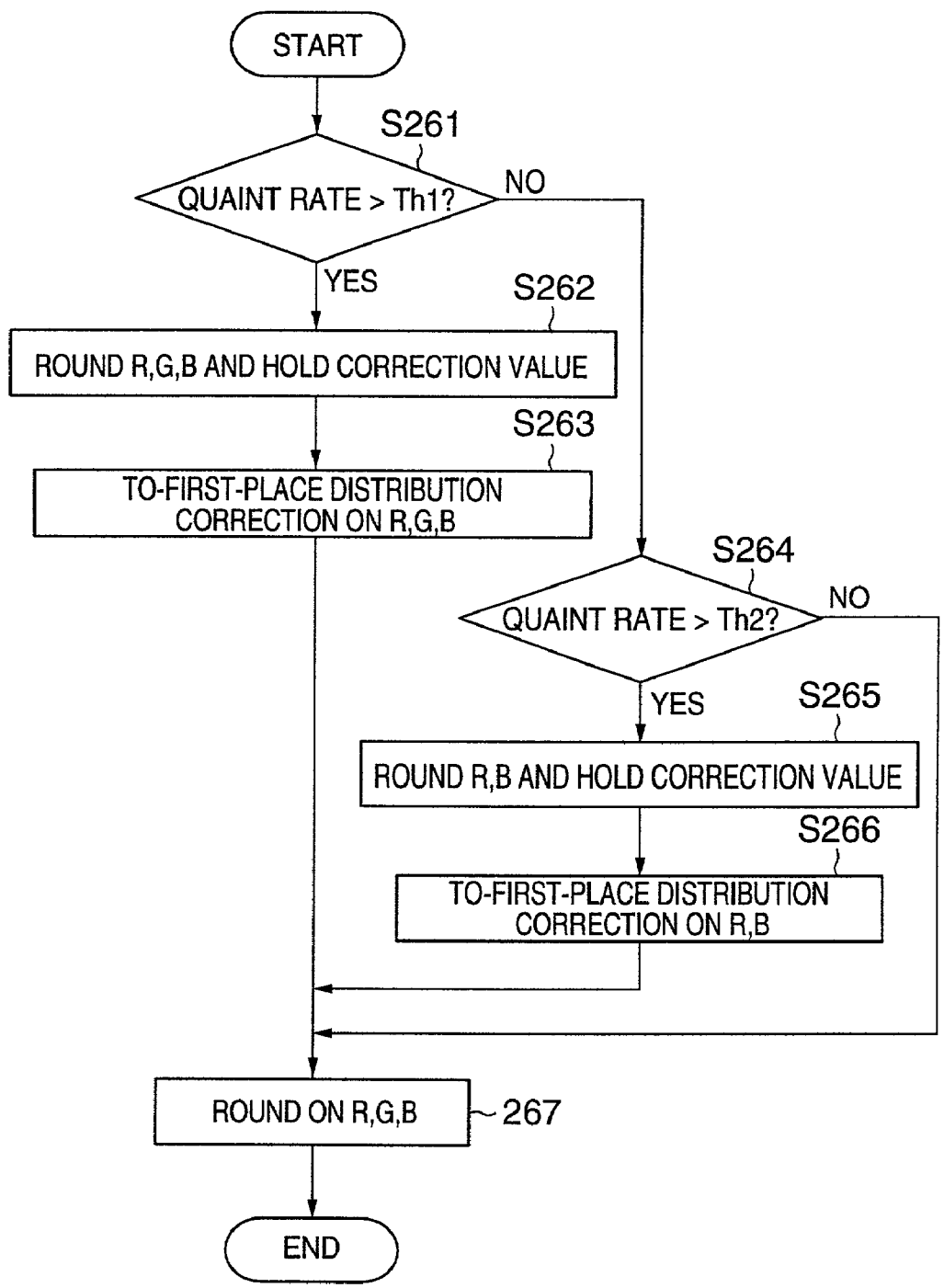
FIG. 60 shows an operation flow chart on an image data processing apparatus in a fourth embodiment (variant of the third embodiment) of the present invention.

FIG. 60 shows an operation flow on the range-over correction processing in an image data processing apparatus in a fourth embodiment of the present invention.

In the fourth embodiment, in a step S261, in case any of the rates of quantization on the coefficients HL, LH and HH is larger than a threshold Th1, the amount of correction on each pixel is calculated through the processing shown in FIG. 55 for all R, G and B, and are held (in a step S262). Furthermore, the range-over amount (the amount of correction in FIG. 55) is added to the first distribution place (pixel to first bear range-over) for all R, G and B (in a step S263), and the rounding processing is performed for all R, G and B (in a step S267). However, when the rate of quantization on all the coefficients is not larger than the threshold Th2 (Th1>Th2) in the step S261, the step S264 is performed. In the step S264, when the rate of quantization on all the coefficients is larger than another threshold Th2, the amount of correction on each pixel calculated by the processing shown in FIG. 55 is held in a step S264. Then, for R and B, the range-over amount is added to the second distribution place (pixel to second bear range-over) in a step S266, and, then, for all R, G and B, the rounding processing is performed, in a step S267. When the rate of quantization on all the coefficients is not larger than the threshold Th2, the step S267 is immediately performed without the steps S265 and S266 being performed. With reference to FIGS. 55 through 58, the details of processing therefor have been already described.

The present invention is applicable to wavelet transform according to JPEG2000 described above. Then, in the image data processing apparatus in the third or fourth embodiment, wavelet transform (5×3 wavelet transform or 9×7 wavelet transform according to JPEG2000, for example) is employed, and, also, it may be employed by each of the first and second embodiment.

Each of the above-mentioned embodiments of the present invention may be embodied by utilizing a general-purpose computer in which a predetermined software program is installed. The predetermined software program is configured to perform the above-described steps of operation according to the respective one of the embodiments of the present invention. The software program may be previously recorded in one of various recording media such as a CD-ROM, a magneto-optical disk, a DVD-ROM, an FD, a flush memory, other RAM, ROM and so forth. Instead, it is also possible that the predetermined software program is downloaded from a predetermined server through a communications network such as Internet.

Further, the present invention is not limited to the above-described embodiments, and variations and modifications may be made without departing from the scope of the present invention.

The present application is based on Japanese priority applications Nos. 2001-053721, 2001-175009 and 2001-289625, filed on Feb. 28, 2001, Jun. 11, 2001 and Sep. 21, 2001, respectively, the entire contents of which are hereby incorporated by reference.

What is claimed is:

1. An image data processing apparatus comprising:
a part at least reducing the deviation on a pixel having a value deviating from a predetermined range through inverse transform of image data from a frequency domain; and
a part determining a pixel which should have a value changed in a direction reverse to the deviation based on a character of the inverse transform.

2. The image data processing apparatus as claimed in claim 1, wherein:
the character of the inverse transform used by said determining part comprises polarities of elements of a matrix through which the inverse transform is performed.

3. The image data processing apparatus as claimed in claim 2, wherein the character of the inverse transform used by said determining part further comprises absolute values of the elements of the matrix through which the inverse transform is performed.

4. The image data processing apparatus as claimed in claim 1, wherein:
the character of the inverse transform used by said determining part comprises probabilistic magnitude relationship among products between elements of a matrix through which the inverse transform is performed and quantization errors occurring in frequency transform coefficients multiplied with the elements, respectively.

5. The image data processing apparatus as claimed in claim 1, further comprising:
a part which, in case the pixel determined by said determining part to have the value changed in the direction reverse to the deviation then has a value deviating from the predetermined range as a result of having the value changed in the direction reverse to the first occurring deviation, determines a pixel which should have a value changed in a direction reverse to the second occurring deviation based on a character of the inverse transform.

6. The image data processing apparatus as claimed in claim 5, wherein:
the character of the inverse transform used by said part which determines the pixel which should have the value changed in the direction reverse to the second occurring deviation comprises the polarities of the elements of the matrix through which the inverse transform is performed.

7. The image data processing apparatus as claimed in claim 6, wherein:
the character of the inverse transform used by said part which determines the pixel which should have the value changed in the direction reverse to the second occurring deviation further comprises the absolute values of the elements of the matrix through which the inverse transform is performed.

8. The image data processing apparatus as claimed in claim 1, wherein:
the pixel determined by the part to have the value changed in the direction reverse to the deviation is one vertically, horizontally or diagonally adjacent to the pixel which has the first occurring deviation.

9. The image data processing apparatus as claimed in claim 5, wherein:
the pixel determined by the part to have the value changed in the direction reverse to the first occurring deviation is one vertically adjacent to the pixel which has the first occurring deviation; and
the pixel determined by the part to have the value changed in the direction reverse to the second occurring deviation is one horizontally or diagonally adjacent to the pixel having the second occurring deviation.

10. The image data processing apparatus as claimed in claim 5, wherein:
the pixel determined by the part to have the value changed in the direction reverse to the first occurring deviation is one diagonally adjacent to the pixel which has the first occurring deviation; and the pixel determined by the part to have the value changed in the direction reverse to the second occurring deviation is one horizontally or vertically adjacent to the pixel having the second occurring deviation.

11. The image data processing apparatus as claimed in claim 5, wherein:

the pixel determined by the part to have the value changed in the direction reverse to the first occurring deviation is one horizontally adjacent to the pixel which has the first occurring deviation; and the pixel determined by the part to have the value changed in the direction reverse to the second occurring deviation is one vertically or diagonally adjacent to the pixel having the second occurring deviation.

12. The image data processing apparatus as claimed in claim 1, wherein the amount by which the part at least reduces the deviation is the same as the amount by which the pixel should have the value changed in the direction reverse to the deviation.

13. The image data processing apparatus as claimed in claim 1, wherein:

the inverse transform from the frequency domain is performed on a color difference component of the image data; and the thus-obtained R, G or B value is regarded as the data of the relevant pixel processed by said parts.

14. The image data processing apparatus as claimed in claim 1, wherein:

the inverse transform from the frequency domain is performed on a brightness component of the image data; and the thus-obtained G value is regarded as the data of the relevant pixel processed by said parts.

15. The image data processing apparatus as claimed in claim 1, further comprising a part of switching as to whether the deviation occurring on a pixel is dealt with by causing a predetermined pixel to have a value changed accordingly or by merely rounding the value of the pixel originally having the deviation, based on a quantization rate applied in quantization performed on coefficients of the frequency domain.

16. The image data processing apparatus as claimed in claim 1, further comprising a part of switching as to whether the deviation occurring on a pixel in G value is dealt with by causing a predetermined pixel to have a G value changed accordingly or by merely rounding the G value of the pixel originally having the deviation, based on a quantization rate applied in quantization performed on coefficients of the frequency domain.

17. The image data processing apparatus as claimed in claim 1, further comprising a part of rounding a G value of a pixel, in case the G value deviates from the predetermined range through the inverse transform of image data from the frequency domain.

18. The image data processing apparatus as claimed in claim 1, wherein:

the image data to undergo the inverse transform comprises image data having undergone S-transform and thus transformed into the frequency domain, where the S-transform has a character such that half the frequency coefficient HH has an quantization error probabilistically minimum among the frequency coefficients LH, HL and HH/2 obtained through the S-transform.

19. The image data processing apparatus as claimed in claim 1, wherein:

the image data to undergo the inverse transform comprises image data having undergone 5×3 wavelet transform or 9×7 wavelet transform and thus transformed into the frequency domain; and said determining part determines a pixel which should have a value changed in a direction reverse to the deviation as being a pixel vertically or horizontally adjacent to the pixel having the deviation.

20. An image data processing method comprising the steps of:

a) at least reducing the deviation on a pixel having a value deviating from a predetermined range through inverse transform of image data from a frequency domain; and b) determining a pixel which should have a value changed in a direction reverse to the deviation based on a character of the inverse transform.

21. The method as claimed in claim 20, wherein:

the character of the inverse transform used by said step b) comprises polarities of elements of a matrix through which the inverse transform is performed.

22. The method as claimed in claim 21, wherein the character of the inverse transform used by said step b) further comprises absolute values of the elements of the matrix through which the inverse transform is performed.

23. The method as claimed in claim 20, wherein:

the character of the inverse transform used by said step b comprises probabilistic magnitude relationship among products between elements of a matrix through which the inverse transform is performed and quantization errors occurring in frequency transform coefficients multiplied with the elements, respectively.

24. A computer readable information recording medium having a software program recorded therein, the software program causing a computer to execute the steps of:

a) at least reducing the deviation on a pixel having a value deviating from a predetermined range through inverse transform of image data from a frequency domain; and b) determining a pixel which should have a value changed in a direction reverse to the deviation based on a character of the inverse transform.

25. The computer readable recording medium as claimed in claim 24, wherein:

the character of the inverse transform used by said step b) comprises polarities of elements of a matrix through which the inverse transform is performed.

26. The computer readable recording medium as claimed in claim 25, wherein the character of the inverse transform used by said step b) further comprises absolute values of the elements of the matrix through which the inverse transform is performed.

27. The computer readable recording medium as claimed in claim 24, wherein:

the character of the inverse transform used by said step b) comprises probabilistic magnitude relationship among products between elements of a matrix through which the inverse transform is performed and quantization errors occurring in frequency transform coefficients multiplied with the elements, respectively.

* * * * *